US010953830B1

(12) United States Patent
Christensen et al.

(10) Patent No.: US 10,953,830 B1
(45) Date of Patent: Mar. 23, 2021

(54) ADJUSTING INTERIOR CONFIGURATION OF A VEHICLE BASED ON VEHICLE CONTENTS

(71) Applicant: STATE FARM MUTUAL AUTOMOBILE INSURANCE COMPANY, Bloomington, IL (US)

(72) Inventors: Scott T. Christensen, Salem, OR (US); Brian M. Fields, Normal, IL (US); Stephen R. Prevatt, Normal, IL (US); Steve Roberson, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 224 days.

(21) Appl. No.: 16/034,862

(22) Filed: Jul. 13, 2018

(51) Int. Cl.
  *B60R 21/01* (2006.01)
  *B60R 21/015* (2006.01)
  *B60R 21/0134* (2006.01)
  *B60R 21/00* (2006.01)

(52) U.S. Cl.
  CPC .... *B60R 21/01512* (2014.10); *B60R 21/0134* (2013.01); *B60R 21/01554* (2014.10); *B60R 2021/0032* (2013.01); *B60R 2021/01013* (2013.01)

(58) Field of Classification Search
  CPC .................................................... G08B 25/016
  USPC ............................................ 280/735; 701/45
  See application file for complete search history.

(56) References Cited

U.S. PATENT DOCUMENTS

| | | | | | |
|---|---|---|---|---|---|
| 5,570,903 | A | * | 11/1996 | Meister | B60N 2/002 180/273 |
| 5,785,347 | A | * | 7/1998 | Adolph | B60R 21/01556 180/273 |
| 6,026,340 | A | * | 2/2000 | Corrado | B60N 2/002 280/735 |
| 6,490,515 | B1 | * | 12/2002 | Okamura | G01G 19/4142 701/49 |

(Continued)

OTHER PUBLICATIONS

U.S. Appl. No. 16/034,878, Christensen et al., Dynamic Limiting of Vehicle Operation Based on Interior Configurations, filed Jul. 13, 2018.

(Continued)

*Primary Examiner* — Toan C To
(74) *Attorney, Agent, or Firm* — Marshall, Gerstein & Borun LLP

(57) ABSTRACT

A system and method are provided for improving safety of one or more vehicle occupants. The system may include an interior data collection component configured to collected interior configuration data representing a physical configuration of the interior space of the vehicle, a plurality of vehicle safety components configured to protect the one or more vehicle occupants when deployed and one or more processors configured to determine, by processing the interior vehicle configuration data, a location and orientation of the one or more vehicle occupants; select a subset of the plurality of vehicle safety components to be active based on the location and orientation of the one or more vehicle occupants; and set the selected subset of the plurality of vehicle safety components to an active state in which the selected subset of the plurality of vehicle safety components is deployed when an emergency condition is detected.

18 Claims, 16 Drawing Sheets

(56) References Cited

U.S. PATENT DOCUMENTS

| | | | |
|---|---|---|---|
| 7,158,016 B2* | 1/2007 | Cuddihy | G08B 25/016 |
| | | | 340/436 |
| 8,260,502 B2 | 9/2012 | Yonak et al. | |
| 9,663,052 B2* | 5/2017 | Rao | B60R 21/0134 |
| 9,886,841 B1* | 2/2018 | Nave | B60W 10/04 |
| 2002/0003345 A1* | 1/2002 | Stanley | B60N 2/286 |
| | | | 280/735 |
| 2004/0107033 A1* | 6/2004 | Rao | B60R 21/0134 |
| | | | 701/45 |
| 2011/0140404 A1 | 6/2011 | Odate | |
| 2012/0215403 A1 | 8/2012 | Tengler et al. | |
| 2014/0135598 A1 | 5/2014 | Weidl et al. | |
| 2014/0309790 A1* | 10/2014 | Ricci | G06F 3/013 |
| | | | 700/276 |
| 2018/0272977 A1* | 9/2018 | Szawarski | B60N 2/04 |

OTHER PUBLICATIONS

U.S. Appl. No. 16/034,873, Christensen et al., Dynamic Safe Storage of Vehicle Content, filed Jul. 13, 2018.

* cited by examiner

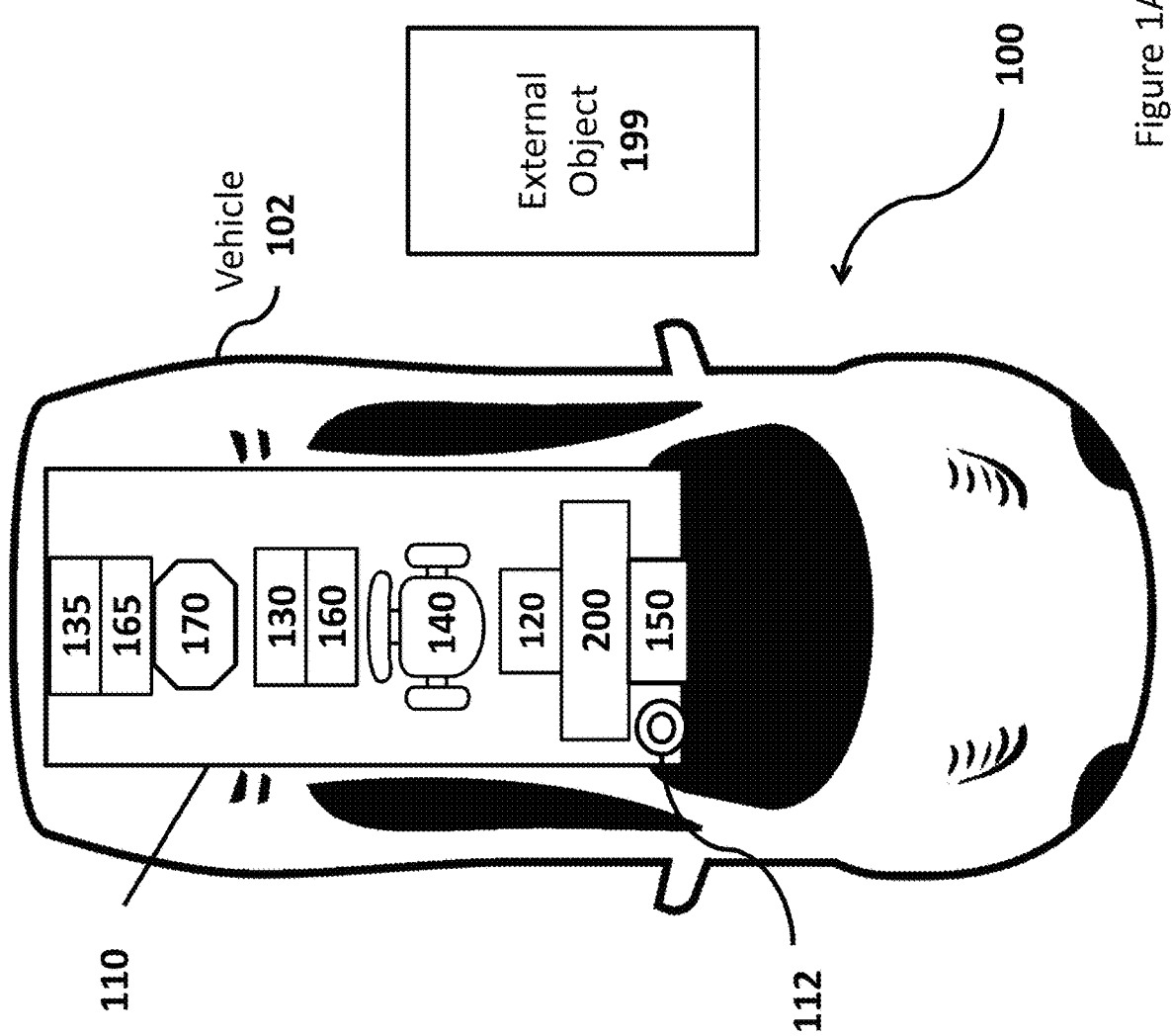

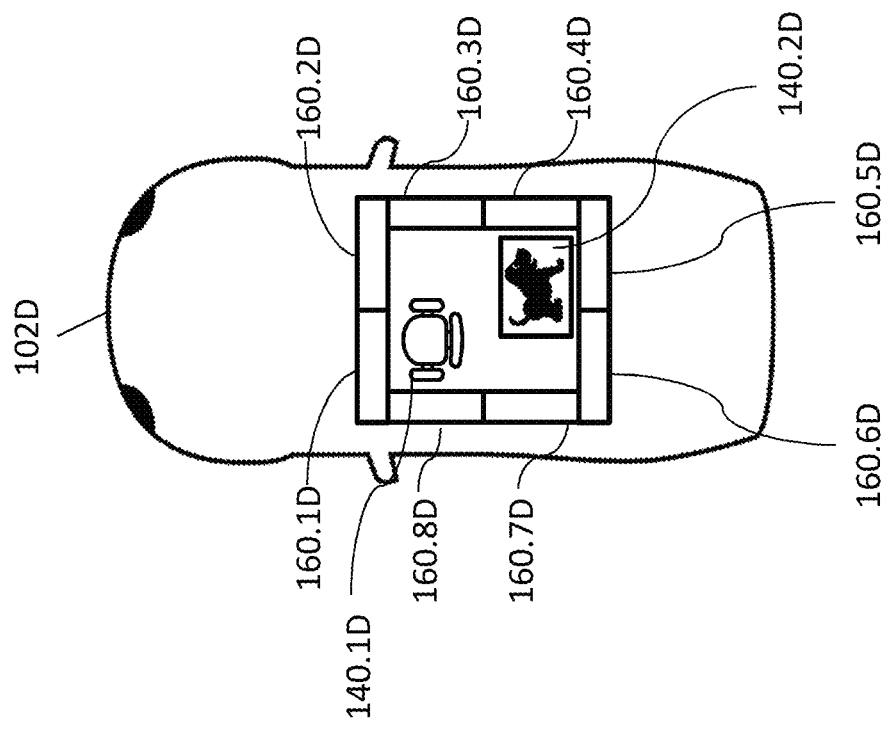
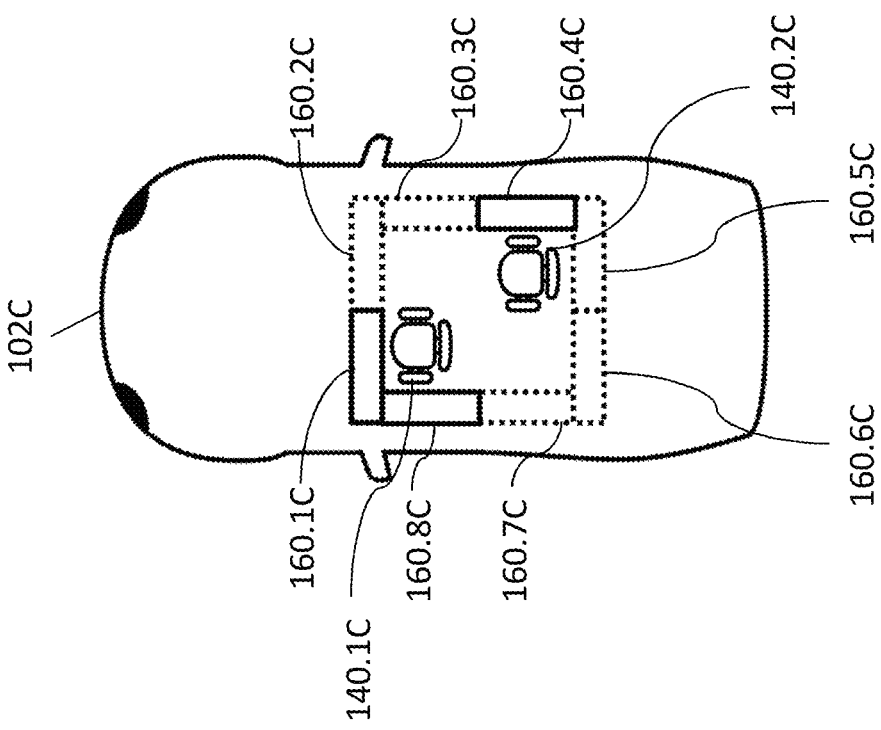

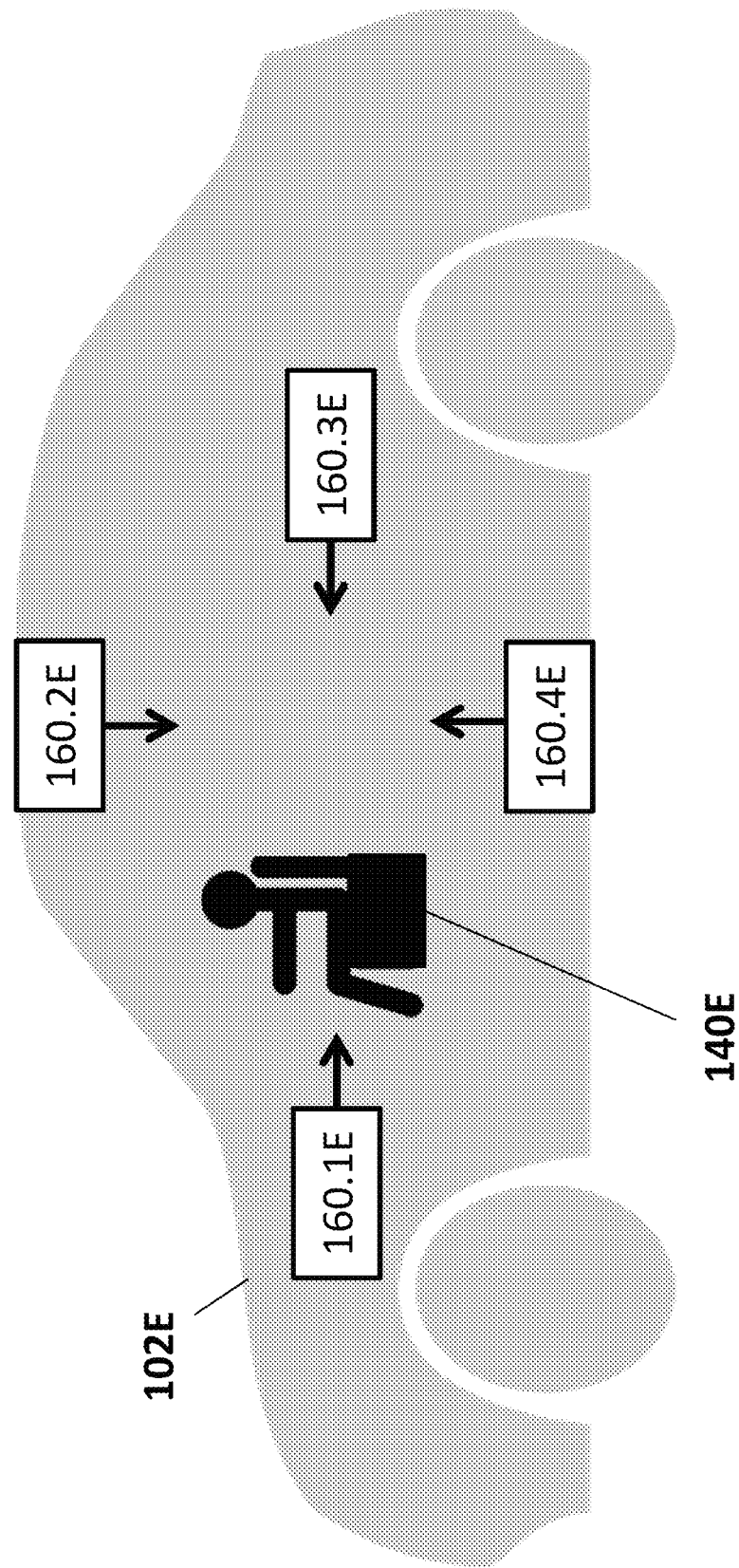
Figure 2E.1

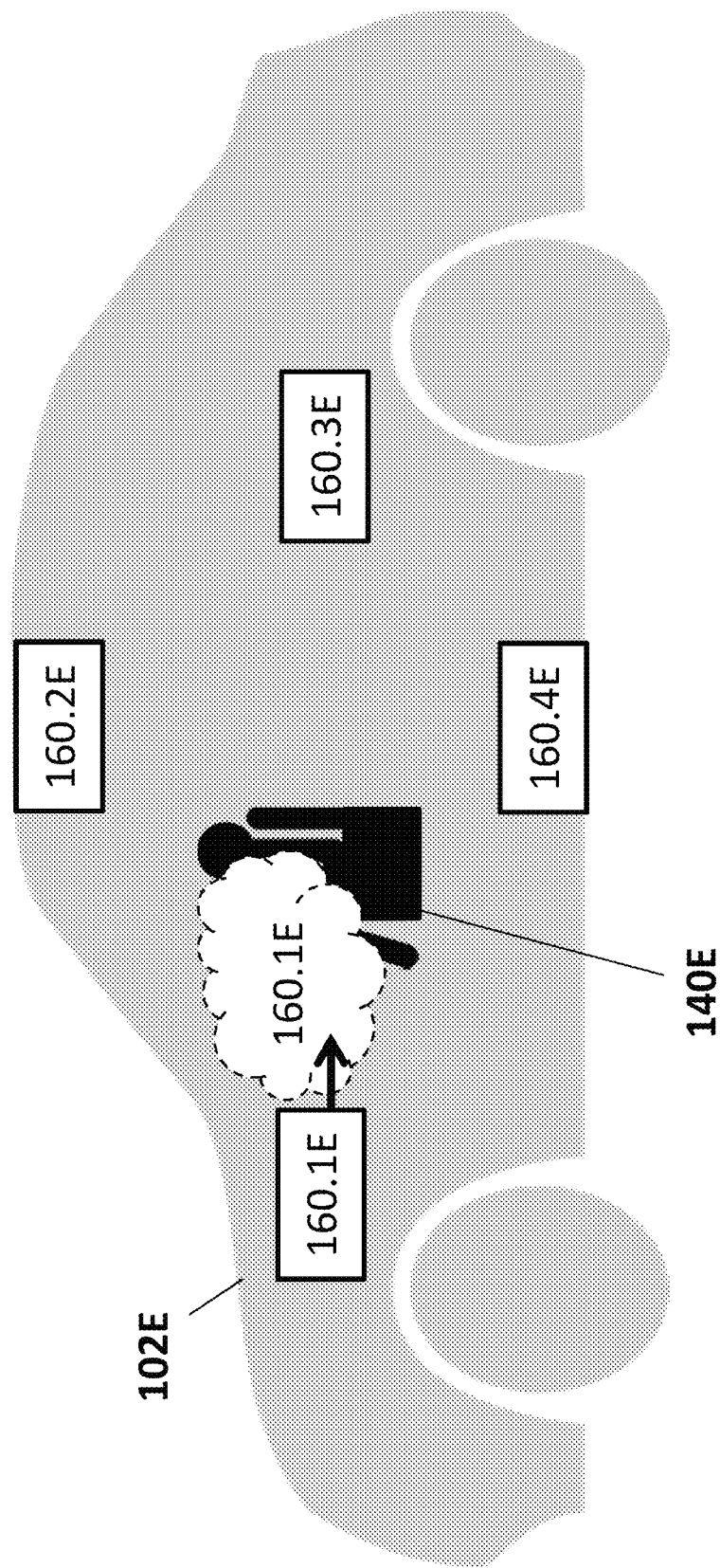
Figure 2E.2

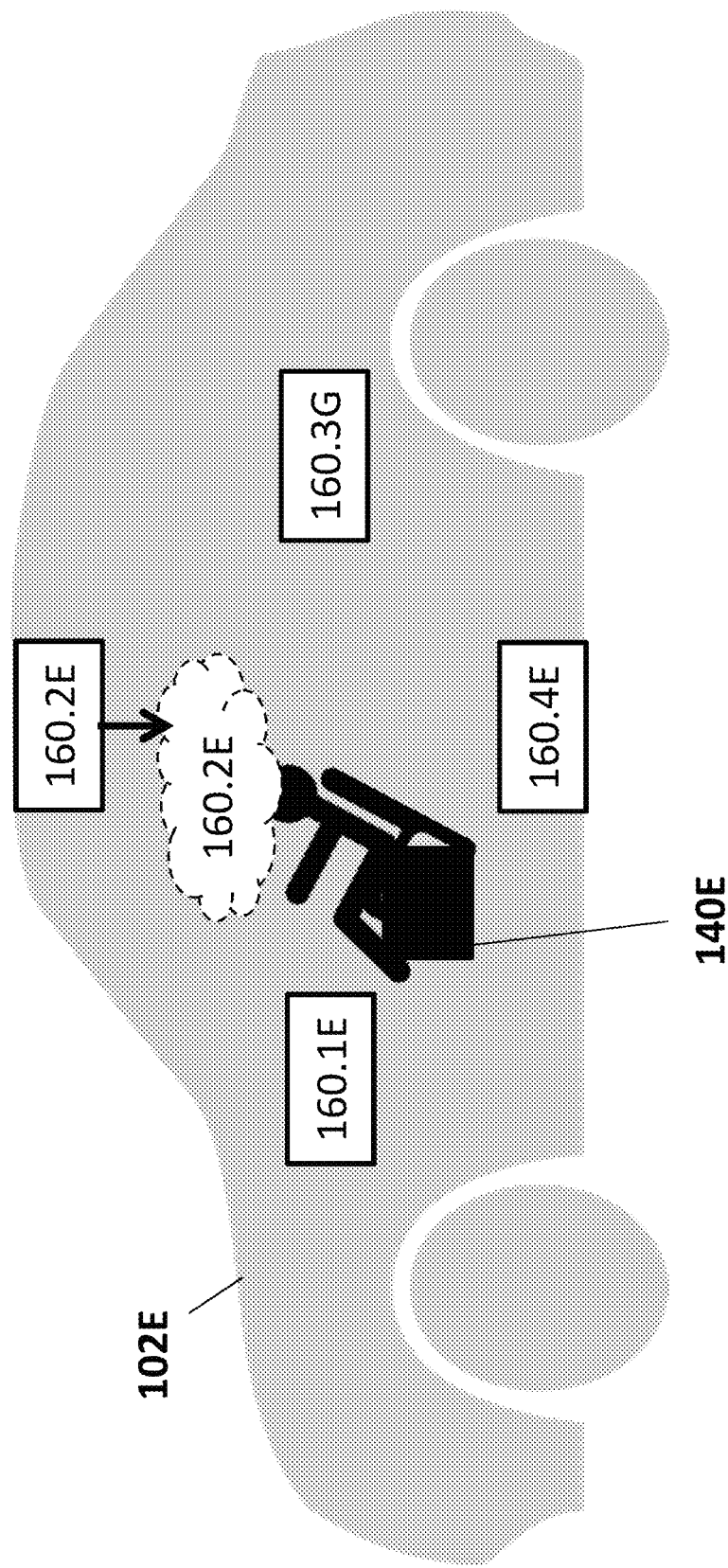
Figure 2E.3

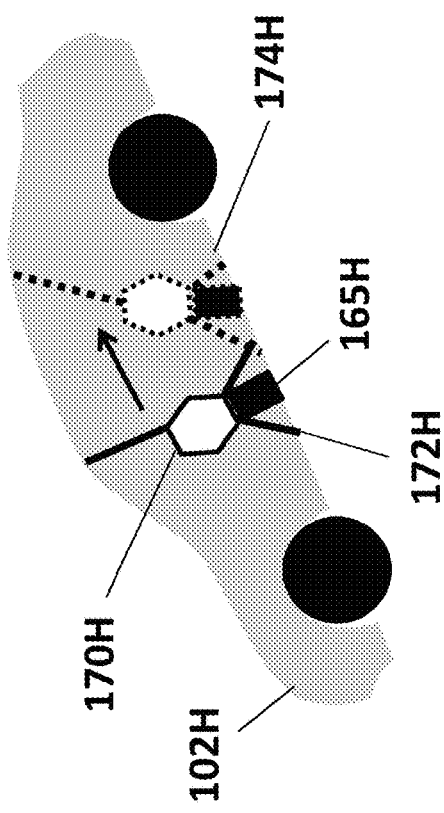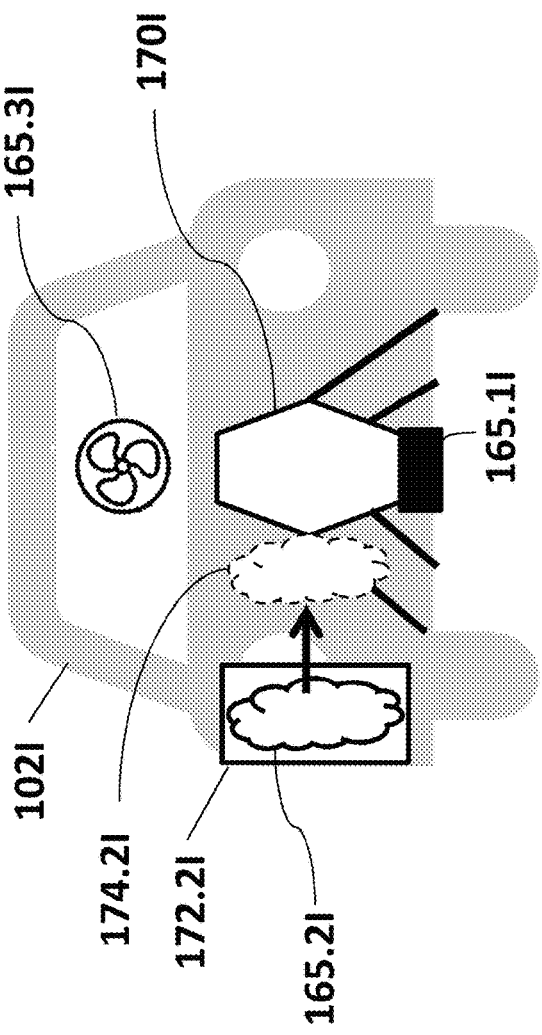

ADJUSTING INTERIOR CONFIGURATION OF A VEHICLE BASED ON VEHICLE CONTENTS

FIELD OF DISCLOSURE

The present disclosure generally relates to vehicle safety. More particularly, the present invention disclosure relates to systems and methods for selecting, modifying, and controlling one or more vehicle safety components of a vehicle, in response to an interior vehicle configuration of the vehicle, for the purpose of improving vehicle occupant safety and reducing injury risk.

BACKGROUND

The interior configuration and layout of a vehicle has changed only incrementally since the invention of automobiles over a century ago. Conventional interior vehicle configurations were adapted so that a human could effectively and safely, and manually, operate a vehicle. Accordingly, existing interior vehicle configurations are confined to certain layouts to accommodate these requirements. For instance, space in the vehicle must be devoted to the steering wheel, brake, accelerator, and gear shifter, and the driver must be positioned to accessibly operate this equipment while having a clear view of the road and traffic in all directions. Additionally, user interface control panels must also be arranged to conform to this layout. In existing vehicles, a vehicle operator has no way to adjust his/her physical position without abandoning the vehicle controls, thereby increasing the likelihood of an accident. Therefore, a driver and/or passenger is seemingly limited to a certain position regardless of driving conditions and/or the vehicle's actions, which in turn can place detrimental force and strain on the vehicle driver and/or passenger's body.

Existing vehicle safety technology has been limited in form and/or function in order to also conform to existing configurations. Each year millions of individuals are injured as a result of vehicular accidents emanating from operator error, inattention, inexperience, misuse, or distraction; inclement weather conditions; treacherous road conditions; and other driving environment conditions. While existing vehicle safety technologies have improved vehicle driver and passenger safety, many of these technologies, such as airbags, do not deploy until after a vehicle has already been involved in a collision. Similarly, other existing vehicle safety technologies, such as seatbelts, can only perform a single function and provide limited or no benefit in certain situations. In some instances, the existing safety technology installed in a vehicle can cause more harm than it prevents because of the specific type of accident and/or the physical attributes of the vehicle's passenger. A passenger's specific body position during a collision can affect how his/her body is impacted by the collision, and just a few inches or degrees of difference in body positioning can be the difference between a passenger walking away from a collision alive and unscathed, as opposed to life-altering injuries or death. However, given the near-instantaneous nature of most accidents, it is almost impossible for a driver or passenger to brace for impact or make changes to his/her position to reduce a risk of injury. Even if a passenger was somehow able to foresee an impending accident, his/her physical movement would be limited due to the existing and confined standard interior vehicle configurations. Additionally, it would often be impossible for a human passenger to determine, especially in an instant, what precise movements needed to be made to avoid/reduce injury, make such movements, and/or verify such movements had been accurately taken.

Additionally, these configurations limit which type of safety devices are used in current vehicles. In current vehicles, for examples, seatbelts are only provided for specific designated locations and orientations within the vehicle. This requires that passengers sit in a specific physical configuration in order to maximize safety. Consequently, this limits what actions a passenger can undertake while traveling in a vehicle, and in some cases prevents a passenger from using time spent in a vehicle more productively. For example, long, cross-country trips must be spent sitting in tight, uncomfortable conditions. Meanwhile, to sleep more comfortably while traveling in a car, for example, a passenger must often adjust his/her body to a position that compromises safety, by being in a position that is not adequately covered by an airbag and/or in which a seatbelt is less effective. Further, in the event an accident does occur, current vehicle safety devices (e.g., airbags) can only deploy in one predetermined manner, often only marginally reducing the risk of injury to a passenger, or in some instances even injuring the passenger because of the manner in which the airbag was deployed.

While some activities, such as reading or working on a computer, can be safely performed while traveling in a vehicle, engaging in such behavior can still be difficult or undesirable, especially for long periods of time, as a result of vehicle operation conditions such as the speed at which the vehicle is traveling, traffic conditions (e.g., "stop and go" traffic), road conditions (e.g., uneven surfaces, pot holes, etc.), terrain conditions (e.g., steep roads, winding roads, etc.) and/or other driving conditions. Further, passengers who attempt to eat and/or drink while riding in a vehicle risk choking if certain sudden/unexpected maneuvers are attempted, as well as the less serious consequence of spilling their food/drinks. Thus, traveling by way of current vehicles can be tremendously time consuming, stressful, dangerous, and/or inefficient as a result of the physical configuration. In turn, this can increase the cost of travel both monetarily and in opportunity cost. Vehicle operators and passengers may need to take breaks to rest, sleep, eat, and/or use the restroom, and a passenger is very limited in terms of the activities that can be performed while the vehicle is operating.

The physical configuration of current vehicles also effects how cargo is transported. Most current vehicles merely provide large, open areas, such as trunk space, for individuals to store articles in while traveling. This requires that an individual take safety precautions to prevent an article from moving around, spilling, cracking, spoiling, or breaking while being transported. For example, an individual may need to protect a fragile glass object in multiple layers of bubble wrap, and/or "wedge" the glass object into a constrained space, to prevent the glass object from shattering while being transported. Conversely, when transporting perishable goods, such as groceries, an individual must take precautions, like taking the groceries home immediately instead of running other errands, to prevent the groceries from spoiling/melting/etc. However, even when such precautions are taken, transportable articles still may be damaged during transport because of unforeseen circumstances and conditions. Ultimately, this can cause difficulties, inconveniences, and/or inefficiencies in regards to transporting articles.

It is also noted that the increase in autonomous and semi-autonomous vehicles has decreased the need for vehicles to be operated by humans. Autonomous and semi-autonomous vehicles augment vehicle operators' information or replace vehicle operators' actions to operate the vehicle, in whole or part, with computer systems based upon information collected by equipment within, or attached to, the vehicle. Consequently, there is a decreased need for vehicles to be confined to features and configurations (e.g., the interior layout) that are specifically designed to accommodate human operation.

SUMMARY

The present application disclosure provides a system and method for improving the safety of one or more vehicle occupants in response to detecting an emergency condition.

In one embodiment, a system for improving safety of one or more vehicle occupants includes an interior data collection component and a plurality of vehicle safety components configured to protect the one or more vehicle occupants when deployed. The system also includes one or more processors configured to receive interior vehicle configuration data. The interior vehicle configuration data includes, or is derived from data that includes, the data collected by the interior data collection component. The one or more processors are also configured to determine, by processing the interior vehicle configuration data, a location and orientation of the one or more vehicle occupants, select a subset of the plurality of vehicle safety components to be active based on the location and orientation of the one or more vehicle occupants, and set the selected subset of the plurality of vehicle safety components to an active state in which the selected subset of the plurality of vehicle safety components is deployed when an emergency condition is detected.

In one embodiment, a method for improving safety of one or more vehicle occupants comprises receiving, via one or more processors, interior vehicle configuration data; determining, via the one or more processors, a location and orientation of the one or more vehicle occupants; selecting, via the one or more processors, a subset of a plurality of vehicle safety components to be active based on the location and orientation of the one or more vehicle occupants; and setting, via the one or more processors, the selected subset of the plurality of vehicle safety components to an active state in which the selected subset of the plurality of vehicle safety components is deployed when an emergency condition is detected.

In one embodiment, a system for improving safety of one or more vehicle occupants includes an interior data collection component, a vehicle safety component configured to protect the one or more vehicle occupants when deployed, and an actuator component configured to adjust a physical configuration of the vehicle safety component. The system also includes one or more processors configured to receive interior vehicle configuration data. The interior vehicle configuration data includes, or is derived from data that includes, the data collected by the interior data collection component. The one or more processors are also configured to determine, by processing the interior vehicle configuration data, a location and orientation of the one or more vehicle occupants, and cause the actuator component to adjust the vehicle safety component from a first physical configuration to a second physical configuration based on the location and orientation of the one or more vehicle occupants.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

FIG. 1A depicts a block diagram of a first embodiment of a system for improving the safety of one or more vehicle occupants, dynamically protecting one or more transportable articles, and/or controlling operation of a vehicle.

FIG. 2C illustrates a third embodiment and scenario in which one or more vehicle safety components may be deployed.

FIG. 2D illustrates a fourth embodiment and scenario in which one or more vehicle safety components may be deployed.

FIG. 2E.1 illustrates a fifth embodiment in which one or more vehicle safety components may be deployed.

FIG. 2E.2 illustrates a sixth embodiment in which one or more vehicle safety components may be deployed.

FIG. 2E.3 illustrates a seventh embodiment in which one or more vehicle safety components may be deployed.

FIG. 2H illustrates an embodiment and scenario in which an article protection component may be deployed to protect one or more transportable articles.

FIG. 2I illustrates an embodiment and scenario in which one or more article protection components of different types may be selected and deployed to protect one or more transportable articles.

DETAILED DESCRIPTION

Figure 1B:
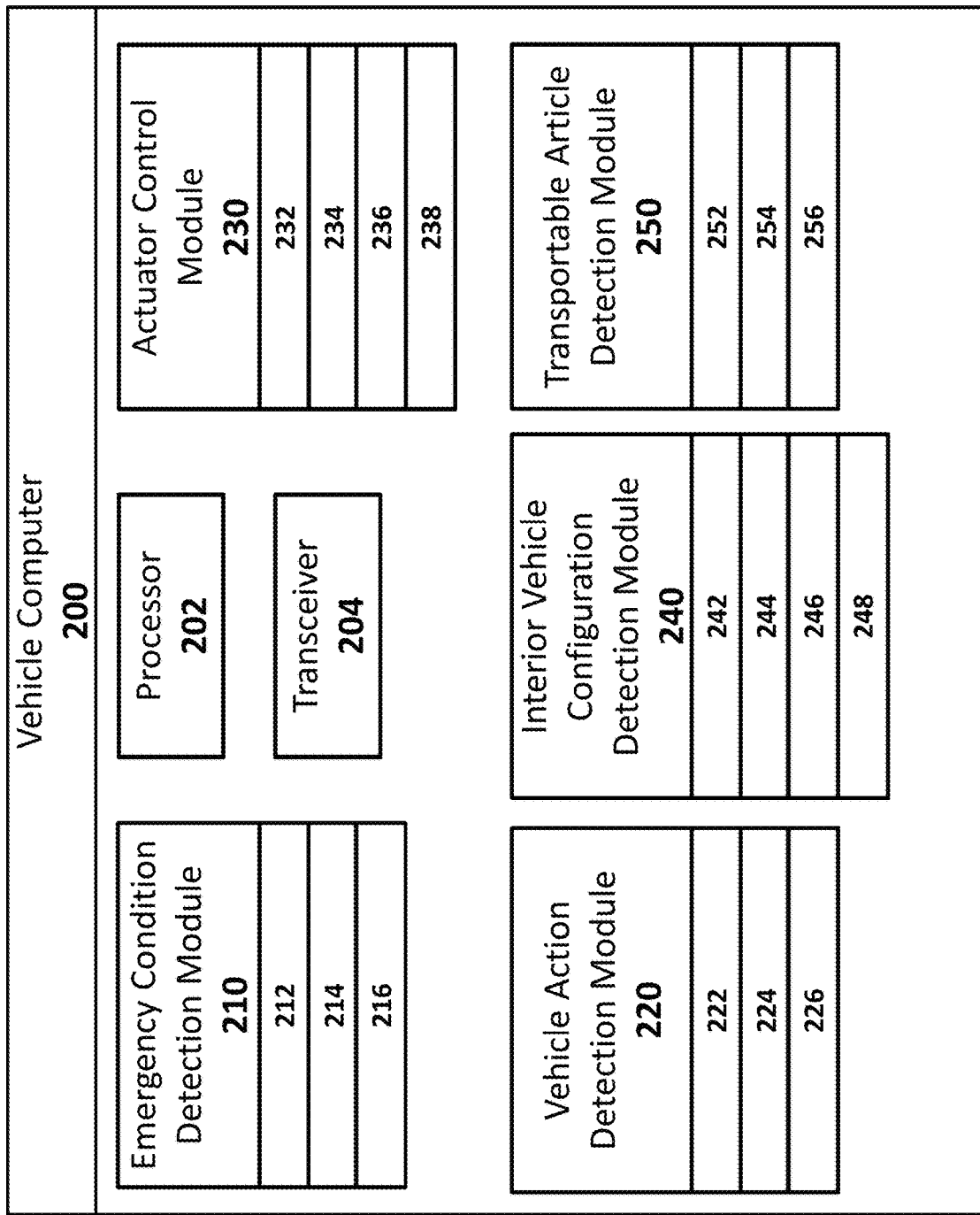
FIG. 1B depicts a detailed block diagram of a vehicle computer that may be used in the system of FIGS. 1A and/or 1C.

The embodiments described herein relate to, inter alia, systems and methods for improving safety of one or more vehicle occupants by adjusting a vehicle safety component.

FIG. 1A depicts a block diagram of a first embodiment of a system 100 for improving the safety of one or more vehicle occupants, dynamically protecting one or more transportable articles, and/or controlling operation of a vehicle. The system 100 includes a vehicle 102, vehicle-based components 110, and one or more objects external to the vehicle 199 (hereinafter "external object 199"). The vehicle-based components 110 may include an external communication component 112, a vehicle computer 200, an interior data collection component 120, a VSC actuator component 130, an APC actuator component 135, an interior vehicle component 140, a vehicle operation controller 150, a vehicle safety component 160, an article protection component 165, and a transportable article 170. In operation, data relating to a vehicle's interior space is collected and transmitted to the vehicle computer 200. The vehicle computer 200 analyzes this data to detect a physical configuration of the interior space of the vehicle 102, and/or other data corresponding to a location and/or orientation of one or more vehicle occupants, and/or one or more characteristics(s) and/or traits of one or more transportable articles 170 contained within the interior space. Based on this data, the vehicle computer 200 may determine which vehicle safety component(s) 160 and/or article protection component(s) 165 to deploy in response to the vehicle computer 200 detecting an emergency condition, determine a manner in which to deploy the vehicle safety component(s) 160 and/or article protection component(s) 165, and/or cause the vehicle operation controller 150 to control the vehicle 102 in a specific manner. Additionally, data relating to the surrounding environment and/or operation of the vehicle 102 is collected and transmitted to the vehicle computer 200. When the vehicle computer 200 detects the emergency condition and/or the specific action, the vehicle computer 200 may cause the VSC actuator component 130 to deploy one or more of the vehicle safety component(s) 160 to reduce the risk of injury to one or more vehicle occupants and/or may cause the APC actuator component 135 to deploy one or more of the article protection component(s) 165 to reduce the risk of damage to the one or more transportable articles 170 within the vehicle 102.

It should be appreciated that the term VSC is an abbreviation for the term Vehicle Safety Component," and the term APC is an abbreviation for the term "Article Protection Component. It should also be appreciated that the designation "VSC actuator component 130" may refer to the same or a similar type of VSC actuator component as a VSC actuator component with designation "130.x" (e.g., VSC actuator component 130.1, 130.2, etc.). It should further be appreciated that the designation "APC actuator component 160" may refer to the same or a similar type of APC actuator component as an APC actuator component with designation "160.x" (e.g., APC actuator component 160.1, 160.2, etc.).

Figure 1C:
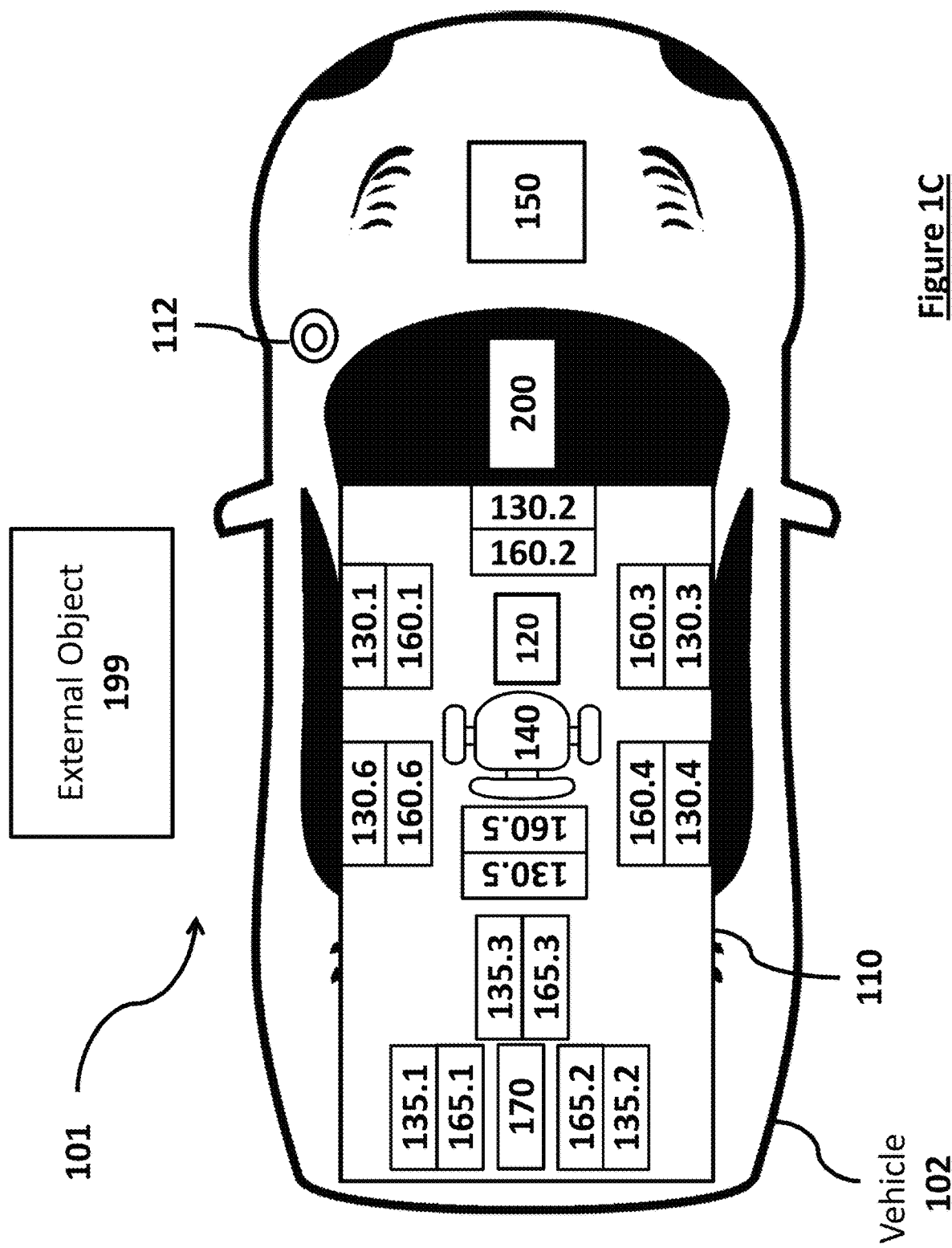
FIG. 1C depicts a block diagram of a second embodiment of a system for improving the safety of one or more vehicle occupants, dynamically protecting one or more transportable articles, and/or controlling operation of a vehicle.

Although the system 100 is shown in FIG. 1A to include one vehicle 102, one external communication component 112, one interior data collection component 120, one VSC actuator component 130, one APC actuator component 135, one interior vehicle component 140, one vehicle operation controller 150, one vehicle safety component 160, one article protection component 165, one transportable article 170, one adjacent object 199, and one vehicle computer 200, it should be understood that different quantities of each may be utilized or present (e.g., see system 101 depicted in FIG. 1C). For example, the system 100 may include a plurality of external communication components 112, all of which may be coupled to the vehicle 102 and in communication with the vehicle computer 200. Additionally, some embodiments of the present invention may include a plurality of VSC actuator components 130/APC actuator components 135 and vehicle safety components 160/article protect components 165, and the processor 202 may select a subset of the plurality of vehicle safety components 160/article protection components 165 to deploy based on data collected corresponding to the interior space (e.g., contents and/or physical configuration) of the vehicle 102. Furthermore, the storage or processing performed by the vehicle 200 may be distributed among a plurality of computers comprising a network.

The vehicle 102 may be an automobile, bus, motorcycle, boat, airplane, train, helicopter, tractor, jet ski, forklift, or other machine employed by a user to travel or transport articles, and may be an autonomous vehicle, a semi-autonomous vehicle, or a fully manual vehicle.

The transportable article 170 is a tangible object/item that may be physically transported by the vehicle 102. The transportable article 170 may be stored in the interior space of the vehicle 102 such as in a storage console, compartment, trunk, and/or other space. In some embodiments, the transportable article 170 may be an item that happens to be present in the vehicle at a particular time (e.g., because a vehicle occupant carried the item onto the vehicle 102). In some embodiments, the transportable article 170 may be affixed to an exterior portion of the vehicle 102 (e.g., the roof, back, and/or undercarriage) for transportation. Examples of the transportable article 170 include, but are not limited to, food, liquids, boxes, packages, clothes, furniture, athletic equipment, electronics, medical supplies, glassware, artwork, sculptures, chemicals, biological specimens, explosive materials, and/or any other tangible item. It should be appreciated that in some embodiments, a plurality of transportable articles 170 may be transported by the vehicle 102. In some embodiments the vehicle 102 may transport multiple of one type of transportable article 170. Conversely, in some embodiments, the vehicle 102 may transport a variety of different types and/or sizes of transportable articles 170. In some embodiments, the transportable article 170 may need to be transported under specific conditions (or within a range of specific conditions) including, but not limited to, temperature, moisture level, light exposure, chemical element exposure, and/or another physical condition to keep the transportable article fresh, unaltered, and/or safe. For example, in embodiments in which the transportable article is perishable food, the food may need to be kept at a cold temperature to ensure that the food remains safe to be consumed.

Referring now back to FIG. 1A, the interior data collection component 120 is configured to collect data corresponding to the interior space of the vehicle 102 (including a physical configuration of the interior space of the vehicle, one or more vehicle occupants within the vehicle 102, and one or more transportable articles 170 within the vehicle), and transmit the collected data to the vehicle computer 200. For example, the interior data collection component 120 may be configured to collect data representing the physical configuration of the interior space of the vehicle 102, or a component of the vehicle 102 (e.g., the location and/or orientation of an interior vehicle component 140); the presence of one or more vehicle occupants in the vehicle 102; the location and/or orientation of the one or more vehicle occupants (e.g., relative to an interior vehicle component 140), the presence of one or more transportable articles 170 in the vehicle 102, and/or one or more characteristic(s) and/or trait(s) of the one or more transportable articles 170.

The interior data collection component 120 may also be configured to collect data indicative of the one or more vehicle occupants' physical characteristics, biometric traits, pre-existing health conditions, and/or any other physiological conditions. The interior data collection component 120 may include one or more sensors, such as an occupancy sensor, a motion sensor, a thermometer, a weight sensor, a pressure sensor, a biometric sensor, a camera, a microphone, and/or any other device equipped to collect data relating to any other measurable event or physical phenomenon within the vehicle 102. The interior data collection component 120 may comprise multiple components. The interior data collection component 120 may include a clock configured to time-stamp the date and time that data is collected by the interior data collection component 120. The interior data collection component 120 may be removably or fixedly installed within the vehicle 102 and may be disposed in various arrangements to collect, for example, interior vehicle configuration data, vehicle occupant data, transportable article data, and/or interior vehicle environment data. The interior data collection component 120 may be a mobile device, conducting electrode, and/or wearable device affixed to one or more vehicle occupants and/or one or more transportable articles in the vehicle 102. The interior data collection component 120 may be housed within, under, above, and/or on an interior vehicle component 140, the vehicle safety component 160, the article protection component 165, and/or another component of the vehicle 102, for example. The interior data collection component 120 may be in hardwired and/or wireless communication with the vehicle computer 200. The interior data collection component 120 may be designed to operate according to predetermined specifications, such as a dedicated short-range communication (DSRC) channel, wireless telephony, Wi-Fi, or other existing or later-developed communications protocols.

The external communication component 112 is configured to collect driving environment data representative of an external environment of the vehicle 102. An external environment is the physical environment and/or space outside of the vehicle 102. The external communication component 112 may be affixed on, to, and/or in the vehicle 102. The external communication component 112 may include one or more of transceivers, GPS units, sensors (e.g., a radar unit, LIDAR unit, motion sensor, ultrasonic sensor, infrared sensor, inductance sensor, camera, microphone, etc.), and/or any other suitable piece(s) of equipment configured to collect data representative of the external environment to the vehicle 102. In some embodiments where the external communication component 112 includes a transceiver, driving environment data may be received using wireless communication technology, such as Bluetooth, Wi-Fi, dedicated short-range communications (DSRC), or other existing or later-developed communications protocols. For those embodiments in which the external communication component 112 includes a sensor, the external communication component 112 may actively or passively scan the external environment of the vehicle for one or more external objects 199.

In some embodiments the external communication component 112 is a microphone configured to recognize external audio input, commands, and/or sounds of windows breaking, air bags deploying, tires skidding, conversations or voices of other drivers and/or pedestrians, music, rain, snow, or wind noise, and/or other sounds heard external to the vehicle 102 that would enable the processor 202 to detect an emergency condition.

Examples of the external object 199 include, but are not limited to, one or more other vehicles, buildings, pedestrians, roadways, overpasses, curbs, guardrails, concrete barriers, lane markings, traffic signs, shrubbery, structures, animals, and/or any other physical element that could come into physical contact with the vehicle 102 and be involved in an accident/crash/collision. In some embodiments, the external communication component 112 may collect data for determining the location, orientation, movement, speed, route, destination, and/or trajectory of external object 199. The external communication component 112 may also be configured to collect, receive, transmit, and/or generate data relating to current, future, and/or past driving conditions, weather conditions, traffic conditions, road integrity, terrain conditions, construction, past/typical driving behavior of an adjacent vehicle, the external object 199, and/or the environment external to the vehicle 102. Data collected, received, or generated by the external communication component 112 may be transmitted to the vehicle computer 200, or a component of the vehicle computer 200.

In some embodiments, the external communication component 112 may include a transceiver configured to receive third party driving environment data from the external object 199, a server, a network, an infrastructure component, and/or another source. The infrastructure components may include smart infrastructure or devices (e.g., sensors, transmitters, etc.) disposed within or communicatively connected to buildings, transportation or other infrastructure, such as roads, bridges, viaducts, terminals, stations, fueling stations, traffic control devices (e.g., traffic lights, toll booths, entry ramp traffic regulators, crossing gates, speed radar, cameras, etc.), bicycle docks, footpaths, or other infrastructure system components. Examples of other sources that may transmit driving environment data to the external communication component 112 include mobile devices (e.g. smart phones, cell phones, lap tops, tablets, phablets, PDAs (Personal Digital Assistants), computers, smart watches, pagers, handheld mobile or portable computing devices, smart glasses, smart electronic devices, wearable devices, smart contact lenses, and/or other computing devices); smart vehicles; dash or vehicle mounted systems or original telematics devices; buildings; pedestrians; public transportation systems; smart street signs or traffic lights; smart infrastructure, roads, or highway systems (including smart intersections, exit ramps, and/or toll booths); smart trains, buses, or planes (including those equipped with Wi-Fi or hotspot functionality); smart train or bus stations; internet sites; aerial, drone, or satellite images; third party systems or data; nodes, relays, and/or other devices capable of wireless RF (Radio Frequency) communications; and/or other devices or systems that capture image, audio, or other data and/or are configured for wired or wireless communication. In some embodiments, the driving environment data collected may be derived from police or fire departments, hospitals, and/or emergency responder communications; police reports;

municipality information; automated Freedom of Information Act requests; and/or other data collected from government agencies and officials.

In some embodiments, if a driver has expressly agreed to participate in a program involving data collection/sharing, the external communication component 112 may also transmit the collected driving environment data to a third party receiver, database, server, infrastructure component, and/or network. In some embodiments, the collected driving environment data may be used to adjust, generate, and/or update an insurance policy, premium, rate, discount, and/or reward for the specific driver, passenger, and/or the insured individual. The external communication component 112 may be originally installed by a manufacturer of the vehicle 102, or installed as an aftermarket modification or addition to the vehicle 102.

The external communication component 112 may include a clock configured to time-stamp the date and time that driving environment data is collected by the external communication component 112.

The actions and/or performance of the vehicle 102 may be dictated based on data corresponding to the physical configuration of the interior space of the vehicle 102, one or more vehicle occupants within the vehicle 102 (e.g., the one or more vehicle occupants' presence, location and/or orientation within the vehicle 102), one or more transportable articles 170 within the vehicle 102, and/or behavior/actions of the one or more vehicle occupants. It should be appreciated that the one or more vehicle occupants may be one or more human beings and/or non-human animals (e.g., dog, cat, horse, hamster, goat, lamb, pig, turtle, fish, frog, alligator, bird, etc.). For such embodiments, vehicle operation data, corresponding to the vehicle 102 and/or its performance, is generated by the vehicle operation controller 150. Examples of vehicle operation data include, but are not limited to, data corresponding to the speed, location, and/or any other performance related parameter of the vehicle 102 and/or one of its components or subsystems. Vehicle operation data may be derived from or otherwise indicative of the vehicle control data, which may be generated by the vehicle operation controller 150 and/or one of its subsystems.

The vehicle operation controller 150 is configured to control the operation of the vehicle 102 and its components, and also, in some embodiments, to generate data corresponding to that operation for use by and/or based on the vehicle computer 200. In some embodiments, the vehicle operation controller 150 may be an autonomous vehicle controller that executes driving decisions, or a system that controls the operations of the vehicle 102 based on manual inputs from a driver (e.g., turning a steering wheel, depressing the gas pedal, etc.). In either embodiment, the vehicle operation controller 150 may control the operation of the vehicle 102 based at least in part on data representing a detected physical configuration of the interior space of the vehicle 102, data representing one or more vehicle occupants, and/or data representing one or more transportable articles 170 within the vehicle 102. The vehicle operation controller 150 may include hardware, firmware and/or software subsystems that control (and possibly monitor) the various operational parameters of the vehicle 102. The vehicle operation controller 150 may be configured to generate and transmit vehicle control data, indicative of the driving decision, to operate the vehicle 102 or one of its subsystems. For example, the vehicle operation controller 150 may transmit vehicle control data to a braking subsystem to control how the brakes of vehicle 102 are applied (e.g., an absolute or relative measure of applied braking force, or a binary indicator of whether the brakes are being applied at all, etc.), a speed subsystem to control how fast the vehicle 102 is being driven (e.g., corresponding to a speedometer reading, an accelerometer measurement, and/or a driver input such as depression of a gas pedal, etc.), and/or a steering subsystem to control how the vehicle 102 is being steered (e.g., based upon the driver's manipulation of a steering wheel, or based upon automated steering control data, etc.). The vehicle operation controller 150 may also include a diagnostics subsystem that generates other information pertaining to the operation of vehicle 102, such as warning/alert information to indicate that one or more components of vehicle 102 is/are in need of replacement, an upgrade, and/or servicing.

In some embodiments, the vehicle operation controller 150 transmits the vehicle operation data (e.g., the raw vehicle control data discussed above, or other data indicative of the vehicle control data) to the vehicle computer 200 in furtherance of the vehicle computer detecting whether the vehicle 102 has taken a specific action. For example, to apply the brakes, the vehicle operation controller 150 may generate a command to apply the brakes, and transmit this command not only to a braking subsystem but also to the vehicle computer 200. As another example, the vehicle operation controller 150 may generate a command to apply the brakes, and also generate a message, for the vehicle computer 200, indicating that such a command was sent to the braking subsystem. In either embodiment, the vehicle computer 200 may then process the command or message to determine whether the vehicle 102 has taken a specific action. The vehicle operation controller 150 may be designed to transmit data to and/or receive data from the vehicle computer 200 according to predetermined specifications, such as a dedicated short-range communication (DSRC) channel, wireless telephony, Wi-Fi, or other existing or later-developed communications protocols.

In other embodiments, a sensing component (such as an accelerometer, tachometer, speedometer, etc.) may generate vehicle operation data based on the sensed operation of the vehicle 102. In such embodiments, these sensors (or related systems) may transmit the vehicle operation data to the vehicle computer 200. In embodiments utilizing a sensing component, the sensing component may be part of the vehicle operation controller 150, a different component of vehicle-based component 110, and/or a separate device (such as a mobile phone) in wired or wireless communication with the vehicle computer 200. The vehicle operation data may include raw sensor data and/or may be preprocessed by the sensing component (or another component) prior to being received as vehicle operation data by the vehicle computer 200. For example, the sensing component may generate vehicle operation data by sensing the positive, negative, and/or lateral acceleration of the vehicle 102, or by sensing the rate at which the wheels are rotating, etc.

FIG. 1B depicts a detailed block diagram of the vehicle computer 200, according to one embodiment. The vehicle computer 200 is configured to receive, transmit, process, analyze, and/or detect data relating to the vehicle 102, the physical configuration of the interior vehicle environment (i.e., the interior space of the vehicle) of the vehicle 102, the environment external to the vehicle 102, one or more vehicle occupants of the vehicle 102, and/or one or more transportable articles 170 within the vehicle 102. The vehicle computer 200 may be configured to monitor/control various features, functions, and components of the vehicle 102. The vehicle computer 200 may comprise one or more processors 202, a transceiver 204, an emergency condition detection module 210, a vehicle action detection module 220, an actuator control module 230, an interior vehicle configuration detection module 240, and a transportable article detection module 250. The vehicle computer 200 may be originally installed by a manufacturer of the vehicle 102, or installed as an aftermarket modification or addition to the vehicle 102. The vehicle computer 200 may be configured to be in communication with the external communication component 112, the interior data collection component 120, the VSC actuator component 130 (or a plurality of VSC actuator components), the APC component 135 (or a plurality of APC actuator components), the interior vehicle component 140, the vehicle operation controller 150, the vehicle safety component 160 (or a plurality of vehicle safety components), and/or the article protection component 165 (or a plurality of article protection components) of FIGS. 1A and 10. The transceiver 204 is configured to receive and transmit data, and may be designed to send and receive information/data according to predetermined specifications, such as a dedicated short-range communication (DSRC) channel, wireless telephony, Wi-Fi, or other existing or later-developed communications protocols. The vehicle computer 200 may include a user interface for one or more vehicle occupants to view, enter, and/or select information pertaining to his/herself, another vehicle occupant, the vehicle 102, the interior configuration of the vehicle 102, one or more transportable articles 170 in the vehicle 102, and/or the environment external to vehicle 102.

The vehicle computer 200 may further include a number of software applications stored in in the program memory of the emergency condition detection module 210, the vehicle action detection module 220, the actuator control module 230, the interior vehicle configuration detection module 240, and/or the transportable article detection module 250. In some embodiments the aforementioned modules may all be stored as software modules within the same program memory. The various software applications on the vehicle computer 200 may include specific programs, routines, or scripts for performing processing functions associated with the methods and functions described herein. While a plurality of modules may be described herein, it should be appreciated that in some embodiments the vehicle computer 200 may include only a subset of these specific modules. Additionally, the various software applications on the vehicle computer 200 may include general-purpose software applications for data processing, database management, data analysis, network communication, web server operation, or other functions described herein or typically performed by a server. The various software applications may be executed on the same processor 202 or on different processors. Additionally, or alternatively, the software applications may interact with various hardware modules that may be installed within or connected to the vehicle 200. Such modules may implement part of all of the various exemplary methods discussed herein or other related embodiments. The memory units discussed herein may include one or more types of memory, including volatile memory (e.g., DRAM, SRAM, etc.), non-volatile memory (ROM, EEPROM, etc.), and/or secondary storage (e.g., hard drive, solid state, etc.).

The emergency condition detection module 210 is configured to receive, store, and analyze data to determine whether an emergency condition has been detected. Examples of an emergency condition which the processor 202 may be configured to detect include, but are not limited to, an impending automobile accident, a nearby automobile accident that involves one or more other vehicles and has already occurred, a weather condition, a traffic condition, a road integrity condition, a terrain condition, road construction, a fire (within the vehicle and/or external to the vehicle), existence of a harmful substance within the vehicle, a vehicle emission condition, an interior vehicle condition, and/or any other condition that may pose a risk to, or change the nature of the risk to, the operation of the vehicle 102, the safety of one or more vehicle occupants riding in the vehicle 102, and/or the safety of one or more transportable articles 170 in the vehicle 102. The emergency condition detection module 210 may include a driving environment data storage 212, an emergency condition detection program memory 214, and an emergency condition detection criteria data storage 216. The driving environment data storage 212 is configured to store the driving environment data received, via the transceiver 204, from the external communication component 112. The emergency condition detection program memory 214 stores program instructions for detecting one or more emergency conditions based on the driving environment data collected by the external communication component 112. The emergency condition detection program may comprise one or more algorithms, machine learning techniques, data comparison, and/or other techniques for detecting an emergency condition based on the driving environment data. In some embodiments, an emergency condition may be detected based on criteria data stored in the emergency condition detection criteria data storage 216, indicative of a threshold and/or other criteria defining when a particular emergency condition exists.

Examples of a weather condition which the processor 202 may be configured to detect include, but are not limited to, rain, snow, hail, sleet, ice, fog, clouds, wind, and/or excess sun. Examples of a traffic condition which the processor 202 may be configured to detect include heavy traffic, vehicle congestion levels, bumper-to-bumper traffic, an accident, a traffic sign (such as a stop sign), presence of pedestrians, pedestrian congestion levels, a traffic light and its current condition (e.g. green, yellow, or red), a closed street, a speed limit, an intersection, a tight turn, and/or any other detectable driving related condition. Examples of a road integrity condition which the processor 202 may be configured to detect include, but are not limited to, a pothole, unpaved road, speed control device, road slipperiness, road firmness, and/or any other detectable condition related to the physical condition of a road. Examples of a terrain condition which the processor 202 may be configured to detect include, but are not limited to, road slope, rolling hills, mountains, desert terrain, beach terrain, city driving conditions, rural driving conditions, a winding road, lane width, and/or any other detectable conditions that may affect operation of the vehicle 102 on a road.

In analyzing the driving environment data to detect an emergency condition, the processor 202 may analyze historical accident information and/or test data involving vehicles having autonomous or semi-autonomous functionality. Factors that may be analyzed and/or accounted for by the processor 202 may include, but are not limited to, points of impact, vehicle type/style, vehicle behavior, vehicle speed, type of road, time of day, type/length of trip, level of pedestrian traffic, level of vehicle congestion, and/or other factors that could affect the likelihood of a crash. The processor 202 may weigh certain factors according to historical accident information, predicted accidents, vehicle trends, test data, and/or other considerations.

The vehicle action detection module 220 is configured to receive and analyze vehicle operation data (e.g., vehicle control data, or other data indicative of the vehicle control data) from the vehicle operation controller 150, and/or or another component of the vehicle 102 (e.g., one or more sensors of the vehicle 102), in order to determine whether the vehicle 102 has taken a specific action. Examples of a specific action which the processor 202 may be configured to detect include, but are not limited to, the vehicle 102 accelerating, decelerating, turning, braking, changing lanes, merging, moving in reverse, and/or any other physical movement by the vehicle 102, any of its systems, and/or any of its components. The vehicle action detection module 220 may include a vehicle operation data storage 222, a vehicle action detection program memory 224, and a vehicle action detection criteria memory 226. The vehicle operation data storage 222 may store vehicle operation data received from the vehicle operation controller 150 and/or one or more vehicle sensors. The vehicle detection program memory 224 may be configured to store program instructions for detecting the specific action based on the vehicle operation data.

The interior vehicle configuration detection module 240 is configured to receive and analyze interior vehicle configuration data from the interior data collection component 120, and/or or another component of the vehicle 102 (e.g., one or more additional sensors of the vehicle 102), in order to determine the physical configuration of the interior space of the vehicle 102, contents of the vehicle 102, and/or behavior/actions of one or more vehicle occupants within the vehicle 102. The interior vehicle configuration detection module 240 may include an interior vehicle configuration data storage 242, an interior vehicle configuration detection program memory 244, an interior vehicle configuration detection criteria memory 246, and an interior vehicle environment data storage 248. The interior vehicle configuration data storage 242 may store interior vehicle configuration data received from the interior data collection component 120 and/or one or more vehicle sensors. The interior vehicle configuration detection program memory 244 may be configured to store program instructions for detecting the physical configuration of the interior space of the vehicle 102, contents of the vehicle 102, and/or behavior/actions of one or more vehicle occupants within the vehicle 102 based on the interior vehicle configuration data. The interior vehicle environment data storage 248 may store interior vehicle environment data, received from the interior data collection component 120, corresponding to changes in the physical environment of the interior space of the vehicle.

In some embodiments, interior vehicle configuration data may be gathered via devices employing wireless communication technology, such as Bluetooth or other IEEE communication standards, and then transmitted to the interior vehicle configuration data storage 242. The interior vehicle configuration data associated with the physical configuration of the interior space of the vehicle 102, contents of the vehicle 102, and/or behavior/actions of one or more vehicle occupants within the vehicle 102 that are gathered or collected in the vehicle 102 may be wirelessly transmitted to interior vehicle configuration data storage 242 and/or a remote server (such as a remote processor or server associated with an insurance provider, if a driver has expressly agreed to participate in a program involving data collection/sharing). In an example of this embodiment, a Bluetooth enabled smartphone or mobile device, carried by a vehicle occupant riding in the vehicle 102, may collect interior vehicle configuration data indicative of the physical configuration of the interior space of the vehicle 102 and transmit the collected interior vehicle configuration data in real-time to the vehicle computer 200 to be analyzed.

The transportable article detection module 250 is configured to receive and analyze transportable article data from the interior data collection component 120, and/or or another component of the vehicle 102 (e.g., one or more additional sensors of the vehicle 102), in order to determine one or more characteristic(s) and/or trait(s) of one or more transportable articles 170 within the vehicle 102. The transportable article detection module 250 may include a transportable article data storage 252, a transportable article detection program memory 254, and a transportable article detection criteria memory 256. The transportable article data storage 252 may store transportable article data received from the interior data collection component 120 and/or one or more vehicle sensors. The transportable article data may be indicative of one or more characteristic(s) and/or trait(s) of the one or more transportable articles 170. Examples of transportable article data include, but are not limited to the type, monetary value, material, height, length, width, size, weight, age, owner, sender, intended recipient, proper/recommended storage temperature (or range of temperature values), date to be sold by, preferred location and/or orientation within the vehicle 102, and/or any other information related to the one or more transportable articles 170 and/or the safe transportation of the one or more transportable articles 170. In some embodiments, transportable article data may be received by a transceiver of the interior data collection component 120, and/or transmitted to the vehicle computer 200, from a third party device, server, network, or other remote database. The transportable article detection program memory 254 may be configured to store program instructions for detecting, based on the transportable article data, one or more characteristic(s) and/or trait(s) of the one or more transportable articles 170. In some embodiments, one or more characteristic(s) and/or trait(s) of the one or more transportable articles 170 may be detected based on criteria data stored in the transportable article detection criteria data storage 256, indicative of a threshold and/or other criteria defining when a particular emergency condition exists.

In some embodiments, transportable article data may be gathered by the interior data collection component 120 via devices employing wireless communication technology, such as Bluetooth or other IEEE communication standards, and then stored in the transportable article data storage 252. The transportable article data may also be transmitted to a remote server (such as a remote processor or server associated with an insurance provider, if a driver has expressly agreed to participate in a program involving data collection/sharing).

The actuator control module 230 may be configured to determine which vehicle safety component(s) 160 to deploy, the manner in which to deploy the vehicle safety component(s) 160, and to cause the VSC actuator component(s) 130 to deploy the vehicle safety component(s) 160 in response to the emergency condition being detected and/or the vehicle 102 taking a specific action. The vehicle safety component 160 is a physical element, unit, device, and/or apparatus, contained or accessible from within the vehicle 102, that is configured to reduce the risk of injury to the one or more vehicle occupants. The actuator component module 230 may also be configured to determine which article protection component(s) 165 to deploy, to determine the manner in which to deploy the article protection component(s) 165, and to cause the APC actuator component(s) 135 to deploy the article protection component(s) 165 in response to the emergency condition being detected and/or the vehicle 102 taking a specific action. The article protection component 165 is a physical element, unit, device, and/or apparatus, contained or accessible from within the vehicle 102, that is configured to reduce the risk of damage to one or more transportable articles 170.

The actuator control module 230 may include an actuator program memory 232, a vehicle safety component configuration data storage 234, an article protection component data storage 236, and/or vehicle occupant data storage 238. The actuator program memory 232 may include program instructions that are executed to cause the VSC actuator component(s) 130 to deploy the vehicle safety component(s) 160, cause the APC component(s) 135 to deploy the article protection component(s) 165, cause the VSC actuator component(s) 130 to deploy the vehicle safety component(s) 160 in a specific manner, and/or cause the APC actuator component(s) 135 to deploy the article protection component(s) 165 in a specific manner.

Data corresponding to physical configuration(s) of the vehicle safety component(s) 160, which vehicle safety component(s) 160 to deploy, and/or a manner in which to deploy the vehicle safety component(s) 160 may be stored in the vehicle safety component configuration data storage 234. For example, the vehicle safety component configuration data storage 234 may contain data indicative of a default physical configuration, a current/initial physical configuration, a physical configuration set by one or more vehicle occupants, and/or a set of potential physical configurations to which the vehicle safety component(s) 160 may be adjusted in response to detecting a specific emergency condition and/or the vehicle 102 taking a specific action. In some embodiments, vehicle safety component configuration data may correspond to a range of physical configurations that the vehicle safety component(s) 160 may be adjusted or limited/restricted to in response to the processor 202 detecting (and/or for as long as the processor 202 detects) the vehicle 102 taking a specific action. In some embodiments, the physical configuration of the vehicle safety component(s) 160, which vehicle safety component(s) 160 to deploy, and/or a manner in which to deploy the vehicle safety component(s) 160 may be predetermined, determined in real-time, determined in response to vehicle occupant data stored in the vehicle occupant data storage 238, and/or determined in response to the processor 202 detecting an emergency condition and/or detecting the vehicle 102 has taken a specific action.

In determining which vehicle safety component(s) 160 to deploy and/or the manner in which to deploy the vehicle safety component(s) 160, the processor 202 may take into account the preferences and/or one or more characteristic(s) and/or trait(s) of the one or more vehicle occupants. The vehicle occupant data storage 238 may contain data indicative of one or more vehicle occupants' physical characteristics, biometric traits, pre-existing health conditions, mental health status, and/or any other physiological conditions. Examples of a vehicle occupant's preferences may include a vehicle occupant's selected and/or preferred mode of operation of the vehicle 102; activity/behavior within the vehicle 102; and/or physical location and/or orientation within the interior space of the vehicle 102. Examples of vehicle occupant data include, but are not limited to, type of vehicle occupant (e.g., human, dog, cat, horse, snake, etc.), height, weight, gender, age, education level, profession, disabilities/impairments/limitations, and/or pregnancy status. In some embodiments, vehicle occupant data is collected using the interior data collection component 120 and/or transmitted to the vehicle computer 200 from a third party device, server, network, or other remote database.

Data corresponding to one or more article protection component(s) 165 may be stored in the article protection component data storage 236. Data corresponding to the one or more article protection component(s) 165 may include, but is not limited to, a physical configuration (i.e., the location and/or orientation) of the one or more article protection component(s) 165, the selected subset of the article protection component(s) 165 to deploy, and/or a manner in which to deploy the selected subset of the article protection component(s) 165. For example, the article protection component data storage 236 may contain data indicative of a default physical configuration, a current/initial physical configuration, a physical configuration set by one or more vehicle occupants, and/or a set of potential physical configurations to which the article protection component(s) 165 may be adjusted in response to detecting a specific emergency condition and/or the vehicle 102 taking a specific action. In some embodiments, article protection component configuration data may correspond to a range of physical configurations that the article protection component(s) 165 may be adjusted or limited/restricted to in response to the processor 202 detecting (and/or for as long as the processor 202 detects) the vehicle 102 taking a specific action.

The VSC actuator component 130 is configured to mechanically control movement of one or more mechanisms of the vehicle safety component 160 in order to reduce the risk of injury to one or more vehicle occupants. The VSC actuator component 130 may use electronic, pneumatic, hydraulic, thermal, and/or magnetic means to mechanically operate the vehicle safety component 160. The VSC actuator component 130 may adjust the entire vehicle safety component 160 or a part/section of the vehicle safety component 160. The VSC actuator component 130 may be configured to receive a command, or a message/signal indicative of a command, from the actuator control module 230, to deploy the vehicle safety component 160 in response the vehicle computer 200 detecting an emergency condition and/or detecting the vehicle 102 taking a specific action. In some embodiments, the actuator control module 230 generates an analog or digital power signal to control the VSC actuator component 130. The VSC actuator component 130 may be configured to mechanically adjust the physical configuration (e.g., location, orientation, etc.) of the vehicle safety component 160.

Deploying the vehicle safety component 160 may entail adjusting the physical configuration of the vehicle safety component 160. Examples of adjusting the physical configuration of the vehicle safety component 160 include, but are not limited to, adjusting a yaw angle, pitch angle, and/or roll angle of the vehicle safety component 160. Other examples of adjusting the physical configuration include, but are not limited to, moving the vehicle safety component 160 in at least one of a forward, backward, upward, downward, outward, inward, clockwise, counterclockwise, or lateral direction relative to the vehicle 102. The VSC actuator component 130 may be configured to tighten or loosen the vehicle safety component 160. In one example, when the vehicle safety component 160 is an airbag, in response to a detecting the vehicle 102 is going to be in a head-on collision, the VSC actuator component 130 may move the airbag outwards toward a vehicle occupant seated within the vehicle 102 to reduce the risk of the vehicle occupant experiencing whiplash and/or broken bones, tissue damage, and/or another injury caused by the collision.

Examples of the VSC actuator component 130 include, but are not limited to, a motor, gear, spring, or other device configured to move a seat, engage/disengage a seatbelt, tighten/loosen a seatbelt, roll up/down a window, open/close a sunroof, lock/unlock a vehicle door, lock/unlock an interior compartment, move an airbag, and/or operate any other vehicle safety component 160 to reduce the risk of injury to one or more vehicle occupants. The VSC actuator component 130 may be originally installed by a manufacturer of the vehicle 102, or installed as an aftermarket modification or addition to the vehicle 102.

In some embodiments, the VSC actuator component 130 may include a Stewart strut system (i.e., a Stewart platform) disposed on a moveable platform with one or more legs of adjustable length. In such embodiments, when the processor 202 detects the vehicle 102 is taking a sharp turn, for example, the Stewart strut VSC actuator component 130 may lengthen one or more of its legs and/or shorten some of its legs to adjust the physical configuration of the vehicle safety component 160 in order to prevent one or more vehicle occupants suffering an injury as a result of the vehicle 102 taking the sharp turn.

In some embodiments, such as the system 101 depicted in FIG. 1C, a plurality of VSC actuator components 130.1, 130.2, 130.3, 130.4, 130.5, and 130.6 may be utilized to control a plurality of vehicle safety components 160.1, 160.2, 160.3, 160.4, 160.5, and 160.6, respectively. In some embodiments, different VSC actuator components may be employed to deploy different types of vehicle safety components. In one embodiment, for example, VSC actuator component 130.1 may be configured to deploy a restraint device (vehicle safety component 160.1), whereas VSC actuator component 130.2 may be configured to deploy an airbag (vehicle safety component 160.2). Therefore, it should be appreciated that the VSC actuator components 130 may also differ in type.

In both the system 100 of FIG. 1A and the system 101 of FIG. 1C, the one or more VSC actuator component(s) 130 may be configured to receive a command, message, and/or signal from the actuator control module 230 to prevent the one or more vehicle safety component(s) 160 from being adjusted or moved beyond a predetermined range of physical configurations. For example, the actuator control module 230 may transmit a signal to the VSC actuator component(s) 130 corresponding to a range of permissible positions to which the VSC actuator component(s) 130 may move the vehicle safety component(s) 160, thereby restricting the VSC actuator component(s) 130 from moving the vehicle safety component(s) 160 to any position outside that range. In some embodiments, for example, the actuator control module 230 causes the VSC actuator component(s) 130 to prevent one or more vehicle occupants from manually adjusting the vehicle safety component(s) 160 (or a component thereof). In some embodiments, restricting movement of the one or more vehicle safety component(s) 160 entails reinforcing and/or strengthening the physical support system of the vehicle safety component(s) 160.

In other embodiments, the VSC actuator component 130 may include a locking mechanism configured to restrict movement of the vehicle safety component 160. For example, when the VSC actuator component 130 is a Stewart strut system, movement of one or more of the Stewart strut system's legs may be restricted using a locking mechanism, thereby keeping one or more legs confined to a specific length, to prevent the vehicle safety component 160 from moving in a certain manner.

The APC actuator component 135 is configured to mechanically control movement of one or more mechanisms of the article protection component 165 in order to reduce the risk of damage to the one or more transportable articles 170. The APC actuator component 135 may use electronic, pneumatic, hydraulic, thermal, and/or magnetic means to mechanically operate the article protection component 165. The APC actuator component 135 may adjust the entire article protection component 165 or a part/section of the article protection component 165. The APC actuator component 135 may be configured to receive a command, or a message/signal indicative of a command, from the actuator control module 230, to deploy the article protection component 165 in response the vehicle computer 200 determining one or more characteristic(s) and/or trait(s) of the one or more transportable articles 170, and/or modify/adjust the state of the article protection component 165 in response to the vehicle computer 200 detecting an emergency condition and/or detecting the vehicle 102 taking a specific action. In some embodiments, the actuator control module 230 generates an analog or digital power signal to control the APC actuator component 135. The APC actuator component 135 may be configured to mechanically adjust the physical configuration (e.g., location, orientation, etc.) of the article protection component 165.

Deploying the article protection component 165 may entail modifying/adjusting the physical configuration and/or state of the article protection component 165. Examples of modifying/adjusting the physical configuration of the article protection component 165 include, but are not limited to, adjusting a yaw angle, pitch angle, and/or roll angle of the article protection component 165. Other examples of adjusting the physical configuration include, but are not limited to, moving the article protection component 165 in at least one of a forward, backward, upward, downward, outward, inward, clockwise, counterclockwise, or lateral direction relative to the vehicle 102. Examples of modifying/adjusting the state of the article protection component 165 include, but are not limited to, changing the temperature, humidity, oxygen levels, and/or light exposure within the interior space of the vehicle 102. The APC actuator component 135 may be configured to tighten or loosen the article protection component 165. For example, when the article protection component 165 is a restraint device, in response to a detecting the vehicle 102 is making a sharp turn, the APC actuator component 135 may cause the restraint device to tighten to reduce the risk of one or more transportable articles 170 tipping, sliding, toppling, and/or otherwise being damaged as a result of the vehicle 102 taking the sharp turn.

Examples of the APC actuator component 135 include, but are not limited to, a motor, gear, spring, or other device configured to move a seat, engage/disengage a seatbelt, tighten/loosen a seatbelt, roll up/down a window, open/close a sunroof, lock/unlock a vehicle door, lock/unlock an interior compartment, deploy an airbag, and/or operate any other article protection component 165 to reduce the risk of damage to one or more transportable article. The APC actuator component 135 may be originally installed by a manufacturer of the vehicle 102, or installed as an aftermarket modification or addition to the vehicle 102.

In some embodiments, the APC actuator component 135 may include a Stewart strut system (i.e., a Stewart platform) disposed on a moveable platform with one or more legs of adjustable length. In such embodiments, when the processor 202 detects the vehicle 102 is taking a sharp turn, for example, the Stewart strut APC actuator component 135 may lengthen one or more of its legs and/or shorten some of its legs to adjust the physical configuration of the APC actuator component 165 in order to prevent damage to the transportable article 170 caused by the vehicle 102 taking the sharp turn.

In some embodiments, such as the system 101 depicted in FIG. 1C, a plurality of APC actuator components 135.1, 135.2 and 135.3 may be utilized to control a plurality of article protections components 165.1, 165.2, and 165.3, respectively. In some embodiments different APC actuator components may be employed to deploy different types of article components. In one embodiment, for example, APC actuator component 135.1 may be configured to control a restraint device (article protection 165.1), whereas APC actuator component 135.2 may be configured to control a temperature control device (article protection component 165.2) and APC actuator component 135.3 may be configured to control an impact dampening pad (article protection component 165.3). Therefore, it should be appreciated that the APC actuator components 135 may also differ in type.

In both the system 100 of FIG. 1A and the system 101 of FIG. 1C, the one or more APC actuator component(s) 135 may be configured to receive a command, message, and/or signal from the actuator control module 230 to prevent the one or more article protection component(s) 165 from being adjusted or moved beyond a predetermined range of physical configurations. For example, the actuator control module 230 may transmit a signal to the APC actuator component(s) 135 corresponding to a range of permissible positions to which the APC actuator component(s) 135 may move the article protection component(s) 165, thereby restricting the actuator component(s) 135 from moving the article protection component(s) 165 to any position outside that range. In some embodiments, restricting movement of the article protection component(s) 165 entails reinforcing and/or strengthening the physical support system of the article protection component(s) 165.

In other embodiments, the APC actuator component 135 may include a locking mechanism configured to restrict movement of the article protection component 165. For example, when the actuator component 135 is a Stewart strut system, movement of one or more of the Stewart strut system's legs may be restricted using a locking mechanism, thereby keeping one or more legs confined to a specific length, to prevent the article protection component 165 from moving in a certain manner.

The interior vehicle component 140 is a physical element, unit, device, and/or apparatus contained or accessible from within the vehicle 102. The interior vehicle component 140 may be originally installed by a manufacturer of the vehicle 102, installed as an aftermarket modification or addition to the vehicle 102, Examples of the interior vehicle component 140 include, but are not limited to, a seating apparatus, a bed, computer, mobile device, steering wheel, a mirror, window, a door, a hardtop convertible roof, a soft-top convertible roof, a floor panel, a visor, partition, sunroof, sky roof, user interface, control panel, head rest, arm rest, back rest, storage console, beverage holder, foot rest, bed, desk, work surface, and/or other element. In some embodiments, the interior vehicle component 140 may be a component that is accessible from the interior and exterior of the vehicle 102, such as a vehicle door or window.

The interior data collection component 120 may collect data corresponding to the physical configuration of the interior vehicle component 140, before and/or during operation of the vehicle 102, so that the processor 202 has reference data from which to evaluate which vehicle safety component 160 to deploy, where to deploy the vehicle safety component 160, how to deploy the vehicle safety component 160, and/or whether one or more vehicle occupants are at risk of sustaining an injury if an external condition is detected and/or the vehicle 102 takes a specific action. The physical configuration of the interior vehicle component 140 may be set by a manufacturer, the vehicle computer 200 (or a component of the vehicle computer 200), or manually by an end user such as a vehicle occupant. In response to the vehicle computer 200 detecting an emergency condition and/or detecting the vehicle 102 has taken a specific action, the VSC actuator component 130 may deploy the vehicle safety component 160 relative to the detected physical configuration of the interior vehicle component(s) 140 in order to reduce the risk of injury to one or more vehicle occupants riding in the vehicle 102.

The vehicle safety component 160 may be configured to be deployed, by the VSC actuator component 130, in response to the vehicle computer 200 detecting an emergency condition and/or detecting the vehicle 102 taking a specific action. The vehicle safety component 160 may be deployed by having its physical configuration adjusted, or its movement restricted, to improve the safety of, prevent injury to, reduce the risk of injury/damage to, minimize injury/damage to, and/or to protect one or more vehicle occupants riding in/on the vehicle 102 and/or transportable articles 170 being transported by the vehicle 102. For example, in an embodiment in which the vehicle safety component 160 is an airbag, the airbag may be deployed in response to the processor 202 detecting an impending collision between the vehicle 102 and an external object 199. In another example in which the vehicle safety component 160 is a seatbelt, in response to detecting an impending collision, the VSC actuator component 130 may restrict the seatbelt's physical configuration (e.g., a physical configuration that restrains a vehicle occupants) so that the vehicle occupant is not displaced, and the vehicle occupant injured, as a result of the imminent collision impact.

The vehicle safety component 160 may be originally installed by a manufacturer of the vehicle 102, installed as an aftermarket modification or addition to the vehicle 102, or may be an item that happens to be present in the vehicle at a particular time (e.g., because one or more vehicle occupants carried the vehicle safety component 160 into/onto the vehicle 102). Examples of the vehicle safety component 160 include, but are not limited to an airbag, seatbelt, pillow, pad, cushion, partition, chemical flushing agent, fire-extinguishing agent, gasmask, oxygen-providing/regulating device, fire safety device, parachute, flotation device, net, non-human animal restraint device, non-human animal cage, storage module, and/or other element. In some embodiments, the vehicle safety component 160 may be a component that is accessible from the interior and exterior of the vehicle 102. In some embodiments, the vehicle safety component 160 may be contained wholly or partially within the front, back, left side, right side, ceiling, and/or floor of the vehicle 102, or a component of vehicle 102. In some embodiments, the vehicle safety component 160 may be wholly or partially contained within, on, under, and/or above an object/article contained within the vehicle 102 (e.g., the interior vehicle component 140), or a component of the vehicle 102.

In some embodiments, the vehicle 102 may contain just one vehicle safety component 160 (or one of a specific type of vehicle safety component 160), that has its physical configuration adjusted based on the physical configuration of the interior space of the vehicle 102, contents of the vehicle 102, and/or behavior/actions of one or more vehicle occupants within the vehicle 102. Accordingly, the vehicle safety component 160 may be in a first physical configuration prior to the vehicle computer 200 detecting the physical configuration of the interior space of the vehicle 102. The interior data collection component 120 may collect data corresponding to the physical configuration of the interior space of the vehicle 102, before and/or during operation of the vehicle 102, so that the processor 202 has reference data from which to evaluate where to move the vehicle safety component 160 and/or how to deploy the vehicle safety component 160 to reduce the risk of one or more vehicle occupants sustaining an injury if a hazardous driving condition is detected and/or the vehicle 102 takes a specific action.

Conversely, in some embodiments, the vehicle 102 may contain a plurality of vehicle safety components (e.g., vehicle safety components 160.1, 160.2, 160.3, 160.4, 160.5, and 160.6 of FIG. 1C). The plurality of vehicle safety components may include different types of vehicle safety components, and/or multiple of each of a specific type of vehicle safety component, such as an airbag and a seatbelt, or six airbags, etc. The processor 202 determines which vehicle safety component(s) 160 to deploy based on the physical configuration of the interior space of the vehicle 102, contents of the vehicle 102, and/or behavior/actions of one or more vehicle occupants within the vehicle 102. In embodiments in which the vehicle 102 contains a plurality of vehicle safety components 160 (e.g., as in FIG. 1C), the processor 202 may select a subset, from the plurality of vehicle safety components 160, to set to an active state such that when an emergency condition is detected or the vehicle 102 takes a specific action, the processor 202 causes a plurality of VSC actuator components 130 to deploy the selected subset of the vehicle safety components 160. In some embodiments, the interior data collection component 120 may collect data corresponding to the locations and/or orientations of one or more vehicle occupants of the vehicle 102, before and/or during operation of the vehicle 102, so that the processor 202 may determine which vehicle safety component(s) 160 to select and/or deploy to reduce the risk of injury to the vehicle occupants.

The physical configuration of the vehicle safety component(s) 160 may be set by a manufacturer, the vehicle computer 200 (or a component of the vehicle computer 200), or manually by an end user or vehicle occupant. In response to the vehicle computer 200 detecting an emergency condition and/or detecting the vehicle 102 has taken a specific action, the VSC actuator component 130 may deploy the vehicle safety component 160 in order to reduce the risk of injury to one or more vehicle occupants riding in the vehicle 102. In some embodiments, the safety component 160 may be configured to restrict the movement of one or more vehicle occupants while inside the vehicle 102.

In some embodiments, the physical configuration of the vehicle safety component 160 may not be deployed, in response to the processor 202 detecting an emergency condition and/or detecting the vehicle 102 has taken a specific action, because the processor 202 determines that one or more vehicle occupants is not at risk of sustaining an injury, and/or that the current physical configuration of the vehicle safety component 160 is already sufficient to reduce the risk of injury to the one or more vehicle occupants. For example, in embodiments in which the vehicle safety component is a seatbelt, the processor 202 may determine that the vehicle 102 is going to collide with an external object. However, the current physical configuration of the seatbelt may nonetheless be maintained because the processor 202 has determined that a vehicle occupant is already sufficiently restrained by the seatbelt, and thus the seatbelt is already in the best physical configuration to protect the vehicle occupant.

The article protection component 165 may be configured to be deployed, by the APC actuator component 135, in response to the vehicle computer 200 determining one or more characteristic(s) and/or trait(s) on the one or more transportable articles in the vehicle 102. The article protection component 165 may be configured to be adjusted, by the APC actuator component 135, in response to the vehicle computer 200 detecting an emergency condition and/or detecting the vehicle 102 taking a specific action. The article protection component 165 may be deployed by having its physical configuration adjusted, or its movement restricted, to improve the safety of, prevent damage to, reduce the risk of damage to, minimize damage to, and/or to protect one or more transportable articles 170 being transported by the vehicle 102. For example, in an embodiment in which the article protection component 165 is an impact dampening pad, the impact dampening pad may be deployed in response to the processor 202 detecting an impending collision between the vehicle 102 and an external object 199. Whereas in another example in which the article protection component 165 is a restraint device, in response to determining one or more characteristic(s) and/or trait(s) of a transportable article 170, the APC actuator component 135 may engage the restraint such that the transportable article 170 does not move, and thus is not damaged, while the vehicle 102 transports the transportable article 170. Further, in such an embodiment, the restraint device may be adjusted, after being initially deployed, in response to the processor 202 detecting an emergency condition in order to protect the transportable article 170 from suffering damage as a result of the emergency condition.

The article protection component 165 may be originally installed by a manufacturer of the vehicle 102, installed as an aftermarket modification or addition to the vehicle 102, or may be an item that happens to be present in the vehicle at a particular time (e.g., because one or more vehicle occupants carried the article protection component 165 into/onto the vehicle 102). Examples of the article protection component 165 include, but are not limited to an airbag, restraint device, struts, temperature control devices, humidity control devices, light exposure control components, pillow, pad, cushion, partition, chemical flushing agent, fire-extinguishing agent, fan, oxygen-providing/regulating device, fire protection device, parachute, flotation device, net, storage module, and/or other element. In some embodiments, the article protection component 165 may be a component that is accessible from the interior and exterior of the vehicle 102. In some embodiments, the article protection component 165 may be contained wholly or partially within the front, back, left side, right side, ceiling, and/or floor of the vehicle 102, or a component of vehicle 102. In some embodiments, the article protection component 165 may be wholly or partially contained within, on, under, and/or above an object/article contained within the vehicle 102 (e.g., the interior vehicle component 140), or a component of the vehicle 102.

In some embodiments, the vehicle 102 may contain just one article protection component 165 (or one of a specific type of article protection component 165), that has its physical configuration adjusted based on the one or more characteristic(s) and/or trait(s) of the one or more transportable articles 170. Accordingly, the article protection component 165 may be in a first physical configuration prior to the vehicle computer 200 detecting the physical configuration of the interior space of the vehicle 102. The interior data collection component 120 may collect data corresponding to the one or more characteristic(s) and/or trait(s) of the one or more transportable articles 170, before and/or during operation of the vehicle 102, so that the processor 202 has reference data from which to evaluate where to move the article protection component 165, and/or how to deploy the article protection component 165, to reduce the risk of the one or more transportable articles 170 becoming damaged when an emergency condition is detected and/or the vehicle 102 takes a specific action.

Conversely, in some embodiments, the vehicle 102 may contain multiple article protection components 165 (e.g., different types of article protection components 165 and/or multiple of a specific type of article protection component 165, such as an impact dampening pad and a restraint device, or six impact dampening pads, etc.), and the processor 202 determines which article protection component(s) 165 to deploy based on the determined one or more characteristic(s) and/or trait(s) of the one or more transportable articles 170 within the vehicle 102. In embodiments in which the vehicle 102 contains a plurality of article protection components 165 (e.g., article protections components 165.1,165.2, and 165.3 of FIG. 1C), the processor 202 may select a subset, from the plurality of article protection components 160, to deploy. Accordingly, the interior data collection component 120 may collect data corresponding to the one or more transportable articles 170, before and/or during operation of the vehicle 102, so that the processor 202 can determine which article protection component(s) 165 to deploy/modify/adjust in order to reduce the risk of damage to the one or more transportable articles 170.

The physical configuration of the article protection component(s) 165 may be set by a manufacturer, the vehicle computer 200 (or a component of the vehicle computer 200), or manually by an end user or vehicle occupant. In response to the vehicle computer 200 detecting an emergency condition and/or detecting the vehicle 102 has taken a specific action, the APC actuator component 135 may deploy/adjust the article protection component 165 in order to reduce the risk of damage to the one or more transportable articles 170. In some embodiments, the safety component 165 may be configured to restrict the movement of the one or more transportable articles 170 while inside the vehicle 102.

In some embodiments, the article protection component 165 may not be deployed, or the physical configuration of the article protection component 165 may not be modified/adjusted, in response to the processor 202 detecting an emergency condition and/or detecting the vehicle 102 has taken a specific action, because the processor 202 determines that one or more transportable articles 170 are not at risk of sustaining damage, and/or that the current physical configuration of the article protection component 165 is sufficient to protect/reduce the risk of damage to the one or more transportable articles 170. For example, in embodiments in which the article protection component is a restraint device, the processor 202 may determine that the vehicle 102 is going to collide with an external object. However, the current physical configuration of the restraint may nonetheless be maintained because the processor 202 has determined that a transportable article 170 is already sufficiently secured by the restraint device, and thus the restraint device is already in the best physical configuration to protect the transportable article 170.

Example Systems for Improving Safety of One or More Vehicle Occupants

In one embodiment of the system 101, as depicted in FIG. 1C, prior to and/or during operation of the vehicle 102, the interior data collection component 120 collects interior vehicle configuration data that is indicative of an interior space of the vehicle 102, and/or vehicle occupant data that corresponds to one or more vehicle occupants riding in the vehicle 102. The processor 202 stores the interior vehicle configuration data in the interior vehicle configuration data storage 234 and stores the vehicle occupant data in the vehicle occupant data storage 238. Both of these kinds of data are collected so that the processor may select a subset of a plurality of vehicle safety components (i.e., a subset of the plurality of vehicle safety components 160.1, 160.2, 160.3, 160.4, 160.5, and 160.6) to be active. This data may also be collected so that the processor 202 has a reference point of pertinent information for assessing whether one or more vehicle occupants riding in the vehicle 102 are at risk of sustaining an injury while in the vehicle 102.

After the processor 202 selects the subset of the plurality of vehicle safety components (e.g., at least one of vehicle safety components 160.1, 160.2, 160.3, 160.4, 160.5, and 160.6), the processor sets the subset of the plurality of vehicle safety components to be in an active state so that the selected subset of the plurality of vehicle safety components may be deployed, in order to protect the one or more vehicle occupants, when an emergency condition is detected. Thereafter, the external communication component 112 collects driving environment data and transmits the driving environment data to the vehicle computer 200. The vehicle computer 200 receives the driving environment data via the transceiver 204, and the processor 202 stores the driving environment data in the driving environment data storage 212. After the driving environment data is collected, received, and stored in the driving environment data storage 212, the processor 202 executes an emergency condition detection program, stored in the emergency condition detection program memory 214, which is configured to analyze the driving environment data to determine whether an emergency condition exists.

When the processor 202 detects the emergency condition, the processor 202 executes an actuator program stored in the actuator program memory 232 to cause one or more VSC actuator components (e.g., 130.1, 130.2, 130.3, 130.4, 130.5, and 130.6 of FIG. 1C) corresponding to the selected subset of the plurality of vehicle safety components (e.g., 160.1, 160.2, 160.3, 160.4, 160.5, and 160.6 of FIG. 1C) to deploy the selected subset of the plurality of vehicle safety components. The VSC actuator component(s) 130 then deploy the selected subset of vehicle safety component(s) 160, in response to detecting the emergency condition, to reduce the risk of injury to, minimize injury to, and/or protect the one or more vehicle occupants.

By way of a non-limiting example to demonstrate this embodiment of the system 101, a first sensor (e.g., the internal data collection component 120), contained within the interior space of a vehicle 102, collects data (interior vehicle configuration data) representing the interior space of the vehicle. The first sensor transmits this data to a processor 202 (within the vehicle computer 200), and the processor 202 determines, based on this data, a person is seated in a passenger seat in the front left portion of the vehicle, facing the front of the vehicle (i.e., the location and orientation of a vehicle occupant). In response to determining that particular location and orientation, the processor 202 selects, from among six airbags located throughout the interior space of the vehicle (the vehicle safety components 160.1-160.6), a first airbag located on the left side of the vehicle (the vehicle safety component 160.1) and a second airbag location in the front of the vehicle (the vehicle safety component 160.2) to be in an active state. The other four airbags (vehicle safety components 160.3, 160.4, 160.5, and 160.6) remain in a deactivated state. A second sensor (e.g., the external communication component 112) coupled to the vehicle 102 collects data (driving environment data) representing the position and speed of an adjacent vehicle (e.g., object 199) driving in close proximity to the vehicle 102. The sensor transmits this data to a processor 202 (within the vehicle computer 200), and the processor 202 detects, based on this data, whether the vehicle 102 and the adjacent vehicle are likely to collide (the emergency condition) by comparing, for example, the two vehicle's positions, speeds, and/or trajectories. When the processor 202 determines that the vehicle 102 and the adjacent vehicle will likely collide, the processor 202 causes the VSC actuator components 130.1 and 130.2 (the actuator components corresponding to the selected subset of vehicle safety components) to deploy the airbags 160.1 and 160.2 (i.e., the selected subset of vehicle safety components), respectively, in order to prepare the passenger for impact and reduce the risk of the passenger sustaining an injury resulting from the collision between the vehicle 102 and the adjacent vehicle.

In an alternative embodiment of the system 101, after the processor 202 selects the subset of the plurality of vehicle safety components, the internal data collection component 120 collects interior vehicle environment data and transmits the interior vehicle environment data to the vehicle computer 200. The vehicle computer 200 receives the interior vehicle environment data, and the processor 202 stores the interior vehicle environment data in the interior vehicle environment data storage 248. After the interior vehicle environment data is collected, received, and stored in the interior vehicle environment data storage 248, the processor 202 executes an emergency condition detection program, stored in the emergency condition detection program memory 214, which is configured to analyze the interior vehicle environment data to determine whether an emergency condition exists. In response to the processor detecting the emergency condition, the processor causes one or more VSC actuator components to deploy the selected subset of vehicle safety components in order to reduce the risk of injury to, minimize injury to, and/or protect the one or more vehicle occupants.

By way of a non-limiting example to demonstrate this embodiment of the system 100, a sensor (e.g., the internal data collection component 120), contained within the interior space of a vehicle 102, collects data (interior vehicle configuration data) representing the interior space of the vehicle. The first sensor transmits this data to a processor 202 (within the vehicle computer 200), and the processor 202 determines, based on this data, a person seated is in a passenger seat in the front left portion of the vehicle, facing the front of the vehicle (i.e., the location and orientation of a vehicle occupant). In response to determining that particular location and orientation, the processor 202 selects, from among six fire protection devices located throughout the interior space of the vehicle (the vehicle safety components 160.1-160.6), a first fire protection device (e.g., a fireproof blanket or partition) located on the left side of the vehicle (the vehicle safety component 160.1) and a second fire protection device located in the front of the vehicle (the vehicle safety component 160.2) to be in an active state. The other four fire protection devices (vehicle safety components 160.3, 160.4, 160.5, and 160.6) remain in a deactivated state. The sensor, or a second sensor contained within the interior space of the vehicle 102 (e.g., the interior data collection component 120) collects data (interior vehicle environment data) representing changes in the physical environment of the interior space of the vehicle 102. The sensor transmits this data to a processor 202 (within the vehicle computer 200), and the processor 202 detects, based on this data, whether there is a fire within the interior space of the vehicle 102 by comparing, for example, the temperature inside the vehicle, the existence of smoke, and/or carbon dioxide levels in within the vehicle with threshold values associated with fire. When the processor 202 determines that there is a fire within the vehicle 102, the processor 202 causes the VSC actuator components 130.1 and 130.2 to deploy the fire protection devices 160.1 and 160.2 (i.e., the selected subset of vehicle safety components), respectively, in order to reduce the risk of the passenger sustaining an injury resulting from the fire.

In an alternative embodiment of the system 101, after the processor 202 selects the subset of vehicle safety components, the vehicle operation controller 150 transmits the vehicle operation data to the vehicle computer 200. After the vehicle operation data is stored, the processor 202 executes a vehicle action detection program stored in the vehicle action detection program memory 224. The vehicle action detection program is configured to analyze the vehicle operation data to determine whether the vehicle 102 has taken a specific action that may create an emergency condition. Specific actions which the processor 202 may be configured to detect include, but are not limited to, the vehicle 102 accelerating, decelerating, turning, braking, changing lanes, merging, moving in reverse, and/or any other physical movement by the vehicle 102, any of its systems, and/or any of its components. In some embodiments, the processor 202 will only detect any of the aforementioned specific actions when the vehicle 102 taking such action would injure or cause harm, or increase the risk of injuring or causing harm, to one or more vehicle occupants riding in the vehicle 102. The vehicle action detection program may comprise using one or more algorithms, machine learning techniques, data comparison, and/or any other methods for detecting whether the vehicle 102 has taken the specific action. In some embodiments, the processor 202 will use criteria data stored in the vehicle action detection criteria data storage 226, indicative of a threshold and/or other criteria defining when the vehicle 102 takes a specific action, to determine whether the vehicle 102 has taken the specific action.

When the processor 202 determines that the vehicle 102 has taken the specific action, the processor 202 executes an actuator program stored in the actuator program memory 232 to cause the VSC actuator component(s) 130 to deploy the selected subset of vehicle safety component(s) 160 in order to reduce the risk of injury to, minimize injury to, and/or protect the one or more vehicle occupants.

By way of a non-limiting example to demonstrate this embodiment of the system 101, a sensor (e.g., the internal data collection component 120), contained within the interior space of a vehicle 102, collects data (interior vehicle configuration data) representing the interior space of the vehicle. The first sensor transmits this data to a processor 202 (within the vehicle computer 200), and the processor 202 determines, based on this data, a person is seated in a passenger seat in the front left portion of the vehicle, facing the front of the vehicle (i.e., the location and orientation of a vehicle occupant). In response to determining that particular location and orientation, the processor 202 selects, from among six restraint devices located throughout the interior space of the vehicle (the vehicle safety components 160.1-160.6), a restraint device (e.g., a harness, seatbelt, etc.)

located on the left side of the vehicle (the vehicle safety component 160.1) to be in an active state. The restraint device 160.1 is configured to counteract and/or prevent a strain/effect, such as whiplash, imposed on a vehicle passenger as a result of the vehicle 102 accelerating. The other five restraint devices (vehicle safety components 160.2, 160.3, 160.4, 160.5, and 160.6) remain in a deactivated state. To increase the speed of the vehicle 102 (e.g., in order to keep up with surrounding traffic), the vehicle operation controller 150 transmits a signal, indicative of a command to accelerate the vehicle 102, to a speed subsystem. The vehicle operation controller 150 may also transmit vehicle operation data, indicative of the acceleration of the vehicle, to the vehicle computer 200, where the vehicle operation data may be stored in the vehicle operation data storage 222. The processor 202 then analyzes the vehicle operation data and detects that the vehicle 102 is accelerating, for example, by determining that there has been a large increase in the speed of the vehicle 102 over a short time span. When the processor 202 determines that the vehicle 102 is accelerating, the processor 202 causes the VSC actuator component 130.1 to deploy the restraint device 160.1 in order to reduce the risk of the passenger sustaining an injury resulting from the vehicle 102 accelerating.

In one embodiment of the system 100, as depicted in FIG. 1A, prior to and/or during operation of the vehicle 102, the interior data collection component 120 collects interior vehicle configuration data indicative of an interior space of the vehicle 102, and/or vehicle occupant data corresponding to one or more vehicle occupants riding in the vehicle 102. The processor 202 stores the interior vehicle configuration data in the interior vehicle configuration data storage 234 and stores the vehicle occupant data in the vehicle occupant data storage 238. This data is collected and analyzed so that the processor may determine a physical configuration for the vehicle safety component 160. This data may also be collected so that the processor 202 has a reference point of pertinent information for assessing whether the vehicle occupant riding in the vehicle 102 is at risk of sustaining an injury while in the vehicle 102. In response to the processor 202 analyzing the interior vehicle configuration, the processor 202 may determine the location and/or orientation of the vehicle occupant, and the processor 202 may execute an actuator program stored in the actuator program memory 232. The actuator program may cause a VSC actuator component 130 to adjust the physical configuration of a vehicle safety component 160 from a current/first physical configuration to a second physical configuration based on the location and/or orientation of the vehicle occupant. Adjusting the physical configuration of the vehicle safety component 160 from a first physical configuration to the second physical configuration is intended put the vehicle safety component 160 in a physical configuration that, when the vehicle safety component 160 is deployed, reduces the risk of injury to the vehicle occupant.

After the VSC actuator component 130 adjusts the physical configuration of the vehicle safety component 160 from the first physical configuration to the second physical configuration, the external communication component 112 collects driving environment data and transmits the driving environment data to the vehicle computer 200. The vehicle computer 200 receives the driving environment data via the transceiver 204, and the processor 202 stores the driving environment data in the driving environment data storage 212. After the driving environment data is collected, received, and stored in the driving environment data storage 212, the processor 202 executes an emergency condition detection program, stored in the emergency condition detection program memory 214. The emergency condition detection program analyzes the driving environment data to determine whether an emergency condition exists.

When the processor 202 detects the emergency condition, the processor 202 executes an actuator program stored in the actuator program memory 232 to cause the VSC actuator component 130 to deploy the vehicle safety component 160. The VSC actuator component 130 then deploys the vehicle safety component 160, in response to the processor 202 detecting the emergency condition, to reduce the risk of injury to the vehicle occupant.

By way of a non-limiting example to demonstrate this embodiment of the system 100, a first sensor (e.g., the internal data collection component 120), contained within the interior space of a vehicle 102, collects data (interior vehicle configuration data) representing the interior space of the vehicle. The first sensor transmits this data to a processor 202 (within the vehicle computer 200), and the processor 202 determines, based on this data, a person is seated in a passenger seat in the front left portion of the vehicle, facing the front of the vehicle (i.e., the location and orientation of a vehicle occupant). In response to determining that the person is in that particular location and orientation, the processor 202 causes the VSC actuator component 130 to move an airbag (the vehicle safety component 160) from the back right corner of the vehicle (the first physical configuration) to the front left side of the vehicle (the second physical configuration) so that if an emergency condition is detected, the airbag can be deployed from a location/orientation proximal to the person's location/orientation within in the vehicle. A second sensor (e.g., the external communication component 112) coupled to the vehicle 102 collects data (driving environment data) representing the position and speed of an adjacent vehicle (e.g., object 199) driving in close proximity to the vehicle 102. The sensor transmits this data to the processor 202 (within the vehicle computer 200), and the processor 202 detects, based on this data, whether the vehicle 102 and the adjacent vehicle is likely to collide (the emergency condition) by comparing, for example, the two vehicle's positions, speeds, and/or trajectories. When the processor 202 determines that the vehicle 102 and the adjacent vehicle will likely collide, the processor 202 causes the VSC actuator component 130 to deploy the airbag from the front left side of the vehicle (the second physical configuration) in order to prepare the passenger for impact and reduce the risk of the passenger sustaining an injury resulting from the collision between the vehicle 102 and the adjacent vehicle.

In an alternative embodiment of the system 100, after the processor 202 causes the VSC actuator component 130 to adjust the physical configuration of the vehicle safety component 160 from a first physical configuration to a second physical configuration, the internal data collection component 120 collects interior vehicle environment data and transmits the interior vehicle environment data to the vehicle computer 200. After the vehicle computer 200 receives the interior vehicle environment data, the processor 202 stores the interior vehicle environment data in the interior vehicle environment data storage 248, and the processor 202 executes an emergency condition detection program stored in the emergency condition detection program memory 214. The emergency condition detection program is configured to analyze the interior vehicle environment data to determine whether an emergency condition exists. When the processor 202 detects the emergency condition, the processor 202 causes the VSC actuator component 130 to deploy the vehicle safety component 160 in order to reduce the risk of injury to, minimize injury to, and/or protect the one or more vehicle occupants.

In an alternative embodiment of the system 100, after the processor 202 causes the VSC actuator component 130 to adjust the physical configuration of the vehicle safety component 160 from a first physical configuration to a second physical configuration, the vehicle operation controller 150 transmits vehicle operation data to the vehicle computer 200. After the vehicle operation data is stored, the processor 202 executes a vehicle action detection program stored in the vehicle action detection program memory 224. The vehicle action detection program analyzes the vehicle operation data to determine whether the vehicle 102 has taken a specific action that may create an emergency condition. When the processor 202 determines that the vehicle 102 has taken the specific action, the processor 202 executes an actuator program stored in the actuator program memory 232 to cause the VSC actuator component 130 to deploy the vehicle safety component 160 in order to reduce the risk of injury to, minimize injury to, and/or protect the one or more vehicle occupants.

Example Systems for Protecting One or More Transportable Articles

In one embodiment of the system 101, as depicted in FIG. 1C, prior to and/or during operation of the vehicle 102, the interior data collection component 120 collects transportable article data that is indicative of one or more transportable articles 170 within the interior space of the vehicle 102. The processor 202 of FIG. 1B stores the transportable article data in the transportable article data storage 252. The transportable article data is collected and the processor 202 executes a transportable article detection program, stored in the transportable article detection program memory 254, to determine one or more characteristic(s) and/or trait(s) of the one or more transportable articles 170. Based on the determined characteristic(s) and/or trait(s), the program selects a subset of a plurality of article protection components (i.e., a subset of the plurality of article protection components 165.1, 165.2, and 165.3) to be deployed to protect the one or more transportable articles 170. The transportable article data may also be collected and analyzed so that the processor 202 has a reference point of pertinent information for assessing whether one or more transportable articles 170 are at risk of sustaining damage while being transported in the vehicle 102.

After the processor 202 selects the subset of the plurality of article protection components (e.g., at least one of article protection components 165.1, 165.2, and 165.3), the processor 202 executes an actuator program stored in the actuator program memory 232 to cause one or more APC actuator components (e.g., 135.1, 135.2, and 135.3 of FIG. 10) corresponding to the selected subset of the plurality of article protection components (e.g., 165.1, 165.2, and 165.3 of FIG. 1C) to deploy the selected subset of the plurality of article protection components. The APC actuator component(s) 135 then deploys the selected subset of article protection components to reduce the risk of damage to, minimize damage to, and/or protect the one or more transportable articles 170.

By way of a non-limiting example to demonstrate this embodiment of the system 101, a first sensor (e.g., the internal data collection component 120), contained within the interior space of the vehicle 102, collects data (transportable article data) representing the one or more transportable articles 170 within the vehicle 102. The first sensor transmits this data to the processor 202 (within the vehicle computer 200), and the processor 202 determines, based on this data, a glass bowl is being transported by the vehicle 102. In response to determining that the transportable article 170 is a glass object (or a glass bowl specifically), the processor 202 selects, from among three restraint devices located throughout the interior space of the vehicle (the article protection components 165.1-165.3), two of the restraint devices (article protection components 165.1 and 165.2). The processors 202 then causes the APC actuator components 135.1 and 135.2 to deploy, respectively, the article protection component 165.1 and the article protection component 165.2 to prevent the glass bowl from moving while the vehicle 102 is operating. The other restraint device (article protection component 165.3) remains in a deactivated state.

In an alternative embodiment of the system 101, after the APC actuator components (e.g., 135.1, 135.2, and 135.3 of FIG. 1C) deploy the selected subset of the article protection components (e.g., 165.1, 165.2, and 165.3 of FIG. 1C), the external communication component 112 collects driving environment data and transmits the driving environment data to the vehicle computer 200. The vehicle computer 200 receives the driving environment data via the transceiver 204, and the processor 202 stores the driving environment data in the driving environment data storage 212. After the driving environment data is collected, received, and stored in the driving environment data storage 212, the processor 202 executes an emergency condition detection program, stored in the emergency condition detection program memory 214, which is configured to analyze the driving environment data to determine whether an emergency condition exists.

When the processor 202 detects the emergency condition, the processor 202 executes an actuator program stored in the actuator program memory 232 to cause the one or more APC actuator components (e.g., 135.1, 135.2, and 135.3 of FIG. 1C), corresponding to the selected subset of article protection components (e.g., 165.1, 165.2, and 165.3 of FIG. 1C), to adjust the physical configuration of the selected subset of article protection components in order to protect the one or more transportable articles 170. The APC actuator component(s) 135 then adjust the selected subset of article protection components, in response to detecting the emergency condition, to reduce the risk of damage to, minimize damage to, and/or protect the one or more transportable articles 170.

By way of a non-limiting example to demonstrate this embodiment of the system 101, a first sensor (e.g., the internal data collection component 120), contained within the interior space of a vehicle 102, collects data (transportable article data) representing the one or more transportable articles 170 within the vehicle 102. The first sensor transmits this data to the processor 202 (within the vehicle computer 200), and the processor 202 determines, based on this data, a glass bowl is being transported by the vehicle 102. In response to determining that the transportable article 170 is a glass object (or a glass bowl specifically), the processor 202 selects, from among three restraint devices located throughout the interior space of the vehicle 102 (the article protection components 165.1-165.3), two of the restraint devices (article protection components 165.1 and 165.2). The processor 202 then causes the APC actuator components 135.1 and 135.2 to deploy, respectively, the article protection component 165.1 and the article protection component 165.2 to prevent the glass bowl from moving while the vehicle 102 is operating. The other restraint device (article protection components 165.3) remains in a deactivated state. A second sensor (e.g., the external communication component 112) coupled to the vehicle 102 collects data (driving environment data) representing the position and speed of an adjacent vehicle (e.g., object 199) driving in close proximity to the vehicle 102. The sensor transmits this data to the processor 202 (within the vehicle computer 200), and the processor 202 detects, based on this data, whether the vehicle 102 and the adjacent vehicle are likely to collide (the emergency condition) by comparing, for example, the two vehicle's positions, speeds, and/or trajectories. When the processor 202 determines that the vehicle 102 and the adjacent vehicle will likely collide, the processor 202 causes the APC actuator components 135.1 and 135.2 to adjust the physical configuration of the restraint devices 165.1 and 165.2 (i.e., the selected subset of article protection components), respectively, in order to prepare for impact and reduce the risk of the glass bowl being damaged as a result of the collision between the vehicle 102 and the adjacent vehicle.

In an alternative embodiment of the system 101, after the APC actuator components (e.g., 135.1, 135.2, and 135.3 of FIG. 1C) deploy the selected subset of the article protection components (e.g., 165.1, 165.2, and 165.3 of FIG. 1C), the internal data collection component 120 collects interior vehicle environment data and transmits the interior vehicle environment data to the vehicle computer 200. The vehicle computer 200 receives the interior vehicle environment data, and the processor 202 stores the interior vehicle environment data in the interior vehicle environment data storage 248. After the interior vehicle environment data is collected, received, and stored in the interior vehicle environment data storage 248, the processor 202 executes an emergency condition detection program, stored in the emergency condition detection program memory 214, which is configured to analyze the interior vehicle environment data to determine whether an emergency condition exists. In response to the processor detecting the emergency condition, the processor causes one or more APC actuator components to adjust/modify the selected subset of article protection components in order to reduce the risk of damage to, minimize damage to, and/or protect the one or more transportable articles 170.

By way of a non-limiting example to demonstrate this embodiment of the system 101, a sensor (e.g., the internal data collection component 120), contained within the interior space of a vehicle 102, collects data (transportable article data) representing the one or more transportable articles 170 within the vehicle 102. The first sensor transmits this data to the processor 202 (within the vehicle computer 200), and the processor 202 determines, based on this data, packages of ice cream are being transported by the vehicle 102. In response to determining that the transportable article 170 is packages of ice cream, the processor 202 selects, from among three article protection components (a temperature control device 165.1, an impact dampening pad 165.2, and a restraint device 165.3) located throughout the interior space of the vehicle, and causes the APC actuator component 135.1 to deploy a temperature control device (165.1) and the APC actuator component 135.3 to deploy a restraint device (the article protection component 165.3) to protect the package of ice cream from moving and melting while the vehicle 102 is operating. The impact dampening device (article protection component 165.2) remains in a deactivated state. The sensor, or a second sensor contained within the interior space of the vehicle 102 (e.g., the interior data collection component 120) collects data (interior vehicle environment data) representing changes in the physical environment of the interior space of the vehicle 102. The sensor transmits this data to the processor 202 (within the vehicle computer 200), and the processor 202 detects, based on this data, whether the temperature within the vehicle 102 has risen. When the processor 202 determines that the temperature within the vehicle 102 has risen, or reached a threshold value, the processor 202 may cause the APC actuator component 135.1 to adjust the temperature control device 165.1 (i.e., one of the selected subset of article protection components), in order to reduce the risk of the ice cream melting while being transported in the vehicle 102.

In an alternative embodiment of the system 101, after the APC actuator components (e.g., 135.1, 135.2, and 135.3 of FIG. 1C) deploy the article protection components (e.g., 165.1, 165.2, and 165.3 of FIG. 1C), the vehicle operation controller 150 transmits the vehicle operation data to the vehicle computer 200. After the vehicle operation data is stored, the processor 202 executes a vehicle action detection program stored in the vehicle action detection program memory 224. The vehicle action detection program is configured to analyze the vehicle operation data to determine whether the vehicle 102 has taken a specific action that may create an emergency condition. Specific actions which the processor 202 may be configured to detect include, but are not limited to, the vehicle 102 accelerating, decelerating, turning, braking, changing lanes, merging, moving in reverse, and/or any other physical movement by the vehicle 102, any of its systems, and/or any of its components. In some embodiments, the processor 202 will only detect any of the aforementioned specific actions when the vehicle 102 taking such action would damage, or increase the risk of damaging, one or more transportable articles 170. The vehicle action detection program may comprise using one or more algorithms, machine learning techniques, data comparison, and/or any other methods for detecting whether the vehicle 102 has taken the specific action. In some embodiments, the processor 202 will use criteria data stored in the vehicle action detection criteria data storage 226, indicative of a threshold and/or other criteria defining when the vehicle 102 takes a specific action, to determine whether the vehicle 102 has taken the specific action.

When the processor 202 determines that the vehicle 102 has taken the specific action, the processor 202 executes an actuator program stored in the actuator program memory 232 to cause the APC actuator component 135 to adjust/modify the selected subset of article protection components in order to reduce the risk of damage to, minimize damage to, and/or protect the one or more transportable articles 170.

By way of a non-limiting example to demonstrate this embodiment of the system 101, a first sensor (e.g., the internal data collection component 120), contained within the interior space of a vehicle 102, collects data (transportable article data) representing the one or more transportable articles 170 within the vehicle 102. The first sensor transmits this data to the processor 202 (within the vehicle computer 200), and the processor 202 determines, based on this data, a glass bowl is being transported by the vehicle 102. In response to determining that the transportable article 170 is a glass object (or a glass bowl specifically), the processor 202 selects, from among three restraint devices located throughout the interior space of the vehicle (the article protection components 165.1-165.3), two of the restraint devices (article protection components 165.1 and 165.2). The processor 202 then causes the APC actuator components 135.1 and 135.2 to deploy, respectively, the article protection component 165.1 and the article protection component 165.2 to prevent the glass bowl from moving while the vehicle 102 is operating. The other restraint device (article protection components 165.3) remains in a deactivated state. In this example scenario, to increase the speed of the vehicle 102 (e.g., in order to keep up with surrounding traffic), the vehicle operation controller 150 transmits a signal, indicative of a command to accelerate the vehicle 102, to a speed subsystem. The vehicle operation controller 150 may also transmit vehicle operation data, indicative of the acceleration of the vehicle, to the vehicle computer 200, where the vehicle operation data may be stored in the vehicle operation data storage 222. The processor 202 then analyzes the vehicle operation data and detects that the vehicle 102 is accelerating, for example, by determining that there has been a large increase in the speed of the vehicle 102 over a short time span. When the processor 202 determines that the vehicle 102 is accelerating, the processor 202 causes the APC actuator components 135.1 and 135.2 to adjust the physical configuration of the first restraint device 165.1 and second restraint device 165.2, respectively, in order to reduce the risk of damage to, minimize damage to, and/or protect the one or more transportable articles 170.

In one embodiment of the system 100, as depicted in FIG. 1A, or the system 101, as depicted in FIG. 1C, prior to and/or during operation of the vehicle 102, the interior data collection component 120 collects transportable article data that is indicative of one or more transportable articles 170 within the interior space of the vehicle 102. The processor 202 stores the transportable article data in the transportable article data storage 252. The processor 202 executes a transportable article detection program, stored in the transportable article detection program memory 254, to determine one or more characteristic(s) and/or trait(s) of the one or more transportable articles 170 in order to select a manner in which the vehicle 102 operates in order to protect/reduce to the risk of damage to the one or more transportable articles 170. After the processor 202 determines the one or more characteristic(s) and/or trait(s) of the one or more transportable articles 170, the processor 202 may cause the vehicle operation controller 150 to generate and transmit vehicle control data, indicative of a driving decision, to operate the vehicle 102 or one of its subsystems.

By way of a non-limiting example to demonstrate this embodiment of the system 100 or system 101, a first sensor (e.g., the internal data collection component 120), contained within the interior space of a vehicle 102, collects data (transportable article data) representing the one or more transportable articles 170 within the vehicle 102. The first sensor transmits this data to the processor 202 (within the vehicle computer 200), and the processor 202 determines, based on this data, that a transplant organ is being transported by the vehicle 102. In response to determining that the transportable article 170 is a transplant organ, the processor 202 causes the vehicle operation controller 150 to cause the vehicle to accelerate and/or operate in a manner that will prioritize speed over ride comfort in furtherance of transporting the transplant organ to its destination.

In an alternative embodiment of the system 100, as depicted in FIG. 1A, or system 101, as depicted in FIG. 1C, after the processor determines the one or more characteristic(s) and/or trait(s) of the one or more transportable articles 170, the processor 202 may cause the vehicle controller 150 to prevent/restrict the vehicle 102 from taking a specific action based on the one or more characteristic(s) and/or trait(s) of the one or more transportable articles 170.

By way of a non-limiting example to demonstrate this embodiment of the system 100 or system 101, a first sensor (e.g., the internal data collection component 120), contained within the interior space of the vehicle 102, collects data (transportable article data) representing the one or more transportable articles 170 within the vehicle 102. The first sensor transmits this data to the processor 202 (within the vehicle computer 200), and the processor 202 determines, based on this data, that a glass bowl is being transported by the vehicle 102. In response to determining that the transportable article 170 is a glass object (or a glass bowl specifically), the processor 202 causes the vehicle operation controller 150 to restrict the vehicle from exceeding a certain positive or negative acceleration, and/or making a sharp turn, in order to protect/reduce the risk of damage to the glass bowl.

Example Systems for Controlling Operation of a Vehicle

In one embodiment of the system 100, as depicted in FIG. 1A, prior to and/or during operation of the vehicle 102, the interior data collection component 120 collects interior vehicle configuration data that is indicative of an interior space of the vehicle 102. The processor 202 stores the interior vehicle configuration data in the interior vehicle configuration data storage 234. In some embodiments, interior vehicle configuration data corresponds to the physical configuration of the interior space of the vehicle 102, the physical configuration of an interior component (e.g., the interior vehicle component 140) within the vehicle 102, the presence of one or more vehicle occupants in the vehicle 102, a location and/or orientation of the one or more vehicle occupants in the vehicle 102, one or more characteristic(s) and/or trait(s) of the one or more vehicle occupants, and/or an action/behavior of the one or more vehicle occupants. The interior vehicle configuration data is collected so that the processor 202 may modify a manner in which the vehicle 102 operates based on the interior configuration of the interior space of the vehicle 102.

The processor 202 executes an interior vehicle configuration detection program, stored in an interior vehicle configuration detection program memory 244, in order to determine the interior vehicle configuration of the vehicle 102. After the processor 202 determines the interior vehicle configuration of the vehicle 102, the processor 202 may cause the vehicle operation controller 150 to modify the manner in which the vehicle 102 operates, based on the determined interior vehicle configuration. The vehicle operation controller 150 modifies the manner in which the vehicle operates by generating and transmitting vehicle control data, indicative of a driving decision, to the vehicle 102 or one of its subsystems. In some embodiments, the vehicle operation controller 150 may modify the manner in which the vehicle operates by causing the vehicle to take a specific action.

By way of a non-limiting example to demonstrate this embodiment of the system 100, a first sensor (e.g., the internal data collection component 120), contained within the interior space of the vehicle 102, collects data (interior vehicle configuration data) representing the interior space of the vehicle 102. The first sensor transmits this data to the processor 202 (within the vehicle computer 200), and the processor 202 determines, based on this data, a person (the vehicle occupant) is sleeping (an action/behavior of the vehicle occupant) in a reclined passenger seat (the interior vehicle component 140) in the front left portion of the vehicle (i.e., the location and orientation of the interior vehicle occupant 140). In response to determining that interior vehicle configuration, the processor 202 causes the vehicle operation controller 150 to cause the vehicle to decelerate and/or operate in a manner that will prioritize ride comfort over speed while the passenger is sleeping.

In an alternative embodiment of the system 100, as depicted in FIG. 1A, after the processor 202 determines the interior vehicle configuration of the vehicle 102, the processor 202 may cause the vehicle operation controller 150 to modify the manner in which the vehicle 102 operates, based on the determined interior vehicle configuration, by preventing/restricting the vehicle 102 from taking a specific action.

By way of a non-limiting example to demonstrate this embodiment of the system 100, a first sensor (e.g., the internal data collection component 120), contained within the interior space of a vehicle 102, collects data (interior vehicle configuration data) representing the interior space of the vehicle 102. The first sensor transmits this data to the processor 202 (within the vehicle computer 200), and the processor 202 determines, based on this data, a person (the vehicle occupant) is sitting upwards in a passenger seat (the location of the vehicle occupant), facing the interior part of the vehicle 102 (the orientation of the vehicle occupant), and eating (an action/behavior of the vehicle occupant) at a table (the interior vehicle component 140) located in the center of the vehicle 102 (the physical configuration of the interior space of the vehicle 102). In response to determining the interior vehicle configuration, the processor 202 causes the vehicle operation controller 150 to restrict the vehicle from exceeding a certain positive or negative acceleration, and/or making a sharp turn, in order to prevent/reduce the risk of the passenger choking while eating in the vehicle, or food/drink items being overturned, etc.

Figure 2A:
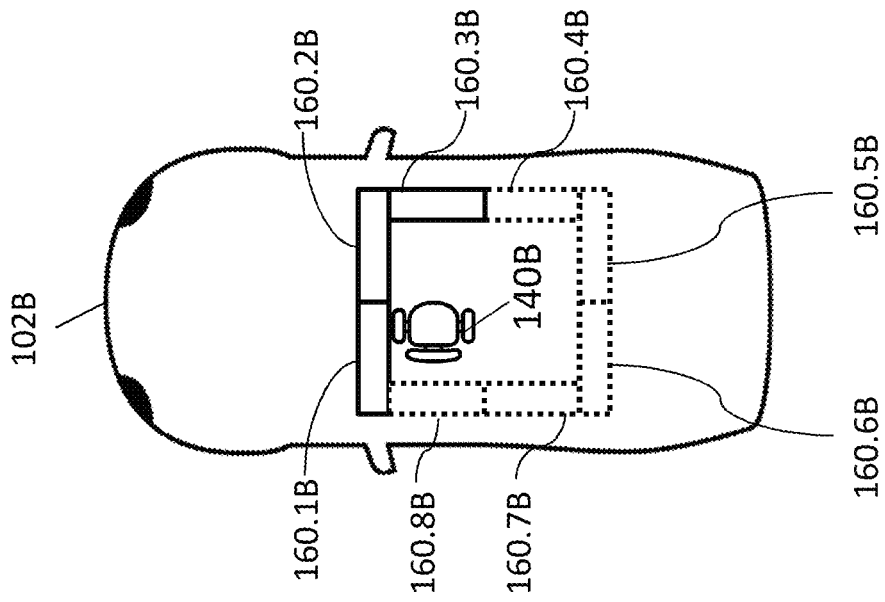
FIG. 2A illustrates a first embodiment and scenario in which one or more vehicle safety components may be deployed.

FIG. 2A illustrates a first embodiment and scenario in which one or more vehicle safety components may be deployed. As FIG. 2A illustrates, vehicle 102A includes an interior vehicle component 140A and vehicle safety components 160.1A, 160.2A, 160.3A, 160.4A, 160.5A, 160.6A, 160.7A, and 160.8A disposed within the interior space of the vehicle 102A. In this embodiment, the interior vehicle component 140A is located in the front left side of the vehicle 102A and oriented facing the front of the vehicle 102A. Based on this interior configuration of the vehicle 102A, the processor may select the vehicle safety components 160.1A and 160.8A, from the vehicle safety components 160.1A-160.8A, to be in an active state, and then cause a plurality of VSC actuator components to deploy vehicle safety component 160.1A and 160.8A in response to the vehicle computer determining that an emergency condition has been detected. For example, in an embodiment in which the interior vehicle component 140A is a passenger seat, vehicle safety components 160.1A-160.8A are airbags, and the emergency condition is an impending collision, the processor may detect that the interior configuration of the vehicle 102A corresponds to a vehicle occupant, seated in the passenger seat in front left side of the vehicle 102A, facing forward. Accordingly, the processor may select the airbags closest to the vehicle occupant (160.1A and 160.8A) from the airbags located within the vehicle 102A (airbags 160.1A-160.8A) to be in an active state. Thus, when the processor detects that the vehicle 102A is going to be in a collision, the processor may cause the plurality of VSC actuator components to deploy the airbags 160.1A and 160.8A in order to protect/reduce the risk of injury to the vehicle occupant seated in the passenger seat 140A.

Figure 2B:
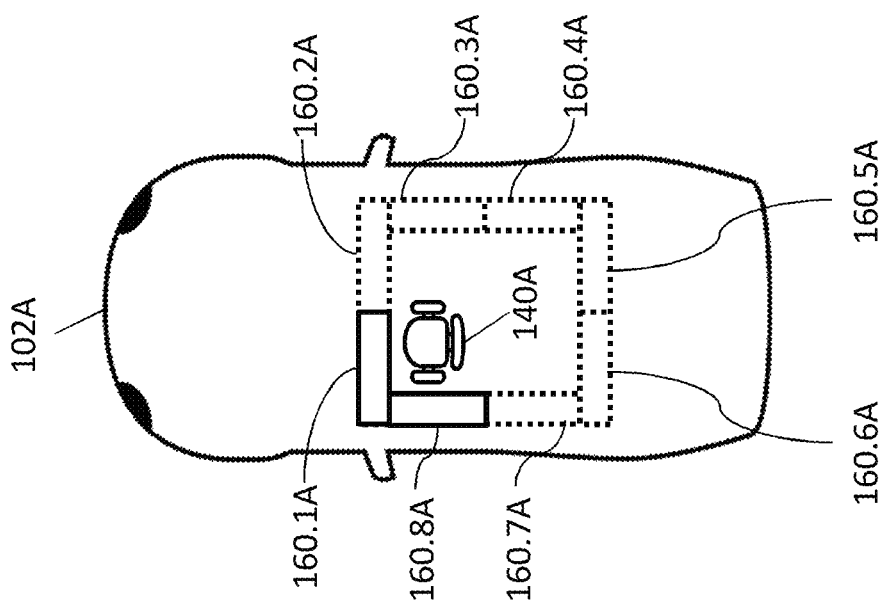
FIG. 2B illustrates a second embodiment and scenario in which one or more vehicle safety components may be deployed.

FIG. 2B illustrates a second embodiment and scenario in which one or more vehicle safety components may be deployed. As FIG. 2B illustrates, vehicle 102B includes an interior vehicle component 140B and vehicle safety components 160.1B, 160.2B, 160.3B, 160.4B, 160.5B, 160.6B, 160.7B, and 160.8B disposed within the interior space of the vehicle 102B. In this embodiment, the interior vehicle component 140B is located in the front left side of the vehicle 102B and oriented facing the right side of the vehicle 102B. Based on this interior configuration of the vehicle 102B, the processor may select the vehicle safety components 160.1B, 160.2B, and 160.3B, from the vehicle safety components 160.1B-160.8B, to be in an active state, and then cause a plurality of VSC actuator components to deploy vehicle safety component 160.1B, 160.2B, and 160.3B in response to the vehicle computer determining that an emergency condition has been detected. For example, in an embodiment in which the interior vehicle component 140B is a passenger seat, vehicle safety components 160.1B-160.8B are airbags, and the emergency condition is an impending collision, the processor may detect that the interior configuration of the vehicle 102B corresponds to a vehicle occupant, seated in the passenger seat in front left side of the vehicle, facing right. Accordingly, the processor may select the airbags closest to the vehicle occupant (160.1B, 160.2B, and 160.3B) from the airbags located within the vehicle 102B (airbags 160.1B-160.8B) to be in an active state. Thus, when the processor detects that the vehicle 102B is going to be in a collision, the processor may cause the plurality of VSC actuator components to deploy the airbags 160.1B, 160.2B, and 160.3B in order to protect/reduce the risk of injury to the vehicle occupant seated in the passenger seat 140B.

FIG. 2C illustrates a third embodiment and scenario in which one or more vehicle safety components may be deployed. As FIG. 2C illustrates, vehicle 102C includes a first interior vehicle component 140.1C, a second interior vehicle component 140.2C, and vehicle safety components 160.1C, 160.2C, 160.3C, 160.4C, 160.5C, 160.6C, 160.7C, and 160.8C disposed within the interior space of the vehicle 102C. In this embodiment, the first interior vehicle component 140.1C is located in the front left side of the vehicle 102C and oriented facing the front of the vehicle 102C, and the second interior vehicle component 140.2C is located in the back right side of the vehicle 102C and oriented facing the front of the vehicle 102C. Based on this interior configuration of the vehicle 102C, the processor may select the vehicle safety components 160.1C, 160.4C, and 160.8C, from the vehicle safety components 160.1C-160.8C, to be in an active state, and then cause a plurality of VSC actuator components to deploy vehicle safety component 160.1C, 160.4C, and 160.8C in response to the vehicle computer determining that an emergency condition has been detected. For example, in an embodiment in which the first interior vehicle component 140.1C is a passenger seat, the second vehicle safety component 140.2C is a passenger seat, vehicle safety components 160.1C-160.8C are airbags, and the emergency condition is an impending collision, the processor may detect that the interior configuration of the vehicle 102C corresponds to a first vehicle occupant seated in a first passenger seat (the first interior vehicle component 140.1C) in the front left side of the vehicle, facing forward, and a second vehicle occupant seated in a second passenger seat (the second interior vehicle component 140.2) in the back right side of the vehicle, facing forward. Accordingly, the processor may select the airbags closest to the first vehicle occupant (160.1C and 160.8C) and the second vehicle occupant (160.4C) from the airbags located within the vehicle 102C (airbags 160.1C-160.8C) to be in an active state. Thus, when the processor detects that the vehicle 102C is going to be in a collision, the processor may cause the plurality of VSC actuator components to deploy the airbags 160.1C, 160.4C, and 160.8C in order to protect/reduce the risk of injury to the vehicle occupants.

FIG. 2D illustrates a fourth embodiment and scenario in which one or more vehicle safety components may be deployed. As FIG. 2D illustrates, vehicle 102D includes a first interior vehicle component 140.1D, a second interior vehicle component 140.2D, and vehicle safety components 160.1D, 160.2D, 160.3D, 160.4D, 160.5D, 160.6D, 160.7D, and 160.8D disposed within the interior space of the vehicle 102D. In this embodiment, the first interior vehicle component 140.1D is located in the front left side of the vehicle 102D and oriented facing the front of the vehicle 102D, and the second interior vehicle component 140.2D is located in the back right side of the vehicle 102D. Based on this interior configuration of the vehicle 102D, the processor may select the vehicle safety components 160.1D, 160.2D, 160.3D, 160.4D, 160.5D, 160.6D, 160.7, and 160.8D, from the vehicle safety components 160.1D-160.8D, to be in an active state, and then cause a plurality of VSC actuator components to deploy vehicle safety components 160.1D-160.8D in response to the vehicle computer determining that an emergency condition has been detected. For example, in one embodiment the first interior vehicle component 140.1D is a passenger seat, the second vehicle safety component 140.2D is a non-human animal bed, vehicle safety components 160.1D-160.8D are airbags, and the emergency condition is an impending collision. In this embodiment, the processor may detect that the interior configuration of the vehicle 102D corresponds to a first vehicle occupant seated in a first passenger seat (the first interior vehicle component 140.1D) in the front left side of the vehicle 102D and second a non-human vehicle occupant (e.g., a dog) seated in the animal bed (the second interior vehicle component 140.2) in the back right side of the vehicle 102D. Accordingly, the processor may select the airbags closest to the first vehicle occupant (160.1D and 160.8D) and select the airbags that may be needed to protect the non-human vehicle occupant (who is free to move throughout the vehicle) (160.2D, 160.3D, 160.4D, 160.5D, 160.6D, 160.7D) from the airbags located within the vehicle 102D (airbags 160.1D-160.8D) to be in an active state. Thus, when the processor detects that the vehicle 102D is going to be in a collision, the processor may cause the plurality of VSC actuator components to deploy the airbags 160.1D-160.8D in order to protect/reduce the risk of injury to the vehicle occupants.

FIG. 2E.1 illustrates a fifth embodiment in which one or more vehicle safety components may be deployed. As FIG. 2E.1 illustrates, vehicle safety components 160.1E, 160.2E, 160.3E, and 160.4E are disposed within the interior space of the vehicle 102E. A vehicle occupant is seated in the vehicle 102E on interior vehicle component 140E. Vehicle safety component 160.1E is disposed within the front portion of the vehicle 102E and is configured to protect the vehicle occupant by deploying in a backwards direction towards the vehicle occupant's location and/or orientation within the vehicle 102E. Vehicle safety component 160.2E is disposed within the top portion of the vehicle 102E and is configured to protect the vehicle occupant by deploying in a downward direction toward the vehicle occupant's location and/or orientation within the vehicle 102E. Vehicle safety component 160.3E is disposed within the back portion of the vehicle 102E and is configured to protect the vehicle occupant by deploying in a forward direction towards the vehicle occupant's location and/or orientation within the vehicle 102E. Vehicle safety component 160.4E is disposed within the floor of the vehicle 102E and is configured to protect the vehicle occupant by deploying in an upward direction towards the vehicle occupant's location and/or orientation within the vehicle 102E. In this embodiment, the processor may cause an actuator component to deploy the vehicle safety components 160.1E, 160.2E, 160.3E, and/or 160.4E in response to the vehicle computer determining that an emergency condition has been detected. The processor may select, based on the vehicle occupant's location and orientation, a subset (e.g., vehicle safety components 160.1E and 160.2E) of the plurality of vehicle safety components 160.1E, 160.2E, 160.3E, and 160.4E, to be active while the vehicle 102E is operating. When the processor detects an emergency condition, the processor causes one or more actuator components to deploy the active subset of the plurality of vehicle safety components (e.g., 160.1E and/or 160.2E) in order to protect/reduce the risk of injury to the occupant caused by the emergency condition.

FIG. 2E.2 illustrates a sixth embodiment in which one or more vehicle safety components may be deployed. The components illustrated in FIG. 2E.2 correspond to and operate in the same manner as the like-numbered components shown in FIG. 2E.1. In FIG. 2E.2, the processor causes an actuator component to deploy the vehicle safety component 160.1E based on the location and orientation of the vehicle occupant within the vehicle 102E. As FIG. 2E.2 illustrates, the vehicle safety component 160.1E is selected to be active because the vehicle occupant is in a physical configuration within the vehicle 102 in which he/she is located towards the front of the vehicle 102E and in a forward-facing orientation towards the vehicle safety component 160.1E. Accordingly, the processor may select, based on the vehicle occupant's location and orientation, vehicle safety component 160.1E to be active while the vehicle 102E is operating. When the processor detects an emergency condition, the processor may cause the actuator component to deploy vehicle safety component 160.1E in order to protect the vehicle occupant. For example, in an embodiment in which the vehicle safety components 160.1E, 160.2E, 160.3E, and 160.4E are airbags, the processor may select vehicle safety component 160.1E to be active while the passenger is located towards the front of the vehicle 102E and facing forward. In the event of an emergency condition, (e.g., a collision), for example, deployment of the vehicle safety component 160.1E may provide the greatest amount of protection for the vehicle passenger.

FIG. 2E.3 illustrates a seventh embodiment in which one or more vehicle safety components may be deployed. The components illustrated in FIG. 2E.3 correspond to and operate in the same manner as the like-numbered components shown in FIG. 2E.1. In FIG. 2E.3, the processor causes an actuator component to deploy the vehicle safety component 160.2E based on the location and orientation of the vehicle occupant within the vehicle 102E. As FIG. 2E.3 illustrates, the vehicle safety component 160.2E is selected to be active because the vehicle occupant is in a physical configuration within the vehicle 102E in which he/she is located towards the front of the vehicle and in a reclined orientation/facing towards the vehicle safety component 160.2E. Accordingly, the processor may select, based on the vehicle occupant's location and orientation, vehicle safety component 160.2E to be active while the vehicle 102E is operating. When the processor detects an emergency condition, the processor may cause the actuator component to deploy vehicle safety component 160.2E in order to protect the vehicle occupant. For example, in an embodiment in which the vehicle safety components 160.1E, 160.2E, 160.3E, and 160.4E are airbags, the processor may select airbag 160.2E to be active while the passenger is located towards the front of the vehicle 102E and in a reclined orientation/facing toward the airbag 160.2E. In the event of an emergency condition (e.g., a collision), for example, the airbag 160.2E may provide the greatest amount of protection for the vehicle passenger.

Figure 2G:
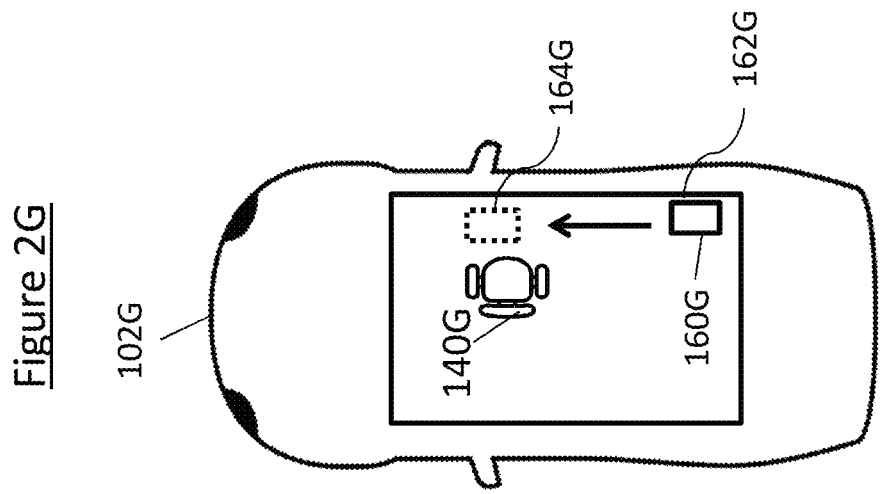
FIG. 2G illustrates a first embodiment in which a vehicle safety component may be adjusted from a first physical configuration to a second physical configuration.
Figure 2F:
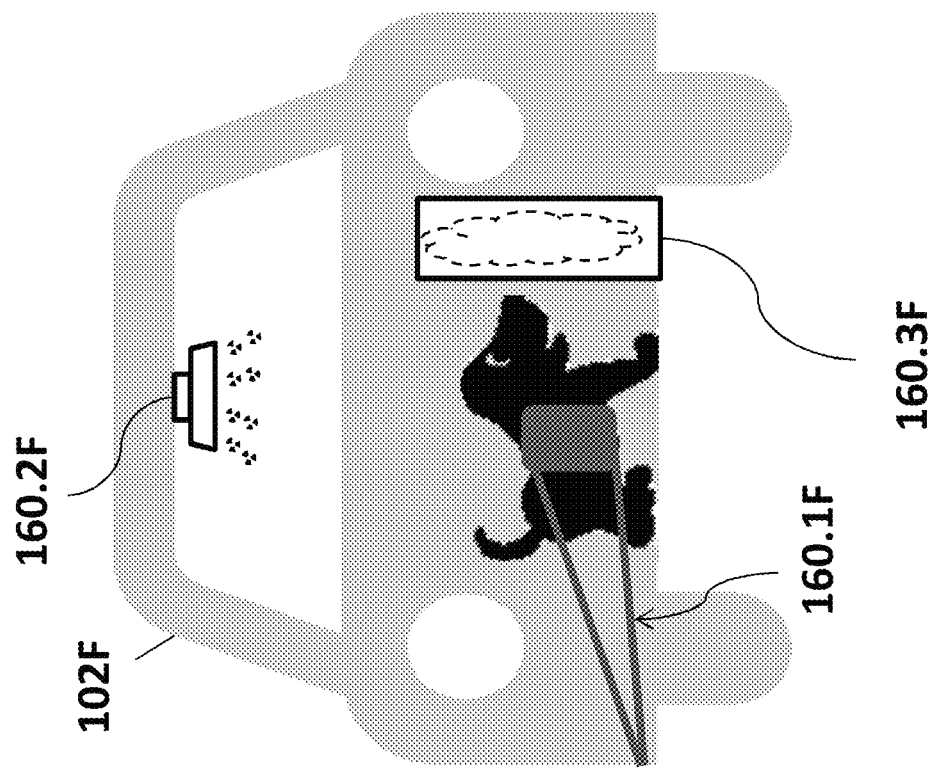
FIG. 2F illustrates an embodiment and scenario in which one or more vehicle safety components of different types may be selected and deployed.

FIG. 2F illustrates an embodiment and scenario in which one or more vehicle safety components of different types may be selected and deployed. As FIG. 2F illustrates, vehicle 102F includes three different types of vehicle safety components 160.1F, 160.2F, and 160.3F disposed within the interior space of the vehicle 102F. Based on this interior configuration of the vehicle 102F, the processor may select the vehicle safety components 160.1F and 160.3F from the vehicle safety components 160.1F, 160.2F, and 160.3F to be in an active state, because they offer the greatest and/or most relevant form of protection for the vehicle occupant. The processor may then cause a plurality of VSC actuator components to deploy vehicle safety components 160.1F and 160.3F in response to the vehicle computer determining that an emergency condition has been detected. For example, in an embodiment in which the vehicle occupant is a non-human animal (e.g., a dog) that is free to move about the interior space of the vehicle 102F, vehicle safety components 160.1F is a restraint device (e.g., an animal harness or leash), vehicle safety component 160.2F is a fire extinguisher, vehicle safety component 160.3F is an impact dampening pad (e.g., an airbag), and the emergency condition is an impending collision, the processor may detect that the interior configuration of the vehicle 102F corresponds to a dog seated on the floor that is free to move about the interior space of the vehicle 102F. Accordingly, the processor may select the restraint device 160.1F and the impact dampening pad 160.3F from the vehicle safety components located within the vehicle 102F to be in an active state, because the processor has detected that the restraint device has been placed on the non-human animal. Thus, when the processor detects that the vehicle 102F is going to be in a collision, the processor may cause the plurality of VSC actuator components to adjust the restraint device 160.1F (i.e., by restricting/preventing movement of the non-human animal by tightening the restraint device or reducing slack of the restraint device) and deploy the impact dampening pad 160.3F in order to protect/reduce the risk of injury to the dog traveling in the vehicle 102F.

FIG. 2G illustrates a first embodiment in which a vehicle safety component may be adjusted from a first physical configuration to a second physical configuration. As FIG. 2G illustrates, vehicle 102G includes an interior vehicle component 140G and a vehicle safety component 160G. The interior vehicle component 140G is disposed in a location in the front right side of the vehicle 102G and oriented facing the right side of the vehicle 102G. Vehicle safety component 160G is disposed within the vehicle 102G in a first physical configuration 162G in the back right corner of the vehicle 102G. In this embodiment, the vehicle safety component 160G is adjusted forwards to a second physical configuration 164G in response to the vehicle computer determining the interior vehicle configuration of the vehicle 102G. For example, in an embodiment in which the interior vehicle component 140G is a passenger seat in the vehicle 102G and the vehicle safety component 160G is an impact dampening pad (e.g., an airbag), when the processor determines that a vehicle occupant is seated in the passenger seat in the front right side of the vehicle and facing right, the processor may cause an actuator component to adjust the physical configuration of the impact dampening pad 160G from a current/ first physical configuration in the back of the vehicle 102G (the first physical configuration 162G) forwards to a new physical configuration towards front of the vehicle 102G (the second physical configuration 164G) so that if an emergency condition is detected, the impact dampening pad 160G can be deployed from a location/orientation proximal to the vehicle occupant's location/orientation within in the vehicle 102G.

FIG. 2H illustrates an embodiment and scenario in which an article protection component may be deployed to protect one or more transportable articles. As FIG. 2H illustrates, transportable article 170H is disposed within a vehicle 102H. In response to determining one or more characteristic(s) and/or trait(s) of the transportable article 170H, a processor may cause an APC actuator component (not shown in FIG. 2H) to deploy an article protection component 165H. Accordingly, the article protection component 165H is in a first state 172H that is configured to protect/reduce the risk of damage to the transportable article 170H. In response to detecting an emergency condition, the processor may cause the APC actuator component to adjust the state of the article protection component 165H to a second state 174H in order to protect/reduce the risk of damage to the transportable article 170H caused by the emergency condition. For example, in an embodiment in which the transportable article 170H is a glass bowl and the article protection component 165H is a restraint device, when the processor detects that the vehicle 102H is entering a steep downward slopping road segment (the emergency condition), the processor may cause the APC actuator component to adjust the restraint device 165H from a first physical configuration (the first state 172H) to a second physical configuration (the second state 174H) to protect the glass bowl from moving/tipping over, and thus be at risk of suffering damage, caused by the vehicle 102H traveling on the sleep downward sloping road segment.

FIG. 2I illustrates an embodiment and scenario in which one or more article protection components of different types may be selected and deployed to protect one or more transportable articles. As FIG. 2I illustrates, a transportable article 170I and three different types of article protection components 165.1I, 165.2I, and 165.3I are disposed within the interior space of the vehicle 102I. Based on the processor determining one or more characteristic(s) and/or trait(s) of the transportable article 170, the processor may select and deploy the article protection components 165.1I and 165.2I, because they offer the greatest and/or most relevant form of protection for the transportable article 170I, from the subset of article protection components 165.1I, 165.2I, and 165.3I. In response to the processor detecting an emergency condition, the processor may then cause a plurality of APC actuator components (not shown in FIG. 2I) to adjust the state of the article protection components 165.1I and 165.2I. Accordingly, for example, the article protection component 165.2I is adjusted from a first state 172.2I to a second state 174.2I that is configured to protect/reduce the risk of damage to the transportable article 170I. For example, in an embodiment in which the transportable article 170I is a glass bowl, the article protection component 165.1I is a restraint device (e.g., a strut or harness apparatus), the article component 165.2I is an impact dampening pad (e.g., an airbag), the article protection component 165.3I is a temperature control device (e.g., a fan, heater, or air conditioning system), and the emergency condition is an impending collision, the processor may detect the size of the transportable article 170I and that transportable article 170I is made of glass. Accordingly, the processor may select the restraint device 165.1I and the impact dampening pad 165.2I from the subset of article protection components located within the vehicle 102I to be deployed to protect the glass bowl from moving while being transported in the vehicle 102I. When the processor detects that the vehicle 102I is going to be in a collision, the processor may cause the plurality of APC actuator components to deploy/adjust the physical configuration of the restraint device 165.1I and deploy the impact dampening pad 165.2I in order to protect/reduce the risk of damage to the glass bowl 170I. Thus, the APC actuator component may adjust the article protection component 165.2I from a first physical configuration (the first state 172.2I) to a second physical configuration (the second state 174.2I) to protect the glass bowl from breaking. The article protection component 165.3I may be a component that is not useful to the protection of a glass object, such as a refrigerant/blower system, for example.

Adjusting or Selecting a Safety Device

Figure 3A:
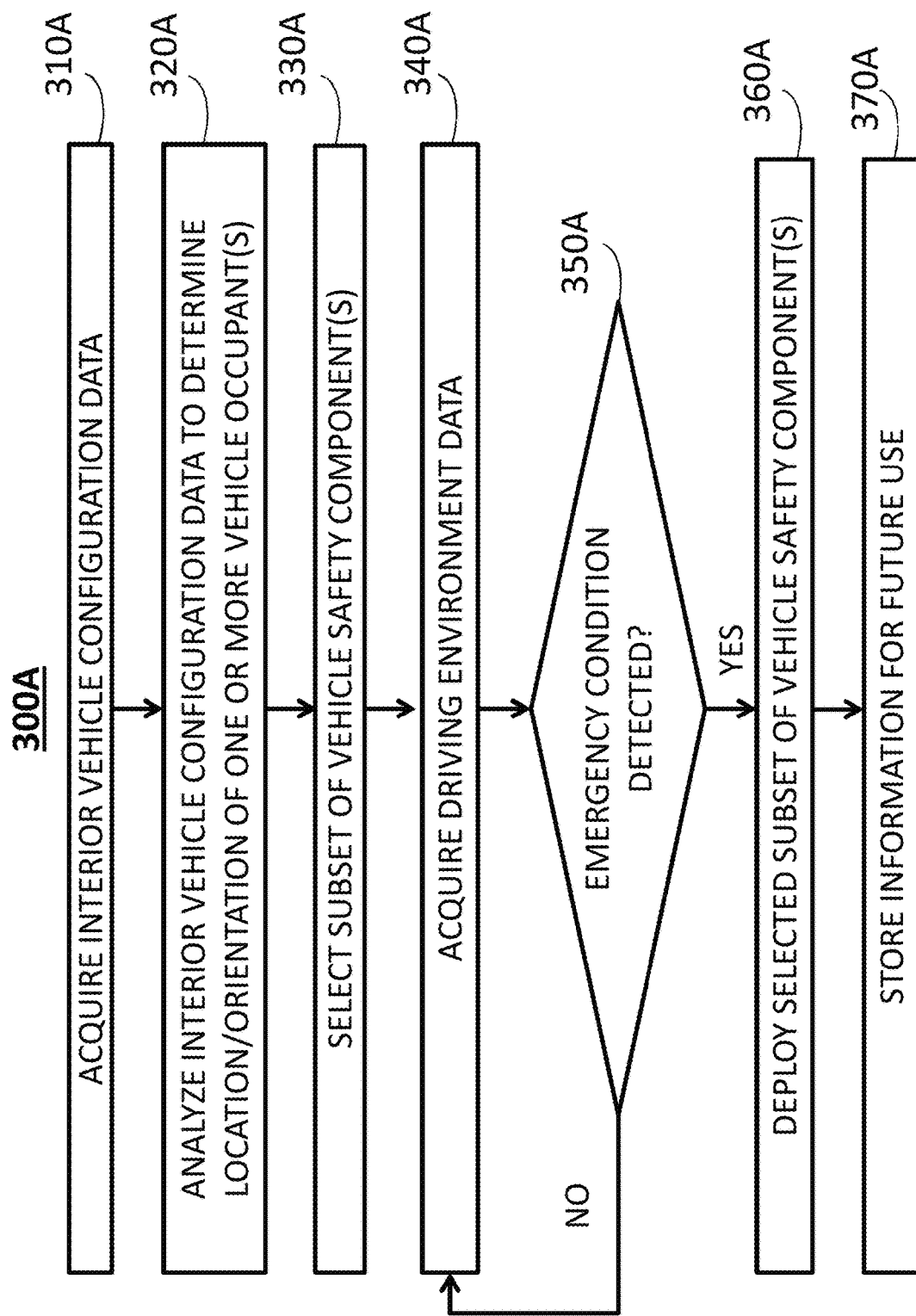
FIG. 3A illustrates a method in which one or more vehicle safety components are selected, based on a location and/or orientation of one or more vehicle occupants, and deployed based on an emergency condition.

FIG. 3A illustrates a method 300A in which one or more vehicle safety components (e.g., the vehicle safety components 160.1-160.6 of the vehicle 102 in FIG. 1C) are selected, based on a location and/or orientation of one or more vehicle occupants, and deployed based on an emergency condition. The method 300A may be implemented as described above in connection with FIGS. 1B and 1C. Accordingly, the method 300A may be partially or completely implemented on the vehicle computer 200.

In the method 300A, interior vehicle configuration data (indicative of the interior space of the vehicle) is acquired (block 310A). Interior vehicle configuration data may be collected, generated, and/or received using a data collection component (e.g., the interior data collection component 120 of FIG. 1C). Once collected, the interior vehicle configuration data may be stored locally within the vehicle, for example in a data storage unit (e.g., the interior vehicle configuration data storage 242 of the vehicle computer 200 of FIG. 1B), and possibly also transmitted remotely to a third party device, machine, server, network, and/or database (e.g., if a driver has expressly agreed to participate in a program involving data collection/sharing). In some embodiments, the third party device, machine, server, network, and/or database may be associated with or operated by or on behalf of an insurance provider. The third party device, machine, server, network, and/or database may be configured to receive, collect, and/or analyze driving environment data and/or other data in accordance with any of the methods described herein.

In some embodiments, vehicle occupant data, corresponding to characteristics and/or traits of one or more occupants riding in the vehicle 102, may also be acquired at block 310A. Vehicle occupant data may also be collected, generated, and/or received using a data collection component (e.g., the interior data collection component 120 of FIG. 1C). Vehicle occupant data may be stored locally within the vehicle, for example in a data storage unit (e.g., the vehicle occupant data storage 238 of the vehicle computer 200 of FIG. 1B), and possibly also transmitted remotely to a third party device, machine, server, network, and/or database (e.g., if a driver has expressly agreed to participate in a program involving data collection/sharing). It should be appreciated that in some embodiments of the method 300A, vehicle occupant data may be utilized in a similar manner as and/or for similar purposes as the interior configuration data.

A location and/or orientation of the one or more vehicle occupants is determined by analyzing (e.g., via the processor 202 of the vehicle computer 200 of FIG. 1B) the collected interior vehicle configuration data (block 320A). In some embodiments, the interior vehicle configuration data may be analyzed in real-time to determine a physical configuration of the interior space of the vehicle, the presence of one or more occupants (e.g., human passengers, non-human animals, etc.) in the vehicle, a location and/or orientation of the one or more vehicle occupants, and/or the actions/behaviors of the one or more vehicle occupants. In one embodiment, the data may be analyzed by comparing acquired interior vehicle configuration data with previously collected interior vehicle configuration data corresponding to a previous status/physical configuration/condition of the interior space of the vehicle. In some embodiments, previously collected interior vehicle configuration data may correspond to an unoccupied/empty interior space of the vehicle. In some embodiments, interior vehicle configuration data may be analyzed to determine a physical configuration of an interior vehicle component (e.g., a passenger seat, storage console, drink holder, desk, etc.), and/or the location and/or orientation of the one or more vehicle occupants relative to the interior vehicle component. For example, in an embodiment in which the interior vehicle component is a passenger seat, the interior vehicle configuration data may be analyzed to determine where the passenger seat is located within the vehicle, whether a vehicle occupant is seated in the passenger seat, the physical configuration about a yaw angle in which the passenger seat is oriented, the physical configuration about a roll angle in which the passenger seat is tilted, and/or the proximity of other interior vehicle components (e.g., other passenger seats, storage consoles, etc.), vehicle occupants (human passengers and/or non-human animals), and/or one or more transportable articles to the passenger seat. In some embodiments, interior vehicle configuration data may be analyzed to determine the one or more vehicle occupants' actions/behavior, or intended/expected actions/behavior, within vehicle. For example, a specific physical configuration of the interior space of the vehicle may correspond to the one or more vehicle occupants sleeping, eating, exercising, working, or engaging in another action/behavior within the interior space of the vehicle.

In embodiments in which vehicle occupant data is collected, vehicle occupant data may be analyzed to determine physical characteristics and/or traits of the one or more vehicle occupants. For example, vehicle occupant data may indicate the type of occupant (e.g., adult human, child human, trained dog, untrained dog, horse, reptile, etc.), size of the occupant (e.g., height, weight, etc.), whether the occupant is wearing some type of article (e.g., glasses, a brace, leash, etc.), and/or whether the occupant has a medical condition/disability (e.g., missing limbs, asthma, heart condition, bad back, etc.).

In some embodiments, the type of vehicle occupant, and/or location and/or orientation of the one or more vehicle occupants, for example, may be determined by comparing the interior vehicle configuration data and/or vehicle occupant data, with a maximum or minimum criteria/threshold that is indicative of the point at which an interior vehicle configuration condition (e.g., presence of a vehicle occupant) is detected. In some embodiments, the criteria/threshold indicative of the point at which an interior vehicle configuration condition is detected may be stored in a data storage unit (e.g., the interior vehicle configuration detection criteria data storage 246 of FIG. 1B). Once determined, the data corresponding to the physical configuration of the interior space of the vehicle, such as the location and/or orientation of the one or more vehicle occupants, may be stored locally within the vehicle (e.g., in the interior vehicle configuration data storage 242 of FIG. 1B), and possibly also transmitted remotely to a third party device, machine, server, network, and/or database (e.g., if a driver has expressly agreed to participate in a program involving data collection/sharing). In some embodiments, the third party device, machine, server, network, and/or database may be associated with or operated by or on behalf of an insurance provider. In some embodiments, the data corresponding to the interior space of the vehicle may be used to adjust, generate, and/or update an insurance policy, premium, rate, discount, and/or reward for the specific driver, passenger, and/or the insured individual.

In response to determining the physical configuration of the interior space of the vehicle, the processor may select a subset of vehicle safety components (i.e., one or more of the vehicle safety components) to be active from a plurality of vehicle safety components (block 330A). The interior space of the vehicle may contain a plurality of vehicle safety components (e.g., airbags, occupant restraint devices, fire extinguishing agents, etc.) configured to be deployed to protect/reduce the risk of injury to a vehicle occupant when an emergency condition is detected. For example, the vehicle may contain airbags and occupant restraint devices in multiple locations within the interior space of the vehicle (e.g., one or more airbags and restraints device dedicated for each of the front left side, front right side, back left side, and back right side of the vehicle). Based on the determined location and/or orientation of the one or more vehicle occupants, the processor may select a subset of the plurality of vehicle safety components to be active. For example, in an embodiment in which the plurality of vehicle safety components are airbags disposed within the interior space of the vehicle, in response to detecting a vehicle occupant is sitting facing forward in the front left side of the vehicle, the processor may select those airbags that are located in the front and/or left side of the vehicle to be active. Whereas the processor may not select those airbags located in the back and/or right side of the vehicle to be active because, if deployed, they would not protect/reduce the risk of injury to the vehicle occupant. In another embodiment, the processor may select the subset of the plurality of vehicle safety components to be active from amongst a plurality of different types of vehicle safety components. For example, when the vehicle occupant is a dog, the processor may select a harness/leash to be active, as opposed to airbags or a seatbelt configured for a human vehicle occupant.

Once the processor has selected the subset of the plurality of vehicle safety components, the processor sets the selected subset of the plurality of vehicle safety components to be in an activate state that enables the selected subset of the plurality of vehicle safety components to be deployed when an emergency condition is detected. In some embodiments, the selected subset of the plurality of vehicle safety components may be stored as data in a data storage unit (e.g., the vehicle safety component configuration data storage 234 of FIG. 1B). For example, when the emergency condition is an impending vehicle collision and the selected subset of the plurality of vehicle safety components are a plurality of airbags, the airbags set to being in an active state will be deployed when the processor detects the vehicle is going to be in a collision.

In some embodiments, the vehicle occupant data, collected by an interior data collection component (such as the interior data collection component 120 of FIG. 1C) and stored in a data storage (such as the vehicle occupant data storage 238 of FIG. 1B), may also be used to select which of the plurality of the vehicle safety components may be active. For example, if a vehicle occupant is pregnant, this information may be factored into determining which type of plurality of vehicle safety component to select, from which location to deploy a vehicle safety component, and/or with what amount of force/speed to deploy the selected subset of the plurality of the vehicle safety components, because certain types of vehicle safety components (e.g., airbags, restraint devices, etc.), manners of deployment (e.g. rapid or sharp deployment generating high amounts of force), and/or deployment configurations (e.g., deployed from a physical configuration that puts pressure on the vehicle occupant's stomach) may be detrimental to the pregnant vehicle occupant and/or her child.

Similarly, for example, if a vehicle occupant has a back injury/condition, deploying a certain type of vehicle safety component and/or deploying a vehicle safety component in a certain manner may cause the vehicle occupant discomfort and/or may further aggravate the condition. Therefore, the vehicle occupant data may be considered in determining the vehicle safety component to select. For example, in an embodiment in which the plurality of vehicle safety components includes an airbag and restraint device, selecting and deploying the airbag (in response to detecting an emergency condition such as an impending collision) with too much force/too rapidly may cause a vehicle occupant with a back condition to experience whiplash that puts more strain on his/her back than the force caused by the collision impact. Whereas the restraint device may provide similar safety benefits as the airbag, but not cause the vehicle occupant to experience any detrimental effects caused by deployment of the restraint device.

In the method 300A, driving environment data indicative of a physical environment external to the vehicle is acquired (block 340A). Driving environment data may be collected, generated, and/or received using an external environment component (e.g., the external environment component 112 of FIG. 1C). In some embodiments, some or all of the driving environment data may be received from a third party device, machine, server, network, and/or database. Once collected, the driving environment data may be stored locally within the vehicle, for example in the driving environment data storage 212 of the vehicle computer 200, and possibly also transmitted remotely to a third party device, machine, server, network, and/or database (e.g., if a driver has expressly agreed to participate in a program involving data collection/sharing). In some embodiments, the third party device, machine, server, network, and/or database may be associated with or operated by or on behalf of an insurance provider. The third party device, machine, server, network, and/or database may be configured to receive, collect, and/or analyze driving environment data and/or other data in accordance with any of the methods described herein. For example, driving environment data may be received, either directly or through an intermediate network, from other vehicles traveling on the same road as the vehicle and/or an infrastructure component along the road, either directly or through an intermediate network.

In some embodiments, at block 340A, interior vehicle environment data corresponding to changes in the physical environment of the interior space of the vehicle may also be acquired, in addition to or in place of the external environment data. Interior vehicle environment data may be collected, generated, and/or received using the interior data collection component (e.g., the interior data collection component 120 of FIG. 1C). Once collected, the interior vehicle environment data may be stored locally within the vehicle, for example in a data storage unit of the vehicle computer 200, and possibly also transmitted remotely to a third party device, machine, server, network, and/or database (e.g., if a driver has expressly agreed to participate in a program involving data collection/sharing). It should be appreciated that in some embodiments of the method 300A, interior vehicle environment data may utilized in a similar manner as and/or for similar purposes as the external environment data and/or interior vehicle environment data.

In some embodiments, at block 340A, vehicle operation data representing the functional outputs of the vehicle may also be acquired, in addition to or in place of the external environment data and/or interior vehicle environment data. The vehicle operation data, which may include or otherwise be based on vehicle control data generated by a vehicle operation controller (e.g., the vehicle operation controller 150 of FIG. 1C), may transmitted to a vehicle computer (e.g. the vehicle computer 200 of FIGS. 1A, 1B, and 1C) and stored in a data storage (e.g. the vehicle operation data storage 222), and possibly also transmitted remotely to a third party device, machine, server, network, and/or database (e.g., if a driver has expressly agreed to participate in a program involving data collection/sharing). It should be appreciated that in some embodiments of the method 300A, vehicle operation data may utilized in a similar manner as and/or for similar purposes as the external environment data.

The method 300A determines whether an emergency condition exists by analyzing the received driving environment data (block 350A). It should be appreciated that in some embodiments, at block 350A the method 300A may determine whether an emergency conditions exists by analyzing the received interior vehicle environment data and/or vehicle operation data, in addition to or instead of analyzing the driving environment data, using methods and/or techniques similar to those described herein. In some embodiments, the driving environment data is analyzed in real-time to determine whether an emergency condition exists that may be hazardous to the operation of the vehicle and/or the one or more vehicle occupants' safety. In some embodiments where vehicle operation data is acquired at block 340A, the vehicle operation data is analyzed to determine whether an emergency condition exists based on the vehicle taking a specific action that may be hazardous to the operation of the vehicle and/or the one or more vehicle occupants' safety the processor It should be understood that a vehicle "action" may comprise a single maneuver (e.g. accelerating, braking, turning the steering wheel, etc.), a combination of maneuvers (e.g. changing lanes—which entails a combination of changing speeds and turning, or changing lanes and then pulling onto a shoulder, etc.), an operational state (e.g. a speed of the vehicle, applying the brakes, etc.), or a change in operational state.

In one embodiment, the driving environment data may be analyzed by comparing acquired driving environment data corresponding to current driving environment conditions, previously collected driving environment data corresponding to past driving environment conditions, current vehicle operation data, and/or past vehicle operation data. Examples of current driving environment conditions may include objects currently adjacent to the vehicle, objects within the current trajectory of the vehicle, current traffic conditions, current road conditions, current weather conditions, and/or any other data about the current state of the driving environment external to the vehicle. Past conditions may include past traffic conditions, past road conditions, past weather conditions, and/or any other data about the previous state of the driving environment external to the vehicle. Past conditions may also include data about conditions that are similar to the current conditions and may further include data about conditions in the same or similar locations, and/or past behavior/actions of the same or similar type of vehicle, driver, pedestrian, and/or non-human animal adjacent to the vehicle.

The driving environment data may also be analyzed to predict the likelihood of future behavior, actions, and/or events. For example, the expected path of an adjacent vehicle may be predicted, in furtherance of determining whether an emergency condition exists, by analyzing data corresponding to where and/or how the adjacent vehicle is driving or has driven in the recent past (e.g., speeds of the adjacent vehicle, and/or other driving habits/behavior such as frequently makes sudden stops, changing lanes, etc.). Accordingly, analyzing this data may help the processor determine the likelihood of an emergency condition occurring and/or determine more readily when an emergency condition does exist.

Driving environment data may also be analyzed to determine when (e.g., a time of day, time of year, etc.) and/or under what conditions a vehicle is at an elevated risk of exposure to an emergency condition. For example, certain road areas may be more problematic during rush hour or at night, during winter months when roads freeze over, when under construction, or when it is raining. In another example, driving environment data may indicate that certain intersections or portions of roads may be associated with a higher-than-average number of vehicle, bicycle, and/or pedestrian collisions, a higher amount of traffic, a large amount of road construction, and/or abnormal traffic patterns.

For example, to determine whether a particular emergency condition exists, such as an impending collision, the method may compare the received driving environment data with data covering the same weather and road conditions for the same speed at which the vehicle is traveling. The driving environment data may be analyzed to determine whether certain roads and/or intersections are prone to certain types of collision-causing hazards (such as parked cars, wildlife running into the road, roads seldom sprinkled with salt to prevent icing over, potholes, sharp turns, narrow roads, etc.). The driving environment data may indicate that the vehicle is approaching a slowing or parked vehicle, and given the current speed of the vehicle and the distance between the vehicle and the slowing/parked vehicle, the vehicle is going to collide with the slowing or parked vehicle.

In some embodiments, the existence of an emergency condition may be determined by comparing the driving environment data with a maximum or minimum criteria/threshold that is indicative of the point at which an emergency condition is detected. In some embodiments, the criteria/threshold indicative of the point at which an emergency condition is detected may be stored in a data storage unit (e.g., the emergency condition criteria data storage 216 of FIG. 1B). To detect the emergency condition, the driving environment data, or the value corresponding to the driving environment data, may need to be equal to, less than, or greater than the criteria/threshold, or a value corresponding to the criteria/threshold.

These thresholds may apply directly to the driving environment data or may apply to a more advanced driving environment data analysis. For example, in one embodiment configured to detect whether an adjacent vehicle is going to collide with the vehicle (the emergency condition), data corresponding to the distance between the vehicle and the adjacent vehicle (the driving environment data) may be analyzed by the processor. In such an embodiment, the threshold for detecting an impending collision may be a distance between the two vehicles that is 2-feet or less. Consequently, when the analysis of the driving environment data reveals the distance between the vehicle and the adjacent vehicle is only 1.5-feet, the processor detects that there is a risk of an impending collision (thereby detecting the existence of the emergency condition). However, an impending collision may not be detected until the adjacent vehicle and the vehicle are within 2 feet or less of each other. In this way, until the emergency is detected, unnecessarily deploying the vehicle safety component may be avoided.

Further, depending on other relevant conditions, different threshold values (i.e. larger or smaller) may be used to detect an emergency condition. For example, in detecting the likelihood of an impending collision (the emergency condition) between a vehicle and an adjacent vehicle based on the distance between the two vehicles, weather conditions, traffic conditions, and/or road conditions may be taken into account in determining a threshold value. In such an embodiment, when it is snowing and the road is icy, the threshold indicative of an impending collision may increase from "2 feet or less" to "10 feet or less" between the two vehicles because of the increased risk of a vehicle skidding.

Alternatively, in an embodiment, the driving environment data may be used to calculate a different value associated with the likelihood of an emergency condition occurring. In such an embodiment, the emergency condition may be detected when the determined value exceeds a predetermined value, indicative of the likelihood of an emergency condition occurring. The calculated value may reflect, for example, a predicted probability of a collision between the vehicle and an external object, or predicted likelihood of an injury to the one or more vehicle occupants. For example, based on the analysis of the collected driving environment data, an impending collision may be detected when there is a 75% chance or higher likelihood that the vehicle and the external object will collide. In another example, based on the analysis of the collected driving environment data, an emergency condition may be detected because the emergency condition is indicative of an above 50% chance that the one or more vehicle occupants may suffer an injury.

While some embodiments of the method 300A have been discussed using individual thresholds to detect an emergency condition, it should be appreciated that detection of an emergency condition may entail the use of multiple criteria and/or thresholds, and/or machine learning (as discussed further below). Further, an embodiment using more than one criteria/threshold may not require that every criterion/threshold be met/exceeded to determine an emergency condition exists. For example, in one embodiment and scenario, driving environmental data may be analyzed to determine whether a moving vehicle (such as the adjacent object 199 of FIG. 1C) is going to collide with a stationary vehicle (such as the vehicle 102 of FIG. 1C). Data related to criteria such as the distance between the moving vehicle and the stationary vehicle, the speed of the moving vehicle, the trajectory of the moving vehicle, the slipperiness of the road on which the moving vehicle is driving, whether the stationary vehicle is parked or just has the brakes temporarily applied, whether the stationary vehicle has sufficient space or time to move out of the trajectory of the vehicle, and/or any other relevant criteria, may be analyzed to detect whether a collision between the two vehicles may occur. While the speed of the vehicle may be determined to not exceed a threshold indicative of an impending collision with the stationary vehicle, the emergency condition of collision between the two vehicles may nonetheless still be detected because the slipperiness of the road exceeds a certain threshold value and the stationary vehicle is parked and does not have adequate space and/or time to move out of the trajectory of the moving vehicle.

In some embodiments, one or more real-time calculations may be performed, using the driving environment data, to determine whether an emergency condition exists. In an example in which the vehicle is stopped but another vehicle (the external object) is approaching the vehicle, driving environment data corresponding to the approaching vehicle's speed and the distance between the two vehicles may be analyzed to determine whether a collision will occur. The collected driving environment data may be used to calculate whether the approaching vehicle is travelling at a speed at which it would be physically incapable of stopping, given the distance between the two vehicles, without colliding with the stopped vehicle. In another example, driving environment data corresponding to a speed limit in kilometers per hour may be collected and then converted into a speed limit in miles per hour in furtherance of detecting an emergency condition.

When an emergency condition is not detected, the method returns to block 340A to collect more driving environment data and repeats part of the method 300A as described above (e.g., on a periodic basis). However, when the emergency condition is detected, the method proceeds to block 360A.

In response to detecting the emergency condition, an actuator program, stored in an actuator program memory (for example the actuator program memory 232 of FIG. 1B), is executed to cause one or more actuator components (such as the VSC actuator components 130.1-130.6 of FIG. 1C) to deploy the selected subset of the plurality of vehicle safety component(s) (such as the vehicle safety components 160.1-160.6 of FIG. 1C) (block 360A). In some embodiments, the actuator program determines which vehicle safety component(s) to deploy based on the data that was stored in a data storage unit (e.g., the vehicle safety component configuration data storage 234 of FIG. 1B) at block 330A.

In some embodiments, deploying the selected subset of the plurality of vehicle safety components is intended to reduce the risk of injury to and/or protect the vehicle occupant(s). For example, in an embodiment in which the external environment data corresponds to an impending collision (the emergency condition) and the selected subset of the plurality of vehicle safety components is an airbag, in response to detecting the impending collision, the actuator component may deploy the airbag to reduce the risk of the one or more vehicle occupants suffering an injury caused by the impact from the collision.

As another example, interior vehicle environment data may correspond to a fire within the interior space of the vehicle (the emergency condition) and the selected subset of the plurality of vehicle safety components may be a fire extinguishing agent. In response to detecting the fire within the interior space of the vehicle, the actuator program may deploy the fire extinguishing agent to extinguish the fire in order to reduce the risk of the one or more vehicle occupants being burned by the fire.

As still another example, vehicle operation data may correspond to the vehicle taking a sharp turn (the emergency condition) and the selected subset of the plurality of vehicle safety components may be a restraint device. In response to detecting the vehicle is taking a sharp turn, the actuator component may deploy the restraint device to prevent the one or more vehicle occupants from being displaced, and potentially injured, as a result of the vehicle taking the sharp turn.

In some embodiments of the method 300A, information received, generated, calculated, detected, and/or determined during the method 300 may be stored for future use (block 370A). Stored information may include, but is not limited to, the, interior vehicle configuration data collected at block 310A, vehicle occupant data collected at block 310A, the interior vehicle configuration determined at block 320A, the selected subset of the plurality of vehicle safety components at block 330A, the driving environment data (and/or other data) collected at block 340A, and/or the emergency condition detected at block 350A. Storing this information for future use may improve the accuracy and/or speed of analyzing driving environment data, detecting an emergency condition, training machine learning models which may be used for detecting the emergency condition, determining an interior vehicle configuration, determining which vehicle safety component(s) to select, determining which vehicle safety component(s) to deploy, and/or determining a manner in which to deploy the selected vehicle safety component(s). The recorded information may be stored locally in the vehicle computer and/or may be transmitted to a third party machine (e.g., if a driver has expressly agreed to participate in a program involving data collection/sharing). In some embodiments, recorded information may be used for generating, adjusting, evaluating, investigating, analyzing, or prospecting insurance coverage, parameters of the insurance policy (e.g., a deductible), a premium, a rate, a discount, and/or a reward for the specific driver, passenger, or the insured individual.

In some embodiments, the method 300A does not include block 340A, and the emergency condition is detected at block 350A in a mechanical sense rather than by processing data. For example, the selected subset of vehicle safety components may be physically "unlocked" at block 330A (e.g., by releasing a latch), and deployed at block 360A via a hardware mechanism that is triggered upon a sufficiently forceful impact.

Figure 3B:
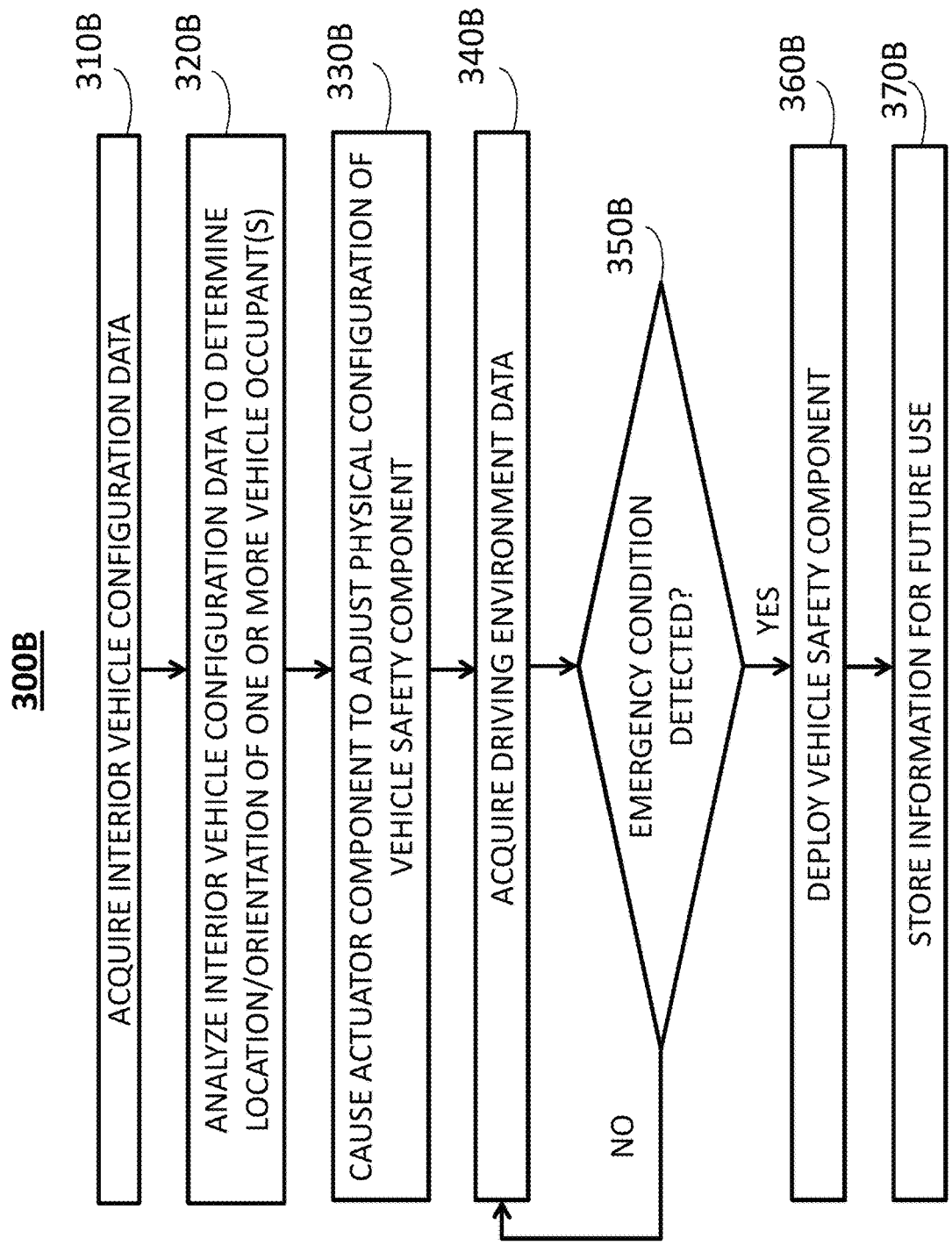
FIG. 3B illustrates a method in which the physical configuration of a vehicle safety component is adjusted based on the location and/or orientation of one or more vehicle occupants, and deployed.

FIG. 3B illustrates a method 300B in which the physical configuration of a vehicle safety components is adjusted based on the location and/or orientation of one or more vehicle occupants, and deployed. Steps 310B, 320B, 340B, 350B, 360B, and 370B may be performed in the same manner as steps 310A, 320A, 340A, 350A, 360A, and 370A, respectively, of the method 300A as described with reference to FIG. 3A, for example. Moreover, block 340B may be omitted, and the vehicle safety component may be deployed at block 360B via a purely hardware mechanism, as discussed above in connection with FIG. 3A. The method 300B may be implemented as described above in connection with FIGS. 1A and 1B.

Block 330B, however, may differ from block 330A of the method 300A. In the method 300B, in response to detecting the location and/or orientation of the one or more vehicle occupants, an actuator program, stored in an actuator program memory (e.g., the actuator program memory 232 of FIG. 1B), is executed to cause an actuator component (such as the VSC actuator component 130 of FIG. 1A) to adjust the physical configuration of the vehicle safety component (e.g., the vehicle safety component 160 of FIG. 1A) (block 330B). The actuator program causes the vehicle safety component to be adjusted from an initial/first physical configuration to a second physical configuration. The second physical configuration of the vehicle safety component may correspond to interior vehicle configuration data stored in a data storage unit (e.g., the interior vehicle configuration data storage 242 of FIG. 1B).

In some embodiments, adjusting the physical configuration of the vehicle safety component from a first physical configuration to the second physical configuration is intended put the vehicle safety component in a physical configuration that, when deployed, protects/reduces the risk of injury to the one or more vehicle occupants. For example, when the vehicle safety component is an airbag and the processor determines that a vehicle occupant is seated in the front right side of the vehicle facing out, the actuator component may move the airbag from the left side of the vehicle to the front ride side of the vehicle. Thus, if an emergency condition, such as a collision, is detected, the airbag can be deployed from a physical configuration that will adequately protect the vehicle occupant.

In another example in which the vehicle safety component is an airbag, the actuator component may adjust the location and/or orientation of the airbag in response to a vehicle occupant adjusting his/her location and/or orientation within the vehicle. For example, when the vehicle occupants is seated in a passenger seat and swivels in the passenger seat from facing towards the front of the vehicle to facing towards the left side of the vehicle, the actuator component may adjust the physical configuration of the airbag from a location that was configured to protect the vehicle occupant facing the front of the vehicle (the first physical configuration) when deployed, to a new location configured to protect the vehicle occupant facing the left side of the vehicle (the second physical configuration) when deployed.

In some embodiments, the vehicle safety component may be adjusted from a first physical configuration to a second physical configuration in response to determining the one or more vehicle occupants are engaging in a specific action, activity, or behavior. For example, in an embodiment in which the vehicle safety component is an airbag and the processor determines a human vehicle occupant is working on a computer while traveling in the vehicle, the actuator component may adjust the physical configuration of the airbag. In response to an emergency condition such as a collision or impending collision, the airbag will be deployed from a location and/or orientation that protects the human vehicle occupant from being injured by the computer.

In some embodiments, vehicle occupant data, collected by the interior data collection component (such as the interior data collection component 120 of FIG. 1A) and stored in a data storage (such as the vehicle occupant data storage 238 of FIG. 1B), may also be used to determine and/or affect the second physical configuration of the vehicle safety component. For example, if a vehicle occupant is pregnant, this information may be factored into determining what location and/or orientation to cause the actuator component to deploy the vehicle safety component from because certain movements (e.g. rapid or sharp movements) and/or configurations (e.g. a configuration that puts pressure on the vehicle occupant's stomach) may be detrimental to the pregnant vehicle occupant and/or her child. In an embodiment in which the one or more vehicle occupants is a pregnant passenger and the vehicle safety component is an airbag, for example, the actuator component may adjust the physical configuration of the airbag to a location and/or orientation so that if deployed (e.g., in response to the processor detecting an emergency condition such as an impending collision), the airbag does not make contact with the pregnant passenger's stomach area.

Similarly, if the one or more vehicle occupants has a pre-existing injury/condition, deploying the vehicle safety component from a certain physical configuration may cause the one or more vehicle occupants discomfort and/or may further aggravate the injury/condition. For example, in an embodiment in which the one or more vehicle occupants have back injuries/conditions, the vehicle safety component is an airbag, and the emergency condition is an impending collision, the actuator component may adjust the physical configuration of the airbag so that when the airbag is deployed it does not cause any strain on the vehicle occupant's back.

It should be appreciated that in some embodiments, the vehicle safety component may be adjusted from the first physical configuration to the second physical configuration at any point in the method 300B after the processor has determined the location and/or orientation of the one or more vehicle occupants. In one embodiment, the physical configuration of the vehicle safety component may not be adjusted until after the processor has detected the emergency condition. For example, in an embodiment in which the emergency condition is a fire within the vehicle and the vehicle safety component is a fire extinguishing agent/device, in response to detecting a fire within the vehicle, the processor may cause the actuator component to adjust the physical configuration of the fire extinguishing agent/device in order to enable the fire extinguishing agent/device to be in a location/orientation better suited to extinguish the fire when deployed.

After the actuator program has been executed to determine the second physical configuration of the vehicle safety component, then the physical configuration of the vehicle safety component may be adjusted from the first physical configuration to the second physical configuration.

Dynamic Safe Storage of Vehicle Content

Figure 4A:
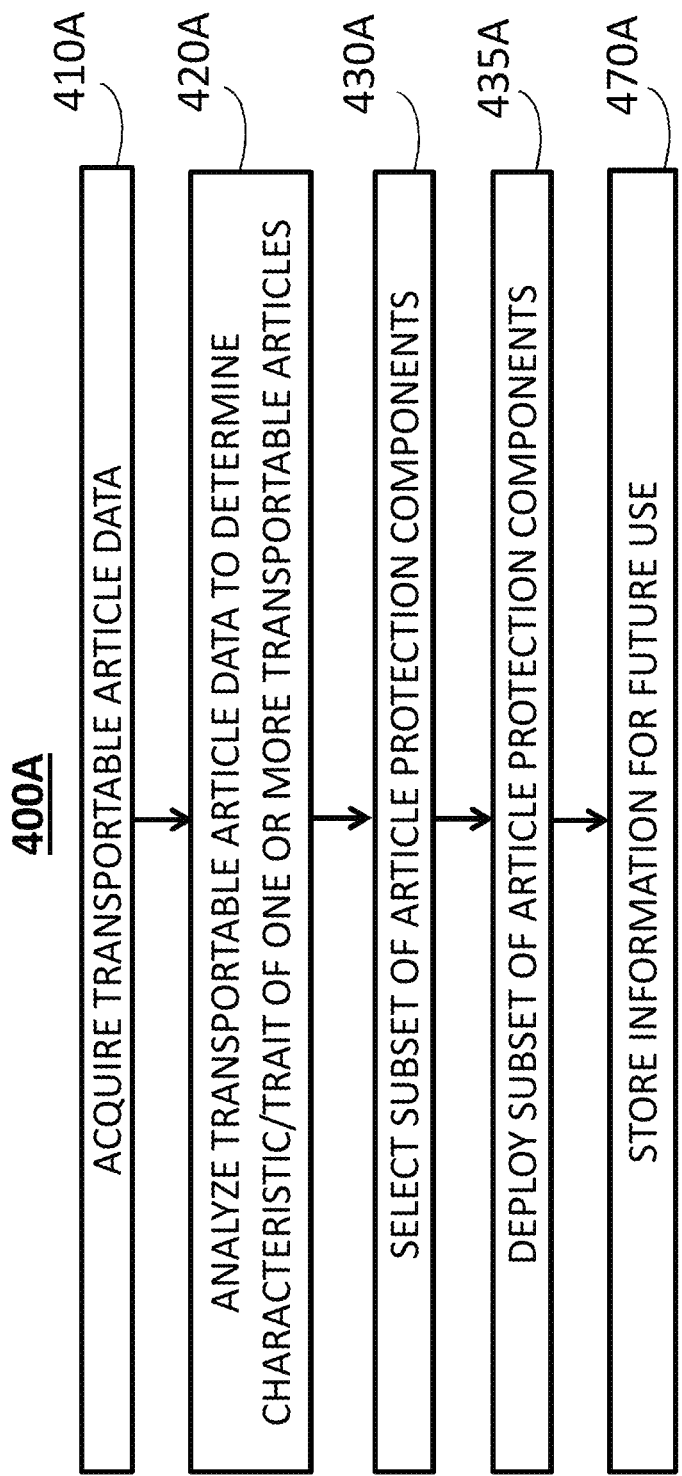
FIG. 4A illustrates a method in which one or more article protection components are selected, based on one or more characteristic(s) and/or trait(s) of one or more transportable articles, and deployed to protect the one or more transportable articles.

FIG. 4A illustrates a method 400A in which one or more article protection components (e.g., the article protection components 165.1-165.3 of the vehicle 102 in FIG. 1C) are selected, based on one or more characteristic(s) and/or trait(s) of one or more transportable articles (e.g., the transportable article 170 of FIG. 1C), and deployed to protect the one or more transportable articles. The method 400A may be implemented as described above in connection with FIGS. 1B and 1C. Accordingly, the method 400A may be partially or completely implemented on the vehicle computer 200.

In the method 400A, transportable article data (indicative of one or more transportable articles within interior space of the vehicle, and in some embodiments also indicative the interior space of the vehicle itself) is acquired (block 410A). Transportable article data may be collected, generated, and/or received using a data collection component (e.g., the interior data collection component 120 of FIG. 1C). Once collected, the transportable article data may be stored locally within the vehicle, for example in a data storage unit (e.g., the transportable article data storage 252 of the vehicle computer 200 of FIG. 1B), and possibly also transmitted remotely to a third party device, machine, server, network, and/or database (e.g., if a driver has expressly agreed to participate in a program involving data collection/sharing). In some embodiments, the third party device, machine, server, network, and/or database may be associated with or operated by or on behalf of an insurance provider. The third party device, machine, server, network, and/or database may be configured to receive, collect, and/or analyze driving environment data and/or other data in accordance with any of the methods described herein.

The method 400A determines one or more characteristic(s) and/or trait(s) of the one or more transportable articles by analyzing (e.g., via the processor 202 of the vehicle computer 200 of FIG. 1B) the transportable article data (block 420A). In some embodiments, the transportable article data may be analyzed in real-time to determine the existence of one or more transportable articles within the vehicle. The transportable article data may also be analyzed to determine a location and/or orientation of the one or more transportable articles within the interior space of the vehicle. In one embodiment, the transportable article data may be analyzed by comparing acquired transportable article data with data in a database, corresponding to predetermined types of transportable articles, and/or previously collected transportable article data corresponding to one or more previously transported articles. The processor may determine one or more characteristic(s) and/or trait(s) corresponding to, for example, the type of the one or more transportable articles (e.g., perishable food, furniture, glassware, electronic equipment, sporting equipment, toxic chemicals, etc.), the size of the one or more transportable articles (e.g., height, width, length, weight, etc.), the required or recommended temperature for storing the one or more transportable articles (e.g., cold for perishable groceries, warm for a pizza delivery, etc.), and/or any other characteristic or trait relevant to protecting the one or more transportable articles. For example, in an embodiment in which the one or more transportable articles are glassware, the transportable article data may identify the one or more transportable articles as being made of glass, the quantity of glassware (e.g., four plates), and/or the weight of the glassware. Further, the transportable article data may also correspond to the location and/or orientation of the glassware within the vehicle (e.g., the four plates stacked on top of each other, on the floor in the back end of the vehicle).

In some embodiments, the type of the one or more transportable articles, for example, may be determined by comparing the transportable article data with a maximum or minimum criteria/threshold that is indicative of the point at which a specific type of characteristic and/or trait is detected. In some embodiments, the criteria/threshold indicative of the point at which a specific characteristic and/or trait is detected may be stored in a data storage unit (e.g., the transportable article data storage 252 of FIG. 1B). Once determined, the data corresponding to one or more characteristic(s) and/or trait(s) of the one the one or more transportable articles, such as the type and size of the transportable article, may be stored locally within the vehicle (e.g., in the transportable article data storage 236 of FIG. 1B), and possibly also transmitted remotely to a third party device, machine, server, network, and/or database (e.g., if a driver has expressly agreed to participate in a program involving data collection/sharing). In some embodiments, the third party device, machine, server, network, and/or database may be associated with or operated by or on behalf of an insurance provider. In some embodiments, the data corresponding to the interior space of the vehicle may be used to adjust, generate, and/or update an insurance policy, premium, rate, discount, and/or reward for the specific driver, passenger, and/or the insured individual.

In response to determining the one or more characteristic(s) and/or trait(s) of the one or more transportable articles, the processor may select a subset of article protection components (i.e., one or more of the article protection components) to be active from a plurality of article protection components (block 430A). The interior space of the vehicle may contain a plurality of article protection components (e.g., impact dampening pads, restraint devices, containers, temperature control devices, light exposure control components, fire extinguishing agents, etc.) configured to be deployed to protect/reduce the risk of damage to the one or more transportable articles. For example, the vehicle may contain a plurality of impact dampening pads in multiple locations within the interior space of the vehicle (e.g., one or more pads for each of the front left side, front right side, back left side, back right side, trunk, consoles, etc. of the vehicle). For example, in an embodiment in which the transportable article is a glass object and the plurality of article protection components include impact dampening pads disposed within the interior space of the vehicle, in response to determining the transportable article is a glass object in the trunk of the vehicle, the processor may select those impact dampening pads that are located in the trunk of the vehicle to be deployed to cushion the glass object. Conversely, the processor may not select other impact dampening pads, positioned in locations besides the trunk, because deploying them would not protect/reduce the risk of damage to the glass object. In some embodiments, the subset of article protection components may be selected from amongst a plurality of different types of article protection components. In the glass object scenario described above, for example, the processor may select and deploy impact dampening pads and/or a restraint device, and not select or deploy other devices that are configured to control temperature, light exposure, and/or other factors that would not have a significant effect on protecting a glass object.

Once the processor has selected the subset of the plurality of article protection components, the processor deploys the selected subset of the plurality of article protection components to be in an activate state that protects/reduces the risk of damage to the one or more transportable article (block 435A). In some embodiments, the selected subset of the plurality of article protection components may be stored as data in a data storage unit (e.g., the article protection component data storage 236 of FIG. 1B). For example, in an embodiment in which the transportable article includes packages of ice cream and the article protection component of a temperature control device has been selected, after the packages of ice cream are analyzed and detected, the processor may cause the temperature control apparatus to adjust the temperature of the interior space of the vehicle, or a section of the interior of the vehicle that is storing the packages of ice cream, in order to keep the packages of ice cream frozen and to prevent the ice cream from melting. Similarly, for example, additional article protection components, such as a restraint device, may be selected and deployed to secure the packages of ice cream and prevent the packages of ice cream from moving/tipping over/spilling while being transported in the vehicle. In some embodiments, the vehicle may begin/resume operation before, during, and/or after the article protection component(s) have been deployed.

In some embodiments of the method 400A, information received, generated, calculated, detected, and/or determined during the method 400A may be stored for future use (block 470A). Stored information may include, but is not limited to, the, transportable article data collected at block 410A, the characteristic and/or traits of the transportable article determined at block 420A, the subset of the plurality of article protection components selected at block 430A, and/or the subset of the plurality of article protection components deployed at block 435A. Storing this information for future use may improve the accuracy and/or speed of analyzing transportable article data, determining one or more characteristic(s) and/or trait(s) of one or more transportable articles, training machine learning models which may be used for determining one or more characteristic(s) and/or trait(s) of one or more transportable articles, determining which article protection component(s) to select, determining which article protection component(s) to deploy, and/or determining a manner in which to deploy the selected article protection component(s). The recorded information may be stored locally in the vehicle computer and/or may be transmitted to a third party machine (e.g., if a driver has expressly agreed to participate in a program involving data collection/sharing). In some embodiments, recorded information may be used for generating, adjusting, evaluating, investigating, analyzing, or prospecting insurance coverage, parameters of the insurance policy (e.g., a deductible), a premium, a rate, a discount, and/or a reward for the specific driver, passenger, or the insured individual.

Figure 4B:
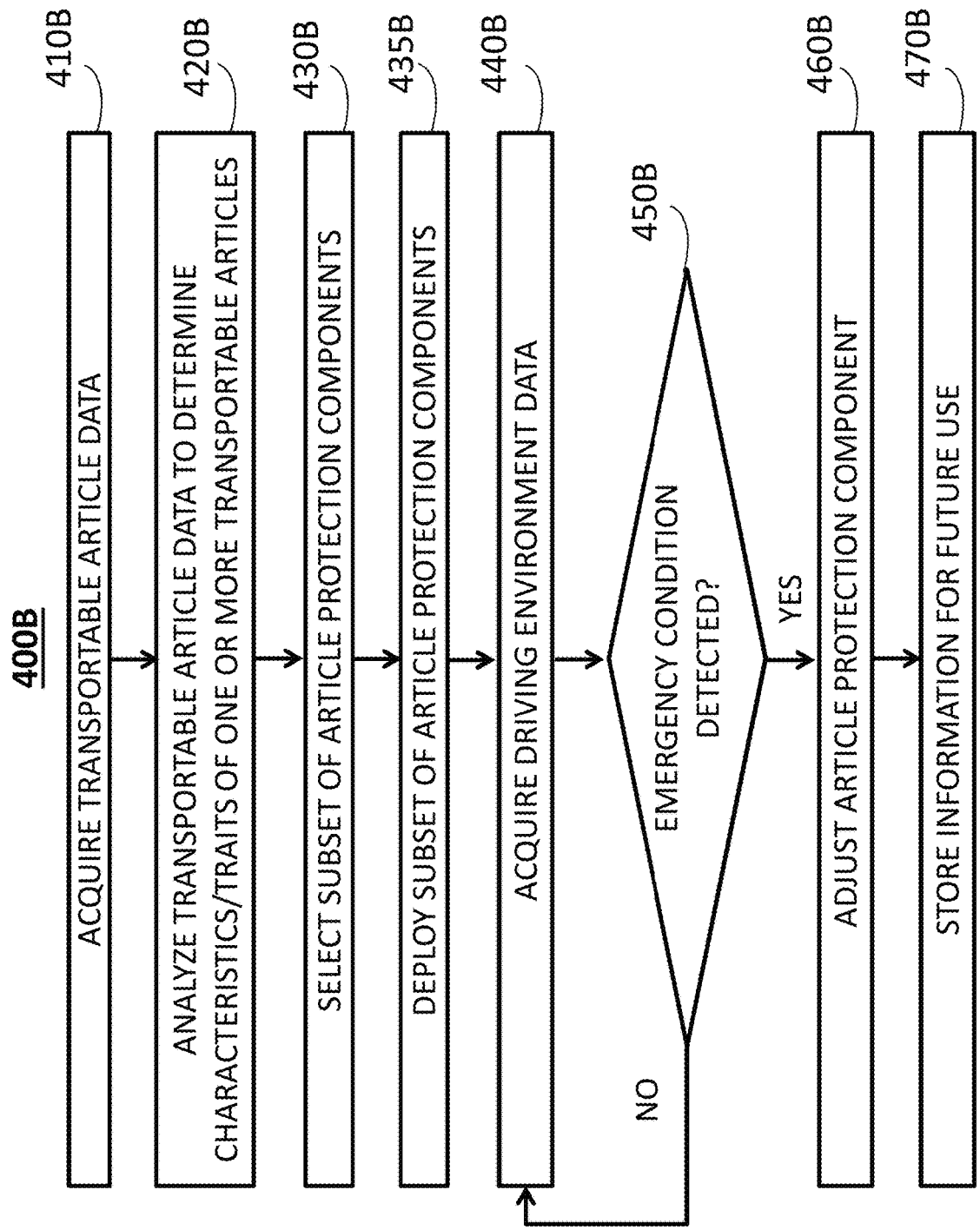
FIG. 4B illustrates a method in which an article protection component is adjusted based on an emergency condition.

FIG. 4B illustrates a method 400B in which an article protection component is adjusted based on the based an emergency condition. Blocks 410B, 420B, 430B, 435B, and 470B may be performed in the same manner as blocks 410A, 420A, 430A, 435A, and 470A, respectively, of the method 400A as described with reference to FIG. 4A, for example. Moreover, blocks 440B and 450B may be performed in the same manner as blocks 340A and 350A, respectively, of the method 300A as described with reference to FIG. 3A, for example. As described above with reference to FIG. 3A, external environment data and/or interior vehicle environment data may be acquired (block 440B) and analyzed to determine whether an emergency condition exits (450B).

When an emergency condition is not detected at block 450B, the method returns to block 440B to collect more driving environment data and/or interior vehicle environment data, respectively, and repeats the method 400B as described above (e.g., on a periodic basis). However, when the emergency condition is detected, the method proceeds to block 460A.

In response to detecting the emergency condition, an actuator program, stored in an actuator program memory (for example the actuator program memory 232 of FIG. 1B), may be executed to cause one or more actuator components (such as the APC actuator components 135.1-135.3 of FIG. 1C) to adjust/modify the subset of the plurality of article protection component(s) (such as the article protection component 165.1-165.3 of FIG. 1C) (block 460A). In some embodiments, adjusting/modifying the state of the subset of the plurality of article protection components is intended to reduce the risk of injury to and/or protect the vehicle occupant(s). In some embodiments, the actuator program determines which of the subset of the article protection components to adjust/modify based on data stored in a data storage unit (e.g., the article protection component configuration data storage 234 of FIG. 1B) at block 430B. For example, in an embodiment in which the emergency condition is a steep downward sloping road on which the vehicle is traveling, the one or more transportable articles is a glass object, and the subset of the plurality of article protection components is a strut restraint system, the processor may cause the one or more actuator components to adjust a physical configuration of the strut restraint system to prevent the glass object from moving, tipping, sliding, etc. as a result of the vehicle traveling on the steep downward sloping road. In another example, in which the emergency condition is a substantial change in the temperature external to the vehicle (e.g., an increase from 70-degrees Fahrenheit to 110-degrees Fahrenheit), the one or more transportable articles is packages of ice cream, and the subset of article protection components is a temperature control device, in response to the processor detecting the change in temperature, the processor may cause an actuator component to adjust/modify the state of the temperature control device (e.g., decrease the temperature in the interior space of the vehicle) in order to keep the ice cream frozen.

Figure 4C:
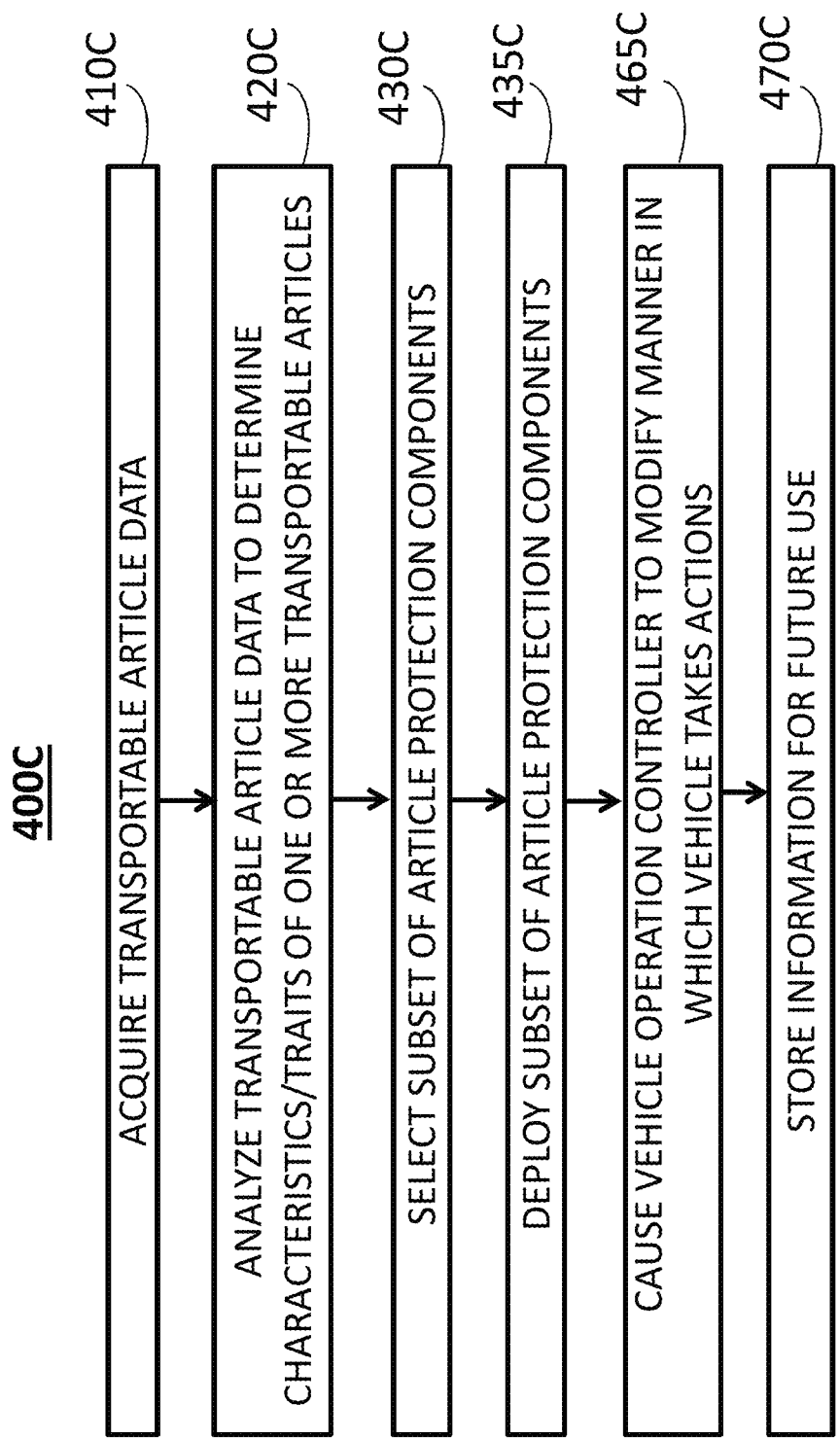
FIG. 4C illustrates a method in which a vehicle operation controller modifies the manner in which a vehicle takes a specific action based on one or more characteristic(s) and/or trait(s) of one or more transportable articles.

FIG. 4C illustrates a method 400C in which the vehicle operation controller (e.g., the vehicle operation controller 150 of FIG. 1C) modifies the manner in which the vehicle takes a specific action based on one or more characteristic(s) and/or trait(s) of one or more transportable articles. Blocks 410C, 420C, 430C, 435C, and 470C may be performed in the same manner as blocks 410A, 420A, 430A, 435A, and 470A, respectively, of the method 400A as described with reference to FIG. 4A, for example.

However, block 465C may differ from the blocks of the method 400A. In response to determining the one or more characteristic(s) and/or trait(s) of the one or more transportable articles at block 430C, the processor may cause a vehicle operation controller (e.g., the vehicle operation controller 150 of FIG. 1C) to modify the manner in which the vehicle operates (block 465C). To modify the manner in which the vehicle operates, the processor may cause the vehicle operation controller to generate and transmit vehicle control data, indicative of a driving decision, to operate the vehicle or one of its subsystems. In some embodiments, in response to determining the one or more characteristics and/or traits of the one or more transportable articles, the processor may cause the vehicle operation controller to cause the vehicle to take a specific action. For example, in an embodiment in which the processor determines the vehicle is transporting transplant organs that need to be delivered to a hospital immediately, the processor may cause the vehicle operation controller to cause the vehicle to accelerate and/or operate in a manner that will prioritize speed over ride comfort when transporting the organs to the hospital.

In some embodiments, in response to determining the one or more characteristic(s) and/or trait(s) of the one or more transportable articles, the processor may cause the vehicle operation controller to prevent/restrict the vehicle from taking a specific action. For example, in an embodiment in which the processor determines the vehicle is transporting glassware (the transportable article), the processor may cause the vehicle operation controller to restrict the vehicle from exceeding a certain positive or negative acceleration and/or making a sharp turn in order to protect/reduce the risk of damage to the glassware.

It should be appreciated that in some embodiments, the manner in which the vehicle operates may be modified at any point in the method 400C after the processor has determined the one or more characteristic(s) and/or trait(s) of the one or more transportable articles. In some embodiments, the subset of article protection components may be selected and/or deployed before, during, and/or after the vehicle operation controller has modified the manner in which the vehicle takes action. For example, in an embodiment in which the one or more transportable articles is a glass object and the one or more article protection components is an impact dampening pad, in response to the processor determining that the transportable article is glass, the vehicle operation controller may reduce the speed of the vehicle, to reduce the risk of damage to the glass object, before an actuator component deploys the impact dampening pad.

Dynamic Limiting of Vehicle Operation Based on Interior Configuration

Figure 5:
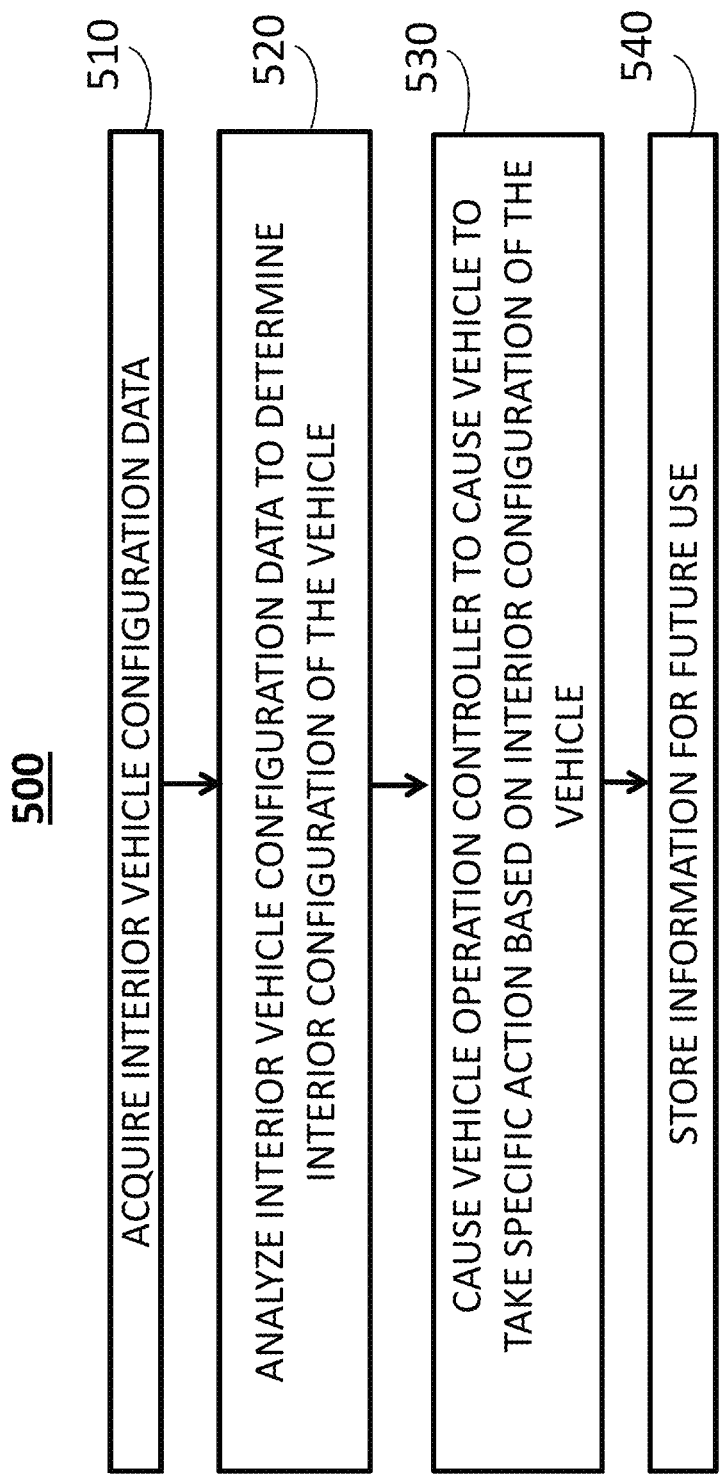
FIG. 5 illustrates a method in which a vehicle operation controller modifies the manner in which a vehicle takes a specific action based on a physical configuration of the interior space of the vehicle.

FIG. 5 illustrates a method 500 in which a vehicle operation controller (e.g., the vehicle operation controller 150 of FIGS. 1A and 1C) modifies the manner in which a vehicle takes a specific action based on a physical configuration of the interior space of the vehicle (e.g., the vehicle 102 of FIGS. 1A and 1C). The method 500 may be implemented as described above in connection with FIG. 1A, 1B, or 1C, for example. Accordingly, the method 500 may be partially or completely implemented on the vehicle computer 200.

In the method 500, interior vehicle configuration data (representing/indicative of the interior space of the vehicle) is acquired (block 510). Interior vehicle configuration data may be collected, generated, and/or received using a data collection component (e.g., the interior data collection component 120 of FIGS. 1A and 1C). Once collected, the interior vehicle configuration data may be stored locally within the vehicle, for example in a data storage unit (e.g., the interior vehicle configuration data storage 242 of the vehicle computer 200 of FIG. 1B), and possibly also transmitted remotely to a third party device, machine, server, network, and/or database (e.g., if a driver has expressly agreed to participate in a program involving data collection/sharing). In some embodiments, the third party device, machine, server, network, and/or database may be associated with or operated by or on behalf of an insurance provider. The third party device, machine, server, network, and/or database may be configured to receive, collect, and/or analyze driving environment data and/or other data in accordance with any of the methods described herein.

In some embodiments, vehicle occupant data, corresponding to a vehicle occupant status of one or more occupants riding in the vehicle 102, may be acquired at block 510. In some embodiments, the vehicle occupant data may correspond to a location, orientation, action, one or more characteristic(s), and/or one or more trait(s) of the one or more vehicle occupants. For example, vehicle occupant data may indicate the type of occupant (e.g., adult human, child human, trained dog, untrained dog, horse, reptile, etc.), size of the occupant (e.g., height, weight, etc.), whether the occupant is wearing some type of article (e.g., glasses, a brace, leash, etc.), and/or whether the occupant has a medical condition/disability (e.g., missing limbs, asthma, heart condition, bad back, etc.). The vehicle occupant data may be collected, generated, and/or received using a data collection component (e.g., the interior data collection component 120 of FIGS. 1A and 1C). The vehicle occupant data may be stored locally within the vehicle within a data storage unit (e.g., the vehicle occupant data storage 238 of the vehicle computer 200 of FIG. 1B), and possibly also transmitted remotely to a third party device, machine, server, network, and/or database (e.g., if a driver has expressly agreed to participate in a program involving data collection/sharing). It should be appreciated that in some embodiments of the method 500, vehicle occupant data may be utilized in a similar manner as and/or for similar purposes as the interior configuration data.

An interior vehicle configuration is determined by analyzing (e.g., via the processor 202 of the vehicle computer 200 of FIG. 1A) the collected interior vehicle configuration data (block 520). In some embodiments, the interior vehicle configuration data may be analyzed in real-time to determine a physical configuration of the interior space of the vehicle, the presence of one or more occupants (e.g., human passengers, non-human animals, etc.) in the vehicle, a location and/or orientation of the one or more vehicle occupants, one or more characteristic(s) and/or trait(s) of the one or more vehicle occupants, and/or an action/behavior of the one or more vehicle occupants. In one embodiment, the data may be analyzed by comparing acquired interior vehicle configuration data with previously collected interior vehicle configuration data corresponding to a previous status/physical configuration/condition of the interior space of the vehicle. In some embodiments, previously collected interior vehicle configuration data may correspond to an unoccupied/empty interior space of the vehicle. In some embodiments, interior vehicle configuration data may be analyzed to determine a physical configuration of an interior vehicle component (e.g., a passenger seat, storage console, drink holder, desk, etc.), the location and/or orientation of the one or more vehicle occupants relative to the interior vehicle component, and/or an action/behavior of the one or more vehicle occupants relative to the interior vehicle component. For example, in an embodiment in which the interior vehicle component is a passenger seat, the interior vehicle configuration data may be analyzed to determine where the passenger seat is located within the vehicle; whether a vehicle occupant is seated in the passenger seat; the physical configuration about a yaw angle in which the passenger seat is oriented; the physical configuration about a roll angle in which the passenger seat is tilted; an action/behavior of the vehicle occupant using the passenger seat (e.g., sleeping, reading, eating, using an electronic device, exercising, etc.); and/or the proximity of other interior vehicle components (e.g., other passenger seats, storage consoles, etc.), vehicle occupants (human passengers and/or non-human animals), and/or one or more transportable articles to the passenger seat. In some embodiments, interior vehicle configuration data may be analyzed to determine the one or more vehicle occupants' actions/behavior, or intended/expected actions/behavior, within vehicle. For example, a specific physical configuration of the interior space of the vehicle may correspond to the one or more vehicle occupants sleeping, eating, exercising, working, or engaging in another action/behavior within the interior space of the vehicle.

In embodiments in which vehicle occupant data is collected, vehicle occupant data may be analyzed to determine a vehicle occupant status. In some embodiments, the vehicle occupant status may be one or more vehicle occupants sitting, sleeping, eating, working, reading, using a bathroom in the vehicle, and/or experiencing a medical emergency while in the vehicle.

In some embodiments, the interior vehicle configuration and/or vehicle occupant status may be determined by comparing the interior vehicle configuration data, with a maximum or minimum criteria/threshold that is indicative of the point at which a particular interior vehicle configuration condition (e.g., presence of a vehicle occupant) is detected. In some embodiments, the criteria/threshold indicative of the point at which an interior vehicle configuration is detected may be stored in a data storage unit (e.g., the interior vehicle configuration detection criteria data storage 246 of FIG. 1B). Once determined, the data corresponding to the physical configuration of the interior space of the vehicle, such as the location, orientation, one or more characteristic(s), one or more trait(s), actions, and/or behaviors of the one or more vehicle occupants, may be stored locally within the vehicle (e.g., in the interior vehicle configuration data storage 242 or the vehicle occupant data storage 238 of FIG. 1B), and possibly also transmitted remotely to a third party device, machine, server, network, and/or database (e.g., if a driver has expressly agreed to participate in a program involving data collection/sharing). In some embodiments, the third party device, machine, server, network, and/or database may be associated with or operated by or on behalf of an insurance provider. In some embodiments, the data corresponding to the determined physical configuration of the interior space of the vehicle may be used to adjust, generate, and/or update an insurance policy, premium, rate, discount, and/or reward for the specific driver, passenger, and/or the insured individual.

The interior vehicle configuration data may also be analyzed to predict the likelihood of a future action/behavior of the one or more vehicle occupants. For example, the processor may anticipate/predict when one or more vehicle occupants may be asleep in the vehicle, in furtherance of determining an action of the one or more vehicle occupants, by analyzing data corresponding to the time of day, the location and/or orientation of the one or more vehicle occupants, the physical configuration of the one or more vehicle occupants in an interior vehicle component (e.g., reclining in a passenger seat), and/or past interior vehicle configuration data. In determining whether a vehicle occupant is sleeping, for example, the method may also compare the received interior vehicle configuration data and/or vehicle occupant data with previously collected data covering the same time, same vehicle occupant, and/or same location and/or orientation of the vehicle occupant. Accordingly, analyzing this data may help the processor determine the likelihood of the vehicle occupant status and/or determine more readily when the vehicle occupant status exists.

In response to determining the interior vehicle configuration and/or vehicle occupant status at block 520, the processor may cause a vehicle operation controller (e.g., the vehicle operation controller 150 of FIGS. 1A and 1C) to modify the manner in which the vehicle operates (block 530). To modify the manner in which the vehicle operates, the processor may cause the vehicle operation controller to generate and transmit vehicle control data, indicative of a driving decision, to operate the vehicle or one of its subsystems. In some embodiments, in response to determining the location, orientation, characteristics, traits, actions, and/or behaviors the one or more vehicle occupants, the processor may cause the vehicle operation controller to cause the vehicle to take a specific action. It should be understood that a vehicle "action" may comprise a single maneuver (e.g. accelerating, braking, turning the steering wheel, etc.), a combination of maneuvers (e.g. changing lanes—which entails a combination of changing speeds and turning, or changing lanes and then pulling onto a shoulder, etc.), an operational state (e.g. a speed of the vehicle, applying the brakes, etc.), or a change in operational state. For example, in an embodiment in which the processor determines a vehicle occupant is sleeping, the processor may cause the vehicle operation controller to cause the vehicle to decelerate and/or operate in a manner that will prioritize ride comfort over speed when transporting the vehicle occupant.

In some embodiments, in response to determining the interior vehicle configuration and/or vehicle occupant status, the processor may cause the vehicle operation controller to prevent/restrict the vehicle from taking a specific action. For example, in an embodiment in which the processor determines a vehicle occupant is eating, the processor may cause the vehicle operation controller to restrict the vehicle from exceeding a certain positive or negative acceleration and/or making a sharp turn in order to protect/reduce the risk of the vehicle occupant from choking.

In some embodiments, the vehicle occupant data, described above may be used in determining a specific vehicle action to take and/or prevent/restrict. For example, in an embodiment in which a vehicle occupant has a back condition, causing the vehicle to accelerate, take a sharp turn, or stop frequently may cause the vehicle occupant to experience discomfort and/or may further aggravate the back condition. Accordingly, the vehicle operation controller may cause the vehicle to take a specific route to avoid having to take sharp turns or make frequent stop.

It should be appreciated that in some embodiments, the manner in which the vehicle operates may be modified at any point in the method 500 after the processor has determined the interior vehicle configuration and/or the vehicle occupant status. In some embodiments, the interior data collection component may continue to collect interior vehicle data (e.g., vehicle occupant data) after the vehicle operation controller has modified the manner in which the vehicle takes action, and the processor may cause the vehicle operation controller to generate and transmit vehicle control data, indicative of a different driving decision, to operate the vehicle or one of its subsystems in response to detecting a change in the interior vehicle configuration data (e.g., a change in the location, orientation, characteristic(s), trait(s), action, and/or behavior of the one or more vehicle occupants). For example, in an embodiment in which the vehicle is driving at a reduced speed because the processor had previously determined a vehicle occupant was sleeping, the vehicle controller may increase the speed of the vehicle in response to the processor determining the vehicle occupant has woken up. In another example, in which the interior vehicle component is a passenger seat, the vehicle controller may adjust the speed of the vehicle in response to the processor determining the vehicle occupant has adjusted the physical configuration of the passenger seat from an upward configuration to a reclined configuration.

In some embodiments of the method 500, information received, generated, calculated, detected, and/or determined during the method 500 may be stored for future use (block 540). Stored information may include, but is not limited to, the, interior vehicle configuration data collected at block 510, vehicle occupant data collected at block 510, the interior vehicle configuration and/or a vehicle occupant status determined at block 520, the specific vehicle action taken at block 530, the vehicle action prevented/restricted at block 530, and/or any other vehicle operation data generated/transmitted at block 530. Storing this information for future use may improve the accuracy and/or speed of analyzing interior vehicle configuration data; determining a physical configuration of the interior space of the vehicle; determining a location, orientation, characteristic(s), trait(s), action(s), and/or behavior(s) of the one or more vehicle occupants; training machine learning models which may be used for determining a location, orientation, characteristic(s), trait(s), action(s), and/or behavior(s) of the one or more vehicle occupants; determining a specific vehicle action to take; and/or determining a specific vehicle action to prevent/restrict. The recorded information may be stored locally in the vehicle computer and/or may be transmitted to a third party machine (e.g., if a driver has expressly agreed to participate in a program involving data collection/sharing). In some embodiments, recorded information may be used for generating, adjusting, evaluating, investigating, analyzing, or prospecting insurance coverage, parameters of the insurance policy (e.g., a deductible), a premium, a rate, a discount, and/or a reward for the specific driver, passenger, or the insured individual.

In some embodiments, multiple interior vehicle components are adjusted in response to the processor detecting an emergency condition and/or specific action. In some embodiments the adjusted interior vehicle components are different types of elements. For example, in one embodiment, in response to detecting an emergency condition such as an impending collision, the processor may cause a first actuator component to deploy an airbag and cause a second actuator component to deploy a restraint device in anticipation of the collision.

For scenarios in which multiple vehicle occupants are traveling in the vehicle, it should be appreciated that each vehicle occupant may have his/her own dedicated vehicle safety component. It should also be appreciated that each vehicle safety component may be adjusted/deployed, or have its movement restricted, in the same, substantially similar, or different manner as other vehicle safety components of like kind. Further, the processor may take into account the existence of other vehicle occupants, interior vehicle components, and/or transportable articles in the vehicle when determining which of the one or more vehicle safety components to select to be active and/or deploy.

In some embodiments, the emergency condition and/or specific vehicle action may be detected using machine learning techniques, such as cognitive learning, deep learning, combined learning, heuristic engines and algorithms, and/or pattern recognition techniques. For example, the processor 202 may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

In some embodiments, machine learning techniques may also, or instead, be utilized to determine when the existence of an emergency condition and/or specific vehicle action is sufficiently hazardous to warrant deploying the selected subset of the plurality of vehicle safety components and/or adjusting the subset of the one or more article protection components. In such embodiments, the driving environment data and/or vehicle operation data may be considered in combination with each other and/or interior vehicle configuration data to evaluate whether the risk warrants deploying the selected subset of the plurality of vehicle safety components, adjusting the subset of the one or more article protection components, and/or modifying the manner in which the vehicle operates.

Additionally or alternatively, the machine learning programs may be trained by inputting sample data sets or certain data into the programs, such as image, mobile device, insurer database, and/or third-party database data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant data for one or more user device details, user request or login details, user device sensors, geolocation information, image data, the insurer database, a third-party database, and/or other data.

In one embodiment, a processor (and/or machine learning or heuristic engine or algorithm discussed herein) may be trained by providing it with a large sample of images and/or user data with known characteristics or features, such as historical vehicle data and/or past auto claim data. Based upon these analyses, the processing element may learn how to identify characteristics and patterns that may then be applied to analyzing user device details, user vehicle details, user device sensors, geolocation information, image data, the insurer database, a third-party database, and/or other data. For example, the processing element may learn, with the user's permission or affirmative consent, to identify the user and/or insured vehicles, and/or learn to identify insured vehicles characteristics. The processing element may also predict which vehicles are more prone to be classified as a total loss in the event of a vehicle collision, such as by vehicle characteristics determined from vehicle or other data.

The processing element and/or machine learning algorithm may determine historical storage, rental, or salvage time and/or costs typically expected with various types of vehicles or with vehicles having specific characteristics (such as make, model, mileage, age, etc.)—such as by analysis of scrubbed or depersonalized historical or past auto claim data. As such, a total loss may be predicted when a given vehicle is involved in a vehicle collision, and if so, the total loss cycle time may be reduced, and inconvenience to the insured may be reduced.

ADDITIONAL CONSIDERATIONS

Unless specifically stated otherwise, discussions herein using words such as "processing," "computing," "calculating," "determining," "detecting," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Although the preceding text sets forth a detailed description of numerous different embodiments, it should be understood that the legal scope of the invention is defined by the words of the claims set forth at the end of this patent. The detailed description is to be construed as example only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, the patent claims at the end of this patent application are not intended to be construed under 35 U.S.C. § 112(f) unless traditional means-plus-function language is expressly recited, such as "means for" or "step for" language being explicitly recited in the claim(s).

The systems and methods described herein are directed to an improvement to computer functionality, and improve the functioning of conventional computers.

What is claimed:

1. A system for improving safety of one or more vehicle occupants, the system comprising:
    an interior data collection component configured to collect first data representing an interior space of a vehicle, and second data representing one or more physiological conditions and/or traits of the one or more vehicle occupants;
    a plurality of vehicle safety components;
    one or more processors configured to
        receive interior vehicle configuration data that includes, or is derived from data that includes, the first data collected by the interior data collection component, receive vehicle occupant data that is generated by, or is derived from, the second data collected by the interior data collection component, determine, by processing the interior vehicle configuration data, location and orientation of the one or more vehicle occupants, select a subset of the plurality of vehicle safety components to be active based on the location and orientation of the one or more vehicle occupants, determine, by processing the vehicle occupant data, a manner in which to deploy the selected subset of the plurality of vehicle safety components based on the one or more physiological conditions and/or traits of the one or more vehicle occupants, and set the selected subset of the plurality of vehicle safety components to an active state in which the selected subset of the plurality of vehicle safety components is deployed when an emergency condition is detected; and one or more actuator components configured to deploy the selected subset of the plurality of vehicle safety components.

2. The system of claim 1, wherein each of the one or more actuator components is configured to deploy a respective one of the selected subset of the plurality of vehicle safety components at least by moving the respective vehicle safety component forward, backward, upward, downward, outward, inward, clockwise, counterclockwise, and/or laterally relative to the vehicle.

3. The system of claim 1, further comprising
an external communication component configured to collect data representing a driving environment of the vehicle,
wherein the one or more processors are further configured to
receive driving environment data that includes, or is derived from data that includes, the data collected by the external communication component,
detect, by processing the driving environment data, the emergency condition, and
in response to detecting the emergency condition, cause the one or more actuator components to deploy the selected subset of the plurality of vehicle safety components.

4. The system of claim 1, wherein the emergency condition includes an impending collision between the vehicle and one or more objects external to the vehicle, a fire within the vehicle, a medical emergency suffered by the one or more vehicle occupants, a particular type of vehicle traffic, a particular type of weather, and/or a particular type of terrain.

5. The system of claim 1, wherein the vehicle safety component includes an airbag, seatbelt, pillow, pad, cushion, body stabilizer, and/or fire-extinguishing agent.

6. The system of claim 1, wherein the vehicle safety component is partially or wholly contained within at least one of the front, back, left side, right side, ceiling, or floor of the vehicle.

7. A method for improving safety of one or more vehicle occupants, the method comprising:
receiving, via one or more processors, interior vehicle configuration data that is generated by, or derived from data generated by, an interior data collection component;
receiving, via the one or more processors, vehicle occupant data that is generated by, or is derived from, data generated by the interior data collection component;
determining, by processing the interior vehicle configuration data using the one or more processors, location and orientation of the one or more vehicle occupants;
selecting, via the one or more processors, a subset of a plurality of vehicle safety components to be active based on the location and orientation of the one or more vehicle occupants;
determining, by processing the vehicle occupant data using the one or more processors, one or more physiological conditions and/or traits of the one or more vehicle occupants;
selecting, via the one or more processors, a manner in which to deploy the selected subset of the plurality of vehicle safety components based on the one or more physiological conditions and/or traits of the one or more vehicle occupants; and
setting, via the one or more processors, the selected subset of the plurality of vehicle safety components to an active state in which the selected subset of the plurality of vehicle safety components is deployed when an emergency condition is detected.

8. The method of claim 7, further comprising activating one or more actuator components to deploy the selected subset of the plurality of vehicle safety components.

9. The method of claim 8, wherein each of the one or more actuator components is configured to deploy a respective one of the selected subset of the plurality of vehicle safety components at least by moving the respective vehicle safety component forward, backward, upward, downward, outward, inward, clockwise, counterclockwise, and/or laterally relative to the vehicle.

10. The method of claim 8, further comprising:
receiving, via one or more processors, driving environment data that is generated by, or derived from data generated by, an external communication component;
detecting, by processing the driving environment data using the one or more processors, the emergency condition; and
deploying, via the one or more actuator components, the selected subset of the plurality of vehicle safety components.

11. The method of claim 7, wherein the emergency condition includes an impending collision between the vehicle and one or more objects external to the vehicle, a fire within the vehicle, a medical emergency suffered by the one or more vehicle occupants, a particular type of vehicle traffic, a particular type of weather, and/or a particular type of terrain.

12. The method of claim 7, wherein the vehicle safety component includes an airbag, seatbelt, pillow, pad, cushion, body stabilizer, and/or fire-extinguishing agent.

13. A system for improving safety of one or more vehicle occupants, the system comprising:
an interior data collection component configured to collect data representing an interior space of the vehicle;
a vehicle safety component;
an actuator component configured to adjust a physical configuration of the vehicle safety component; and
one or more processors configured to
receive interior vehicle configuration data that includes, or is derived from data that includes, the data collected by the interior data collection component,
determine, by processing the interior vehicle configuration data, location and orientation of the one or more vehicle occupants, and
cause the actuator component to adjust the vehicle safety component from a first physical configuration to a second physical configuration based on the location and orientation of the one or more vehicle occupants.

14. The system of claim 13, wherein the actuator component is configured to adjust the vehicle safety component from the first physical configuration to the second physical configuration at least by moving the vehicle safety component forward, backward, upward, downward, outward, inward, clockwise, counterclockwise, and/or laterally relative to the vehicle.

15. The system of claim 13, wherein:
the interior data collection component is further configured to collect data representing one or more physiological conditions and/or traits of the one or more vehicle occupants; and
the one or more processors are further configured to
receive vehicle occupant data that is generated by, or is derived from data generated by the interior data collection component, and
determine, by processing the vehicle occupant data, a manner in which to deploy the vehicle safety component based on the one or more physiological conditions and/or traits of the one or more vehicle occupants.

16. The system of claim 13, further comprising an external communication component configured to collect data representing a driving environment of the vehicle, wherein the one or more processors are further configured to
receive driving environment data that includes, or is derived from data that includes, the data collected by the external communication component,
detect, by processing the driving environment data, the emergency condition, and
in response to detecting the emergency condition, cause the actuator component to deploy the vehicle safety component.

17. The system of claim 13, wherein the emergency condition includes an impending collision between the vehicle and one or more objects external to the vehicle, a fire within the vehicle, a medical emergency suffered by the one or more vehicle occupants, a particular type of vehicle traffic, a particular type of weather, and/or a particular type of terrain.

18. The system of claim 13, wherein the vehicle safety component includes an airbag, seatbelt, pillow, pad, cushion, body stabilizer, and/or fire-extinguishing agent.

* * * * *